United States Patent
Johansen

(10) Patent No.: US 8,626,178 B2
(45) Date of Patent: Jan. 7, 2014

(54) AUDIO-VISUAL SYSTEM CONTROL USING A MESH NETWORK

(76) Inventor: Niels Thybo Johansen, Virum (DK)

( * ) Notice: Subject to any disclaimer, the term of this patent is extended or adjusted under 35 U.S.C. 154(b) by 1002 days.

(21) Appl. No.: 12/198,241

(22) Filed: Aug. 26, 2008

(65) Prior Publication Data

US 2009/0082888 A1 Mar. 26, 2009

Related U.S. Application Data

(63) Continuation-in-part of application No. 11/425,917, filed on Jun. 22, 2006, now Pat. No. 8,509,790, which is a continuation-in-part of application No. 11/456,029, filed on Jul. 6, 2006, now abandoned, and a continuation-in-part of application No. 11/552,418, filed on Oct. 24, 2006, now Pat. No. 8,194,569, and a (Continued)

(51) Int. Cl.
*H04W 72/00* (2009.01)

(52) U.S. Cl.
USPC .......................................................... 455/450

(58) Field of Classification Search
USPC .......................................................... 455/450
See application file for complete search history.

(56) References Cited

U.S. PATENT DOCUMENTS

| 5,371,782 A | 12/1994 | Casey et al. |
| 5,388,149 A | 2/1995 | Lynn et al. |

(Continued)

FOREIGN PATENT DOCUMENTS

| JP | 2002185559 A | 6/2002 |
| JP | 2005-203991 A | 7/2005 |

(Continued)

OTHER PUBLICATIONS

"U.S. Appl. No. 11/875,915, Non-Final Office Action mailed Oct. 8, 2009", 10.
Leventis, A et al., ""Intelligent Devices for Applicances Control in Home Networks",", *IEEE Transactions on consumer Electrionics* vol. 49, No. 2,, (May 2003),pp.328-336.
"U.S. Appl. No. 11/875,921, Non-Final Office Action mailed Oct. 8, 2009", 7 Pgs.

(Continued)

*Primary Examiner* — Nathan Mitchell
(74) *Attorney, Agent, or Firm* — Strategic Patents, P.C.

(57) ABSTRACT

In embodiments of the present invention, improved capabilities are described for a home audio-visual system that is at least in part controlled through a mesh network, wherein the home audio-visual system produces at least two effects. Each of the at least two effects may be controlled through separate mesh network nodes responsive to user initiated instructions. Each of the separate mesh network nodes may be adapted to receive the user initiate instructions through a channel management operation. The home audio-visual system may be associated with a channel management operation that is associated with one or more nodes of the mesh network to effect the communication of the information.

20 Claims, 41 Drawing Sheets

Related U.S. Application Data continuation-in-part of application No. 11/681,401, filed on Mar. 2, 2007, now Pat. No. 8,300,652, and a continuation-in-part of application No. 11/681,417, filed on Mar. 2, 2007, now Pat. No. 8,219,705, and a continuation-in-part of application No. 11/684,430, filed on Mar. 9, 2007, now Pat. No. 7,680,041, and a continuation-in-part of application No. 11/684,442, filed on Mar. 9, 2007, now Pat. No. 8,223,783, and a continuation-in-part of application No. 11/737,717, filed on Apr. 19, 2007, and a continuation-in-part of application No. 11/875,914, filed on Oct. 21, 2007, now abandoned, and a continuation-in-part of application No. 11/875,915, filed on Oct. 21, 2007, now abandoned, and a continuation-in-part of application No. 11/875,916, filed on Oct. 21, 2007, now abandoned, and a continuation-in-part of application No. 11/875,917, filed on Oct. 21, 2007, now abandoned, and a continuation-in-part of application No. 11/875,919, filed on Oct. 21, 2007, now abandoned, and a continuation-in-part of application No. 11/875,920, filed on Oct. 21, 2007, now abandoned, and a continuation-in-part of application No. 10/875,921, filed on Oct. 21, 2007, now abandoned, and a continuation-in-part of application No. 11/875,923, filed on Oct. 21, 2007, now abandoned, and a continuation-in-part of application No. 11/875,924, filed on Oct. 21, 2007, now abandoned, and a continuation-in-part of application No. 11/875,926, filed on Oct. 21, 2007, now abandoned, and a continuation-in-part of application No. 11/875,927, filed on Oct. 21, 2007, now abandoned.

(60) Provisional application No. 60/968,258, filed on Aug. 27, 2007, provisional application No. 60/984,522, filed on Nov. 1, 2007, provisional application No. 60/764,394, filed on Feb. 1, 2006, provisional application No. 60/765,810, filed on Feb. 7, 2006, provisional application No. 60/772,089, filed on Feb. 10, 2006, provisional application No. 60/763,835, filed on Jan. 31, 2006.

(56) References Cited

U.S. PATENT DOCUMENTS

| | | | |
|---|---|---|---|
| 5,935,213 | A | 8/1999 | Rananand et al. |
| 5,946,462 | A | 8/1999 | Rangan et al. |
| 6,285,665 | B1 | 9/2001 | Chuah |
| 6,462,507 | B2 | 10/2002 | Fisher, Jr. |
| 6,477,171 | B1 | 11/2002 | Wakeley et al. |
| 6,480,497 | B1 | 11/2002 | Flammer et al. |
| 6,532,222 | B1 | 3/2003 | Rege et al. |
| 6,549,513 | B1 | 4/2003 | Chao et al. |
| 6,631,134 | B1 | 10/2003 | Zadikian et al. |
| 6,633,547 | B1 | 10/2003 | Akatsu et al. |
| 6,901,439 | B1 | 5/2005 | Bonasia et al. |
| 6,909,356 | B2 | 6/2005 | Brown et al. |
| 6,912,221 | B1 | 6/2005 | Zadikian et al. |
| 6,915,130 | B1 | 7/2005 | Chapman et al. |
| 6,950,391 | B1 | 9/2005 | Zadikian et al. |
| 6,990,111 | B2 | 1/2006 | Lemoff et al. |
| 7,053,770 | B2 | 5/2006 | Ratiu et al. |
| 7,069,483 | B2 | 6/2006 | Gillies et al. |
| 7,075,919 | B1 | 7/2006 | Wendt et al. |
| 7,088,676 | B1 | 8/2006 | Doverspike et al. |
| 7,225,268 | B2 | 5/2007 | Watanabe |
| 7,248,217 | B2 | 7/2007 | Mani et al. |
| 7,382,731 | B1 | 6/2008 | Zhao et al. |
| 7,428,212 | B2 | 9/2008 | Saleh et al. |
| 7,433,702 | B2 | 10/2008 | Lindskog et al. |
| 7,437,079 | B1 | 10/2008 | Hofmeister et al. |
| 7,487,221 | B2 | 2/2009 | Araki |
| 7,522,540 | B1 | 4/2009 | Maufer |
| 7,554,998 | B2 | 6/2009 | Simonsson et al. |
| 7,606,175 | B1 | 10/2009 | Maufer |
| 7,680,041 | B2 | 3/2010 | Johansen |
| 8,089,874 | B2 | 1/2012 | Johansen |
| 8,194,569 | B2 | 6/2012 | Shorty et al. |
| 8,219,705 | B2 | 7/2012 | Shorty et al. |
| 8,223,783 | B2 | 7/2012 | Shorty et al. |
| 8,300,652 | B2 | 10/2012 | Christensen et al. |
| 2002/0010641 | A1 | 1/2002 | Stevens et al. |
| 2002/0124097 | A1 | 9/2002 | Isely et al. |
| 2003/0028887 | A1 | 2/2003 | Frouin et al. |
| 2003/0103088 | A1 | 6/2003 | Dresti et al. |
| 2003/0135797 | A1 | 7/2003 | Choi |
| 2003/0221195 | A1 | 11/2003 | Bizet et al. |
| 2004/0208180 | A1 | 10/2004 | Light et al. |
| 2005/0002533 | A1 | 1/2005 | Langin et al. |
| 2005/0037787 | A1 | 2/2005 | Bachner et al. |
| 2005/0136972 | A1 | 6/2005 | Smith et al. |
| 2005/0185588 | A1 | 8/2005 | Park et al. |
| 2005/0204385 | A1 | 9/2005 | Sull et al. |
| 2005/0243765 | A1 | 11/2005 | Schrader et al. |
| 2005/0249139 | A1 | 11/2005 | Nesbit |
| 2006/0007001 | A1 | 1/2006 | Rastegar et al. |
| 2006/0056368 | A1 | 3/2006 | Ratiu et al. |
| 2006/0056456 | A1 | 3/2006 | Ratiu et al. |
| 2006/0066455 | A1* | 3/2006 | Hancock et al. ......... 340/870.01 |
| 2006/0104291 | A1 | 5/2006 | Rodriguez et al. |
| 2006/0109787 | A1 | 5/2006 | Strutt et al. |
| 2006/0126617 | A1* | 6/2006 | Cregg et al. ................... 370/389 |
| 2006/0129850 | A1* | 6/2006 | Hassan et al. ................ 713/300 |
| 2006/0145842 | A1 | 7/2006 | Stilp |
| 2006/0146875 | A1 | 7/2006 | Yang |
| 2006/0215556 | A1 | 9/2006 | Wu et al. |
| 2006/0215627 | A1 | 9/2006 | Waxman |
| 2006/0253735 | A1* | 11/2006 | Kwak et al. ..................... 714/12 |
| 2006/0268685 | A1 | 11/2006 | Bender et al. |
| 2006/0271244 | A1 | 11/2006 | Cumming et al. |
| 2006/0271703 | A1 | 11/2006 | Kim et al. |
| 2007/0022185 | A1 | 1/2007 | Hamilton et al. |
| 2007/0112939 | A1* | 5/2007 | Wilson et al. ................. 709/219 |
| 2007/0162536 | A1 | 7/2007 | Ostrovsky et al. |
| 2007/0177538 | A1 | 8/2007 | Christensen et al. |
| 2007/0177576 | A1 | 8/2007 | Johansen et al. |
| 2007/0177613 | A1 | 8/2007 | Shorty et al. |
| 2007/0183457 | A1 | 8/2007 | Leitch |
| 2007/0195808 | A1* | 8/2007 | Ehrlich et al. ................ 370/408 |
| 2007/0201504 | A1 | 8/2007 | Christensen et al. |
| 2007/0204009 | A1 | 8/2007 | Shorty et al. |
| 2007/0222585 | A1 | 9/2007 | Sabol et al. |
| 2007/0248047 | A1 | 10/2007 | Shorty et al. |
| 2007/0258508 | A1 | 11/2007 | Werb et al. |
| 2007/0263647 | A1 | 11/2007 | Shorty et al. |
| 2007/0286205 | A1 | 12/2007 | Johansen |
| 2008/0151795 | A1 | 6/2008 | Shorty et al. |
| 2008/0151824 | A1 | 6/2008 | Shorty et al. |
| 2008/0151825 | A1 | 6/2008 | Shorty et al. |
| 2008/0151826 | A1 | 6/2008 | Shorty et al. |
| 2008/0151827 | A1 | 6/2008 | Shorty et al. |
| 2008/0154396 | A1 | 6/2008 | Shorty et al. |
| 2008/0159213 | A1 | 7/2008 | Shorty et al. |
| 2008/0165712 | A1 | 7/2008 | Shorty et al. |
| 2008/0170511 | A1 | 7/2008 | Shorty et al. |
| 2008/0316048 | A1 | 12/2008 | Abdallah |
| 2009/0077405 | A1 | 3/2009 | Johansen et al. |
| 2010/0149967 | A1 | 6/2010 | Johansen |
| 2012/0155253 | A1 | 6/2012 | Johansen |
| 2013/0142051 | A1 | 6/2013 | Christensen et al. |

FOREIGN PATENT DOCUMENTS

| | | |
|---|---|---|
| JP | 200650549 | 2/2006 |
| WO | WO-0159607 A2 | 8/2001 |

(56) References Cited

FOREIGN PATENT DOCUMENTS

| WO | WO-2008006066 A3 | 1/2008 |
|---|---|---|
| WO | WO-2009029606 A2 | 3/2009 |
| WO | WO-2009/029606 A3 | 5/2009 |

OTHER PUBLICATIONS

"U.S. Appl. No. 11/681,401, Final Office Action mailed Oct. 29, 2009", 17.
"U.S. Appl. No. 11/684,430, Notice of Allowance mailed Dec. 11, 2009", 10.
"U.S. Appl. No. 11/681,401, Non-Final Office Action mailed Feb. 12, 2009", 13 pgs.
"U.S. Appl. No. 11/552,418, Non Final Office Action mailed Apr. 13, 2009", 16 pgs.
ISR, "International Search Report", (Feb. 26, 2009),all.
"U.S. Appl. No. 11/684,430, Non-Final Office Action mailed Jun. 22, 2009", 7 pgs.
"U.S. Appl. No. 11/737,717, Non-Final Office Action mailed Jul. 8, 2009", 12 Pgs.
Leventis, A. et al., "Intelligent DevicesforApplicances Controlin Home Networks", *IEEE Transactions onconsumer Electrionics*, vol. 49, No., (May 2, 2003),pp. 328-336.
"U.S. Appl. No. 11/875,916, Non-Final Office Action mailed Jul. 10, 2009", 7 pgs.
"U.S. Appl. No. 11/875,914, Non-Final Office Action mailed Jul. 9, 2009", 8 pgs.
"U.S. Appl. No. 11/684,442, Non-Final Office Action mailed Jul. 20, 2009", 13 pgs.
"U.S. Appl. No. 11/875,919, Non-Final Office Action mailed Jul. 24, 2009", 7 Pgs.
"U.S. Appl. No. 11/875,917, Non Final Office Action mailed Jul. 23, 2009", 17.
"U.S. Appl. No. 11/456,029, Final Office Action mailed Aug. 17, 2009", 15.
"U.S. Appl. No. 11/875,923, Non Final Office Action mailed Aug. 24, 2009", 12.
"U.S. Appl. No. 11/875,924, Non-Final Office Action mailed Aug. 28, 2009", 2 Pgs.
"U.S. Appl. No. 11/875,926, Non-Final Office Action mailed Sep. 11, 2009", 7 Pgs.
"U.S. Appl. No. 11/425,917, Final Office Action mailed Sep. 16, 2009", 12 Pgs.
"U.S. Appl. No. 11/875,927, Non-Final Office Action mailed Sep. 25, 2009", 7 pgs.
"U.S. Appl. No. 11/456,029, Non-Final Office Action mailed Nov. 12, 2008.", 9 pgs.
"U.S. Appl. No. 11/425,917, Non-Final Office Action mailed Nov. 25, 2008", 9 pgs.
"U.S. Appl. No. 12/691,244, Non-Final Office Action mailed Sep. 1, 2010", U.S. Appl. No. 12/691,244-NFOA NPL-36 Sep. 1, 2010 , 14 pgs.
"JP2009-518,642 English Translation", SN:JP2009518642-English NPL-54 Aug. 9, 2011 , pp. 1-2.
"U.S. Appl. No. 11/456,029, Non-Final Office Action mailed Aug. 30, 2012", U.S. Appl. No. 11/456,029-NFOA NPL-69 Aug. 30, 2012 , 29 pages.
"U.S. Appl. No. 12/691,244, Notice of Allowance Mailed Aug. 26, 2011", U.S. Appl. No. 12/691,244-NoA NPL-53 Aug. 26, 2011 , 8 pgs.
Tadayuki, Fukuhara et al., "Wireless Communication System, Wireless Communication Terminal, and Base Station", SN:JPN2005203991-English NPL-63 Jul. 28, 2005 , all.
"U.S. Appl. No. 12/691,244, Final Office Action mailed May 12, 2011", U.S. Appl. No. 12/691,244-FOA NPL-48 May 12, 2011 , 8 pgs.
"Application Serial No. JP2009-518,642, FOA", SN:JP2009518642 NPL-52 Aug. 24, 2011 , pp. 1-47.
"U.S. Appl. No. 11/681,401, Notice of Allowance mailed Jun. 8, 2012", U.S. Appl. No. 11/681,401-NoA NPL-65 Jun. 8, 2012 , 7 pages.
"U.S. Appl. No. 11/684,442, Notice of Allowance mailed Apr. 13, 2012", U.S. Appl. No. 11/684,442-NoA-041312 NPL-64 Apr. 13, 2012 , 13 pages.
"JPN 2009-518642, Final Office Action, English translation to follow", SN:JPN2009518642 NPL-61 Mar. 27, 2012 , pp. 1-2.
"JPN2004308096 Final Rejection—English Translation, original date of Notification of Rejection Aug. 19, 2011", SN:JP2004308096 NPL-62 Mar. 27, 2012 , pp. 1-2.
"U.S. Appl. No. 11/681,417, Notice of Allowance mailed Mar. 7, 2012", U.S. Appl. No. 11/681,417-NoA NPL-60 Mar. 7, 2012 , 8 Pgs.
ISR, "PCT/US2007/072949, ISR & WO", PCTUS2007072949 NPL-68 Jan. 15, 2009 , all pages.
"U.S. Appl. No. 12/198,250, Non-Final Office Action mailed Nov. 26, 2012", U.S. Appl. No. 12/198,250-NFOA-112612 NPL-70 , 20 Pgs.
"U.S. Appl. No. 11/456,029, Final Office Action mailed Jan. 24, 2013", 24 pages.
"U.S. Appl. No. 11/425,917, Notice of Allowance mailed Apr. 12, 2013", 23 pages.
"U.S. Appl. No. 13/296,730, Non-Final Office Action mailed Feb. 28, 2013", 24 pages.
"U.S. Appl. No. 13/296,730, Notice of Allowance mailed Jul. 12, 2013", 10 pages.
U.S. Appl. No. 11/425,917, Non-Final Office Action mailed Apr. 2, 2010, 15 pages.
U.S. Appl. No. 11/552,418, Final Office Action mailed Feb. 17, 2010, 27 Pgs.
U.S. Appl. No. 11/684,442, Final Office Action mailed Mar. 16, 2010, 23 pages.
U.S. Appl. No. 11/737,717, Final Office Action mailed Mar. 11, 2010, 18 pages.
U.S. Appl. No. 11/456,029, Non-Final Office Action mailed May 11, 2010, 19 pages.
U.S. Appl. No. 11/681,401, Non-Final Office Action mailed Jun. 9, 2010, 12 pages.
U.S. Appl. No. 11/737,717, Non-Final Office Action mailed Nov. 10, 2010, 18 pages.
U.S. Appl. No. 11/425,917, Non-Final Office Action mailed Oct. 13, 2010, 10 pgs.
U.S. Appl. No. 11/684,442, Non-Final Office Action mailed Oct. 4, 2010, 16 pgs.
U.S. Appl. No. 11/552,418, Notice of Allowance mailed Feb. 6, 2012, 13 pages.
U.S. Appl. No. 12/198,250, Non-Final Office Action mailed Mar. 31, 2011, 18 pages.
U.S. Appl. No. 11/456,029, Final Office Action mailed Jan. 19, 2011, 19 pages.
U.S. Appl. No. 11/681,401, Final Office Action mailed Dec. 22, 2010, 12 pages.
U.S. Appl. No. 11/681,417, Final Office Action mailed Mar. 4, 2011, 12 pages.
U.S. Appl. No. 11/552,418 Final Office action dated May 26, 2011, 33 pages.
U.S. Appl. No. 11/681,401, Non-Final Office Action mailed Apr. 22, 2011, 13 pages.
U.S. Appl. No. 11/737,717, Final Office Action mailed Jun. 30, 2011, 25 pages.
U.S. Appl. No. 11/456,029, Final Office Action mailed Apr. 27, 2011, 19 pages.
U.S. Appl. No. 11/684,442, Final Office Action mailed May 23, 2011, 22 pages.
U.S. Appl. No. 11/681,401, Final Office Action mailed Nov. 10, 2011, 20 Pgs.
U.S. Appl. No. 12/198,250, Final Office Action mailed Oct. 11, 2011, 11 Pgs.

* cited by examiner

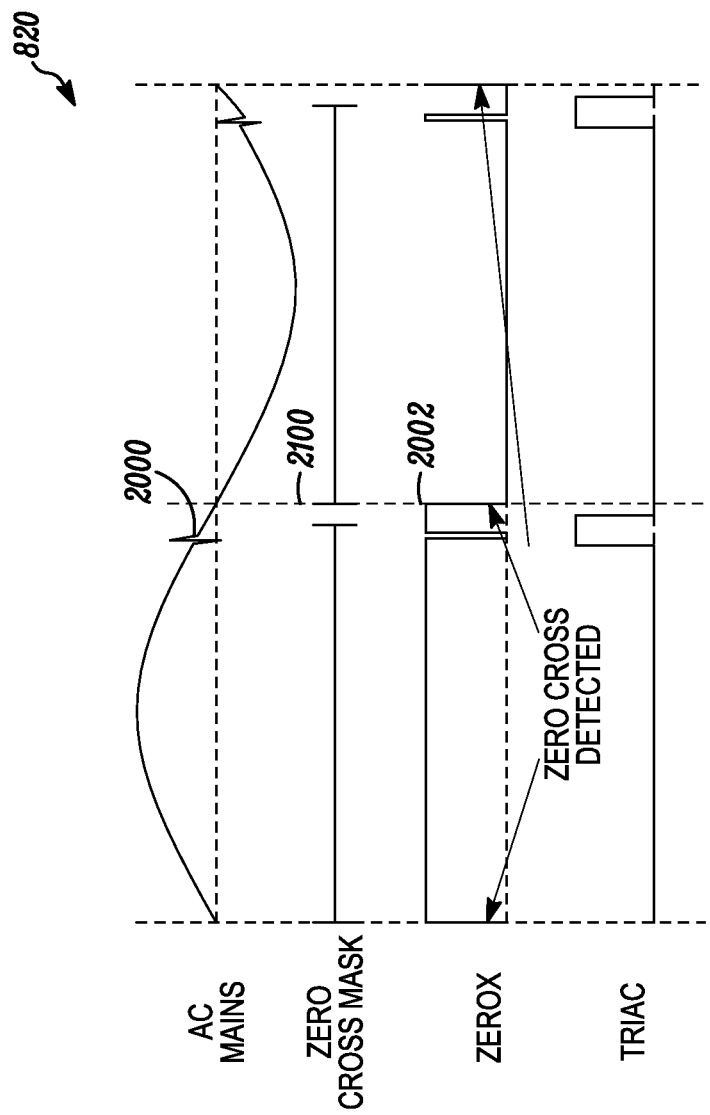

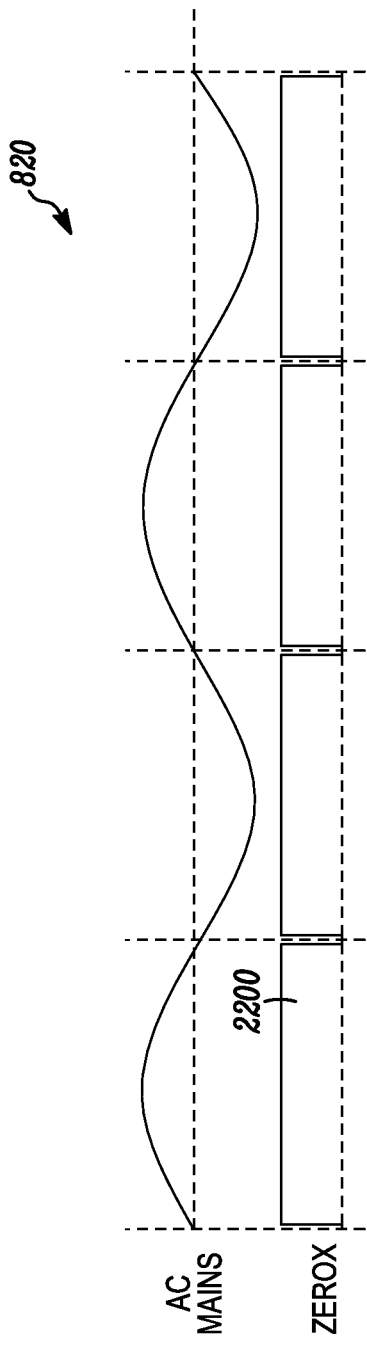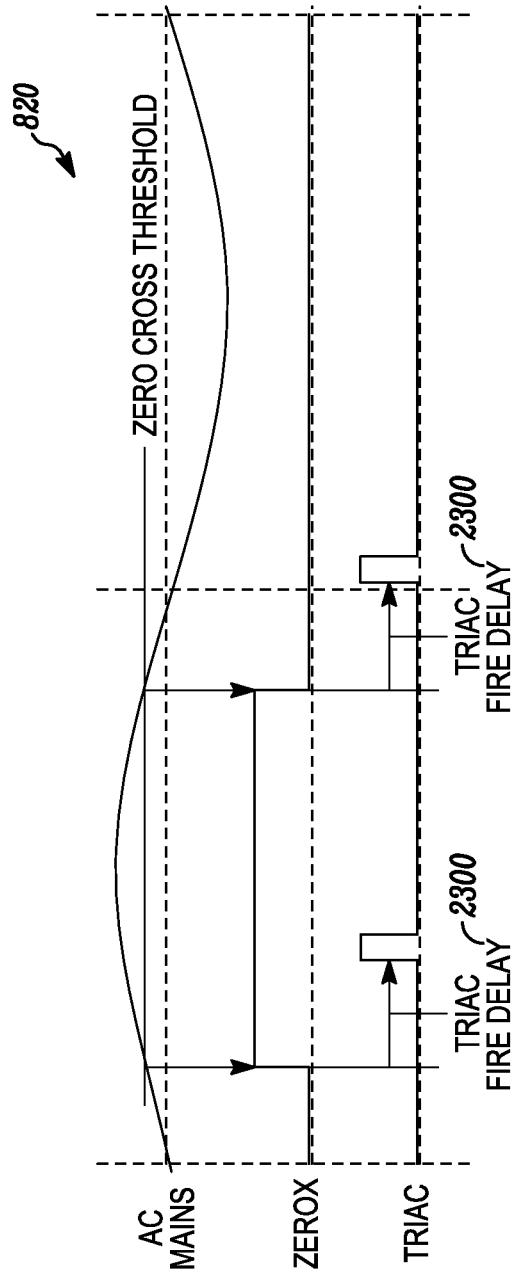

AUDIO-VISUAL SYSTEM CONTROL USING A MESH NETWORK

CROSS-REFERENCE TO RELATED APPLICATIONS

This application claims the benefit of the following U.S. Provisional applications, U.S. Prov. App. No. 60/968,258 filed on Aug. 27, 2007 and U.S. Prov. App. No. 60/984,522 filed on Nov. 1, 2007.

This application is a continuation-in-part of U.S. application Ser. No. 11/425,917 filed on Jun. 22, 2006, which claims benefit of U.S. Prov. App. No. 60/763,835 filed on Jan. 31, 2006; U.S. Prov. App. No. 60/764,394 filed on Feb. 1, 2006; U.S. Prov. App. No. 60/765,810 filed on Feb. 7, 2006; and U.S. Prov. App. No. 60/772,089 filed on Feb. 10, 2006.

This application is a continuation-in-part of U.S. application Ser. No. 11/456,029 filed on Jul. 6, 2006; U.S. application Ser. No. 11/552,418 filed on Oct. 24, 2006; U.S. application Ser. No. 11/681,401 filed on Mar. 2, 2007; U.S. application Ser. No. 11/681,417 filed Mar. 2, 2007, U.S. application Ser. No. 11/684,430 filed on Mar. 9, 2007; U.S. application Ser. No. 11/684,442 filed on Mar. 9, 2007, U.S. application Ser. No. 11/737,717 filed on Apr. 19, 2007, U.S. application Ser. No. 11/875,914 filed on Oct. 21, 2007, U.S. application Ser. No. 11/875,915 filed on Oct. 21, 2007, U.S. application Ser. No. 11/875,916 filed on Oct. 21, 2007, U.S. application Ser. No. 11/875,917 filed on Oct. 21, 2007, U.S. application Ser. No. 11/875,919 filed on Oct. 21, 2007, U.S. application Ser. No. 11/875,920 filed on Oct. 21, 2007, U.S. application Ser. No. 11/875,921 filed on Oct. 21, 2007, U.S. application Ser. No. 11/875,923 filed on Oct. 21, 2007, U.S. application Ser. No. 11/875,924 filed on Oct. 21, 2007, U.S. application Ser. No. 11/875,926 filed on Oct. 21, 2007, and U.S. application Ser. No. 11/875,927 filed on Oct. 21, 2007. Each of the foregoing applications is incorporated herein by reference in its entirety.

FIELD OF INVENTION

The invention herein disclosed generally refers to wireless networks, and specifically to methods and systems used at least in part to operate audio-visual equipment.

BACKGROUND

Wireless communication networks have limitations when used for building automation. Structural barriers that deflect or cause the radio frequency signals of wireless networks can prevent timely transmission on the network. Introduction of noise sources from other radio frequency sources contribute to a reduction in quality and reliability. However, wiring building automation devices is very costly and intrusive, while severely limiting in flexibility and expandability.

Therefore there exists a need for a robust communication network for building automation that overcomes the problems associated with wireless networks without the high costs and inconvenience of wired networks.

SUMMARY

In embodiments, the present invention provides a method and system for a home audio-visual system that is at least in part controlled through a mesh network, wherein the home audio-visual system produces at least two effects. Each of the at least two effects may be controlled through separate mesh network nodes responsive to user initiated instructions. Each of the separate mesh network nodes may be adapted to receive the user initiate instructions through a channel management operation.

In embodiments, a channel management operation may involve selecting a communication transmission speed, selecting a communication channel, performing source routing, performing an acknowledgement procedure, such as silent acknowledgement, or some other operation.

In embodiments, an effect may include an audio effect, a visual effect, a room darkening effect, an illumination effect, or some other effect.

In embodiments, a user initiated instruction may be adapted to control each of the at least two effects simultaneously. In embodiments, a single user initiated instruction may be adapted to control each of the at least two effects.

In embodiments, a home audio-visual system may include a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, the control and effect production of a home audio-visual system may be associated with a node that is further associated with a functionality, a plurality of functionalities, combination of functionalities, or plurality of functionality combinations. A functionality associated with the node may include speed control, including multi-speed node operations and the like, SIS, acknowledgement, battery functions, including battery-powered nodes, battery monitoring, rechargeable battery operations, and the like, node initiated repair, secondary channel enabling, remote association, security, source routing, controller replication, dual functionality (e.g., application and network), or some other functionality, as described herein.

In embodiments, a home audio-visual system may communicate information through a mesh network, wherein the home audio-visual system includes one or more electrical devices that produce the information. The home audio-visual system may be associated with a channel management operation that is associated with one or more nodes of the mesh network to effect the communication of the information.

In embodiments, the information may be communication to a user. The information may relate to an audio-visual system setting. In embodiments, the information may be control information intended to be used by at least one of the one or more electrical devices within the audio-visual system. In embodiments, the information may relate to metadata. In embodiments, metadata may be related to an image, a photo, audio, a music track, an audio broadcast, an audio book, a video, a movie, a video broadcast, a stored video, a live video, a digital video recorder file, a music video, audio-visual equipment, an appliance, a content directory, and other metadata types. Metadata may be a description of content being delivered, a rating, a title, a music title, a movie title, a publisher, a right, a plurality of rights, a genre, a language, a relation, a region, a radio call signal, a radio station, a radio band, a channel number, an image name, an artist name, a music track, a playlist, a storage medium, a contributor, a date, a producer, a director, a DVD region code, a channel name, a scheduled start time, a scheduled end time, an icon, and the like.

In embodiments, a channel management operation may involve selecting a communication transmission speed, selecting a communication channel, performing source routing, performing an acknowledgement procedure, such as silent acknowledgement, or some other operation.

In embodiments, the information communicated within a home audio-visual system may be associated with a node that is further associated with a functionality, a plurality of functionalities, combination of functionalities, or plurality of functionality combinations. A functionality associated with the node may include speed control, including multi-speed node operations and the like, SIS, acknowledgement, battery functions, including battery-powered nodes, battery monitoring, rechargeable battery operations, and the like, node initiated repair, secondary channel enabling, remote association, security, source routing, controller replication, dual functionality (e.g., application and network), or some other functionality, as described herein.

In embodiments, the information communicated within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, a media server may be enabled to control the delivery of a plurality of media content streams to a plurality of electrical devices, wherein the media server is adapted to be controlled through a mesh network node using a mesh network channel management operation. In embodiments, a command to the media server through the mesh network node may be transmitted in response to a user initiated instruction input to a hand held remote control, causing the mesh network node to receive the user initiated command through manipulation of a channel control operation. In embodiments, the media server may control the delivery of at least one of the plurality of media content streams to at least one of the plurality of electrical devices based on the user initiated command.

In embodiments, a channel management operation may involve selecting a communication transmission speed, selecting a communication channel, performing source routing, performing an acknowledgement procedure, such as silent acknowledgement, or some other operation.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF FIGURES

The invention will be more fully understood by reference to the detailed description, in conjunction with the following figures, wherein:

FIG. 21 shows a masking of zero cross detection;

FIG. 22 shows the timing of a zero cross detect output;

FIG. 23 shows Triac fire delay from zero cross detect;

DETAILED DESCRIPTION

The present invention relates to a reliable and low-cost control and monitoring technology which enables embedded intelligence and wireless communication for a variety of residential and light commercial applications such as lighting and appliance control, automated meter reading, thermostat and ventilation control, security, and residential gateway connectivity. In embodiments, a mesh network node may transform any stand-alone device into an intelligent networked device that may be controlled and monitored wirelessly. The mesh network delivers high reliability networking at a fraction of the cost of other technologies by focusing on narrow bandwidth applications and substituting costly hardware with innovative software solutions such as frame acknowledgement, retransmission, collision avoidance, frame checksum, and sophisticated routing algorithms to assure full home coverage.

One of the key features of the mesh network technology is the routing capability of all the nodes in the network. The mesh network automatically routes the signal from one node to the next thereby extending the range. Rather than depending solely on line-of-sight communications like other technologies, the mesh network is able to get around obstacles by routing commands through other device-nodes in the network when required. The mesh network technology also minimizes noise and distortion problems caused by architectural obstacles and radio dead spots using innovative transmission techniques such as 2-way acknowledgement and alternative route seeking.

Figure 1:
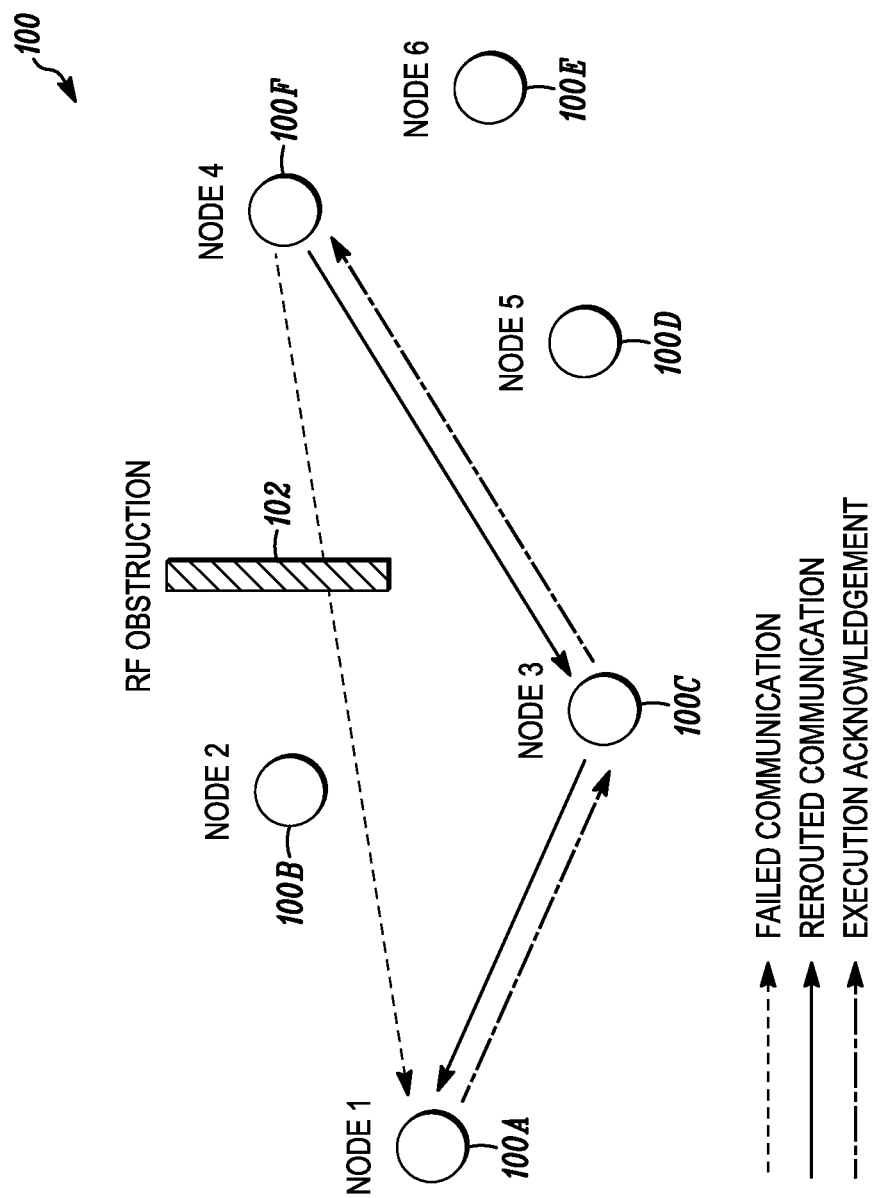
FIG. 1 illustrates a mesh network which includes a number of network nodes.

For example, FIG. 1 illustrates a mesh network 100 which includes a number of network nodes. The user may command a light associated with Node1 100A in a garage to turn off from Node4 100F in a master bedroom. If the direct transmission to Node 1 100A is blocked by some Radio Frequency (RF) obstruction 102 (e.g. a stainless steel refrigerator in a kitchen) Node4 100F automatically selects an alternate route, such as through Node3 100C (e.g. a thermostat in a hallway), rerouting as many times as is necessary to complete delivery of a command. An acknowledgement is then sent back to Node4 100F confirming that the command has been executed by Node1 100A.

The mesh network infrastructure is decentralized, with nodes running as both client and as repeater to avoid central points of failure and control. Every new component that is added to the network increases path redundancy and reliability, with the degree of redundancy and signal strength increasing as a function of node density. If the distance between nodes is decreased by a factor of two, the resulting signal is at least four times more powerful at the receiver.

A mesh network is also self-organizing and doesn't require manual configuration. Because of this, adding new equipment or relocating existing equipment may be as simple as plugging it in and turning it on. The network discovers the new node and may automatically incorporate it into the existing system. The mesh network technology may provide vastly improved area coverage and reliability with virtually unlimited range.

Figure 2:
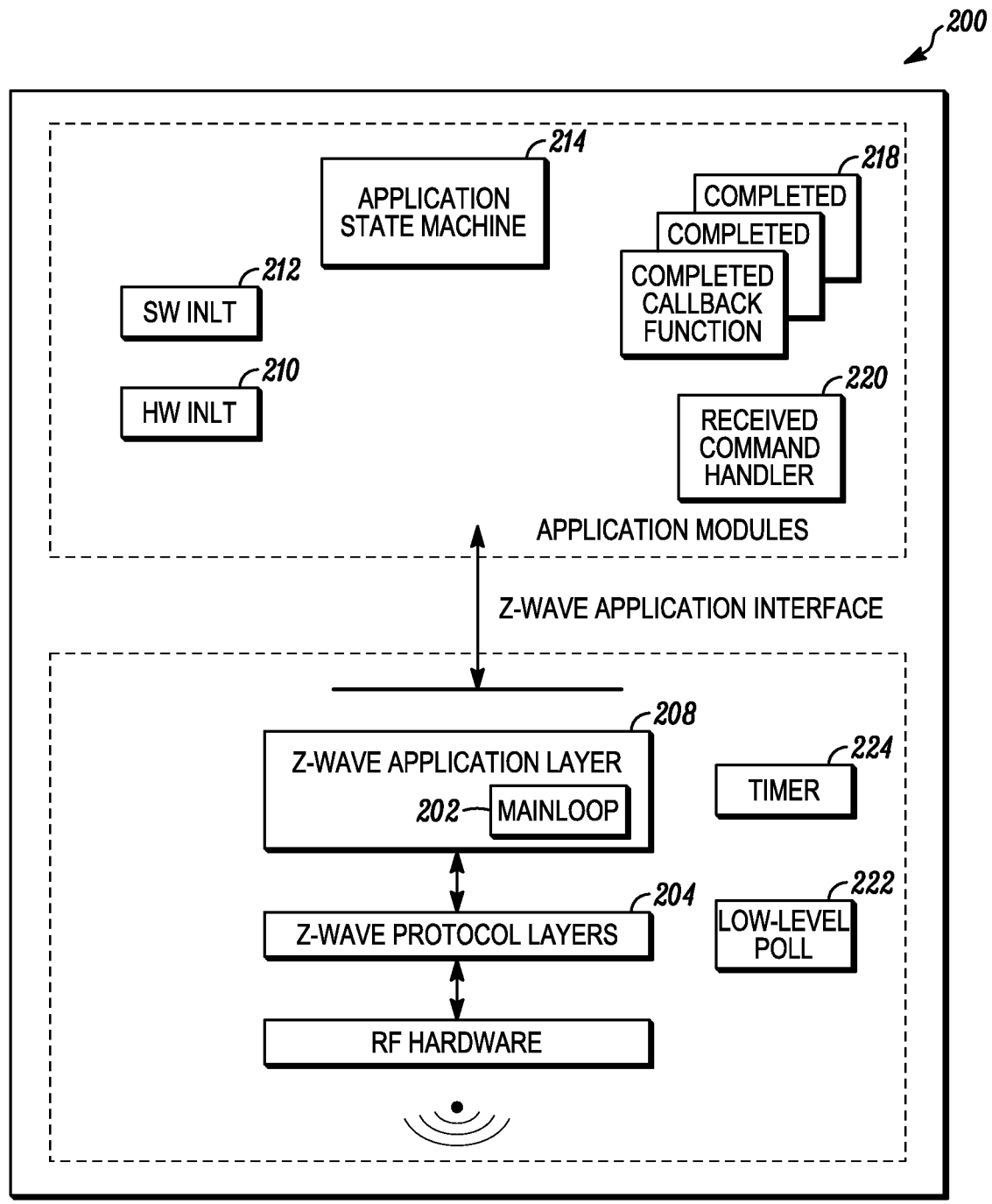
FIG. 2 illustrates a schematic of mesh network and node control software.

Referring to FIG. 2, mesh network software 200 may be designed on polling of functions, command complete callback function calls, and delayed function calls. Software 200 may be split into two groups of program modules: basis software and application software. Basis software may include system startup code, low-level poll function 222, main poll loop 202, protocol layers 204, and memory and timer 224 service functions. Application software may include application hardware initialization 210 and software initialization 212 functions, application state machine 214, command complete callback functions 218, and a received command handler 220 function. The application software may also include hardware drivers.

Main loop 202 may call a list of protocol functions. Functions may be designed to return to the caller as fast as possible to allow the Central Processing Unit (CPU) to do other tasks. It is possible to receive data, transfer data via the Universal Asynchronous Receive Transmit (UART) and check user-activated buttons simultaneously.

When the application layer 208 requests a transmission of data to another node in network 100, the protocol layer may add a frame header and a checksum to the data before transmission. The protocol layer may also handle frame retransmissions, as well as routing of frames through repeater nodes to nodes that are not within direct RF reach. When the frame transmission is completed an application specified transmit complete callback function 218 may be called. The transmission complete callback function 218 may include a parameter that indicates the transmission result.

Application layer 208 may provide the interface to the communications environment which is used by the application process. The application software may consist of the following functions: the hardware initialization function 210, software initialization function 212, application state machine 214, command complete callback functions 218, and a receive command handler function 220. The application implements communication on the application level with other nodes in network 100. At the application level may be a framework defined of device and command classes to obtain interoperability between mesh network enabled products from different vendors. The basic structure of these commands may provide the capability to set parameters in a node and to request parameters from a node responding with a report containing the requested parameters.

Wireless communication is by nature unreliable because a well defined coverage area simply does not exist since propagation characteristics are dynamic and unpredictable. The mesh network protocol may minimize noise and distortion problems by using a transmission mechanism that may include two re-transmissions to ensure reliable communication. In addition, single casts are acknowledged by a receiving node so the application is notified about how the transmission went.

Figure 3:
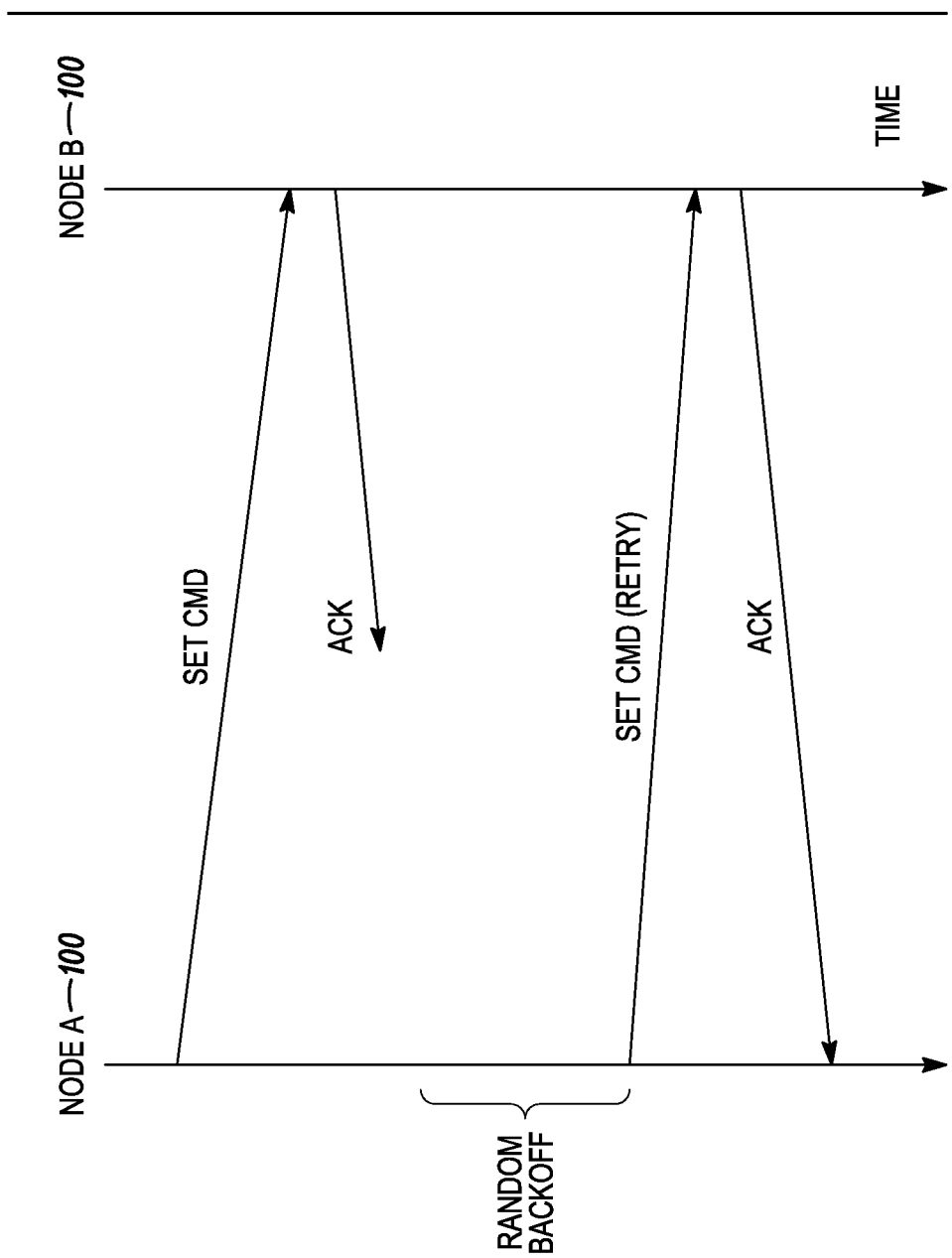
FIG. 3 shows an example of a type of re-transmission hand shaking.
Figure 4:
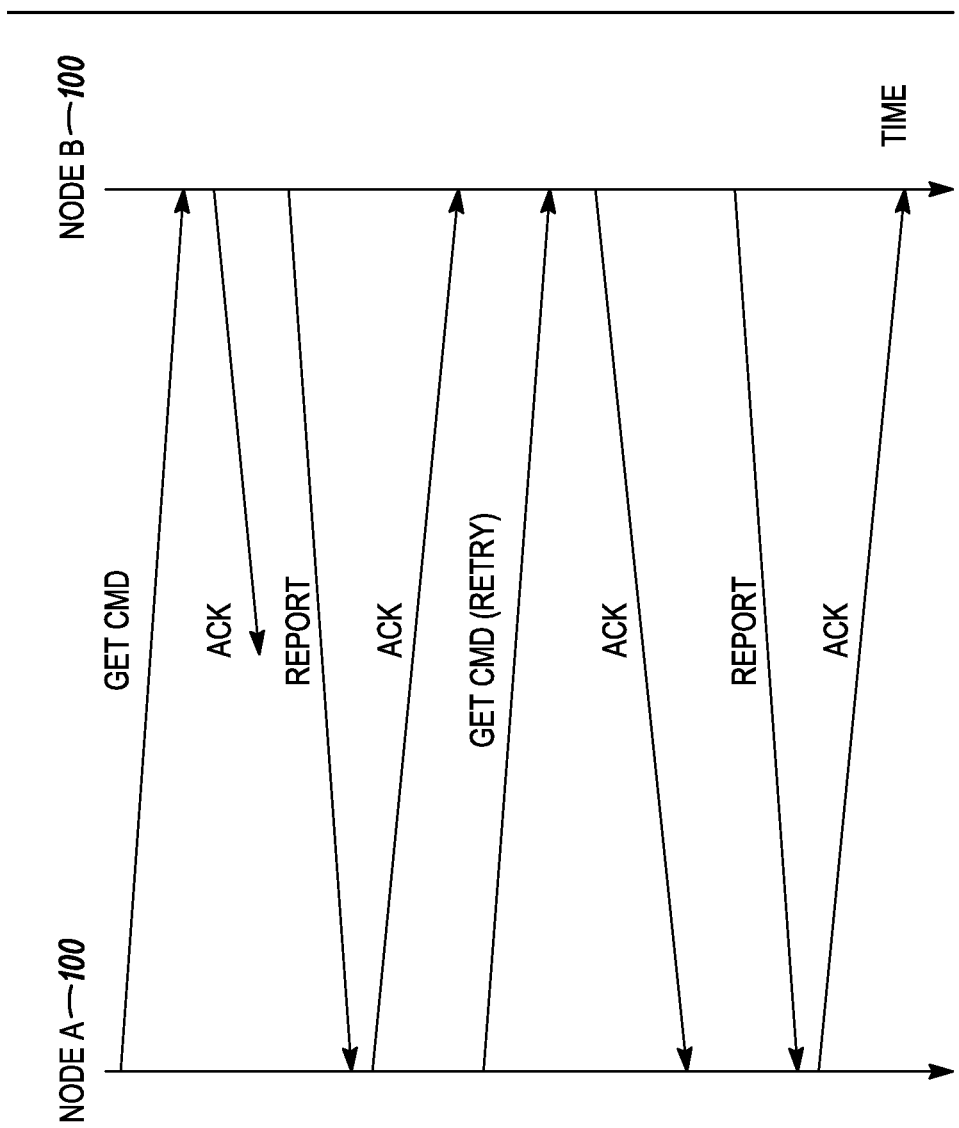
FIG. 4 shows an example of a type of re-transmission hand shaking.

FIGS. 3 and 4 show examples of this type of re-transmission hand shaking. The mesh network protocol may be designed to trade low latency at the expense of handling simultaneously communication to a number of nodes in the network. To obtain this the number of random backoff values is limited to 4 (0, 1, 2, and 3).

Figure 5:
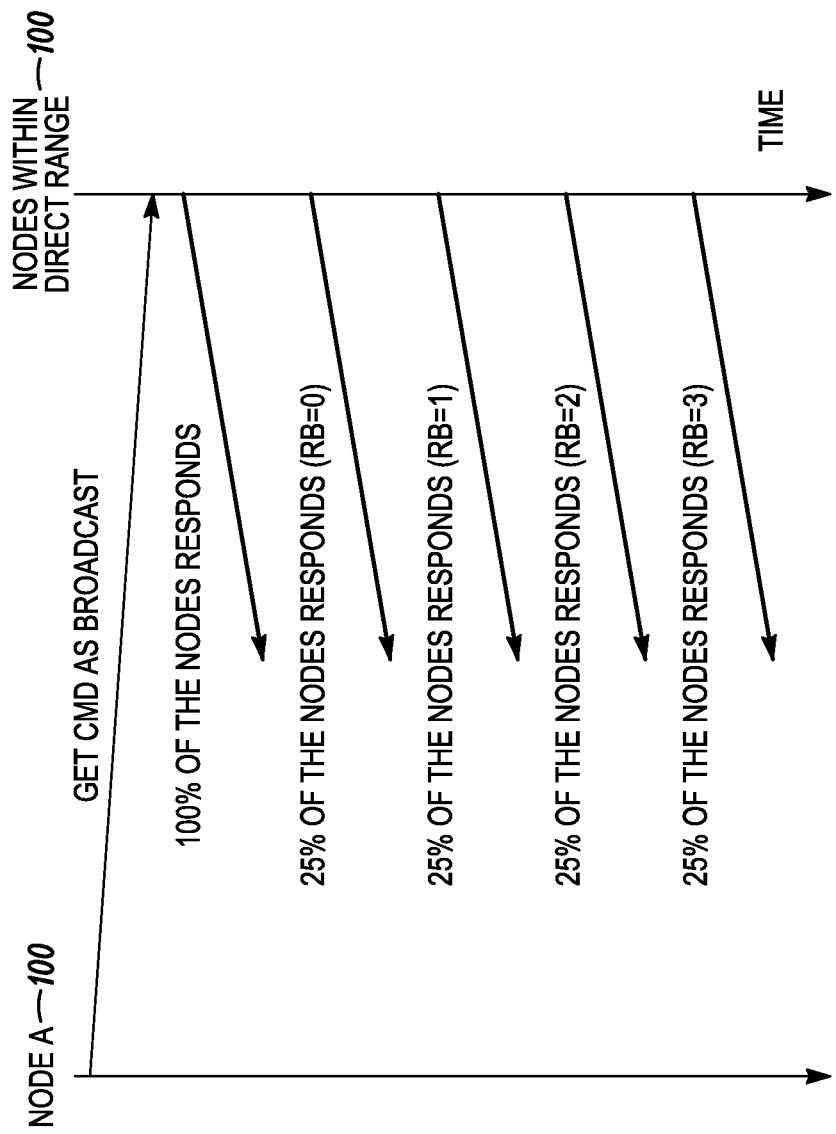
FIG. 5 shows how simultaneous communication to even a small number of nodes impacts communication on a mesh network.

FIG. 5 shows how simultaneous communication to even a small number of nodes 100 may block the communication completely. Simultaneous communication to nodes in the network which require a response from the nodes in question should therefore be avoided in the application.

From a protocol point of view there may be many different types of nodes, for example: Control nodes, Static Controller nodes, Installer Controller nodes, Controller bridge nodes, Slave nodes, Routing Slave nodes, and Enhanced Slave nodes. Controller nodes may store information about other nodes in the network. The node information includes the nodes each of the nodes can communication with (routing information). The Installation node may present itself as a Controller node, which may include extra functionality to help a professional installer setup, configure, and troubleshoot a network. The Controller bridge node may store information about the nodes in the network and in addition it may generate Virtual Slave nodes. A virtual Slave node is a node residing on another network accessible through the bridge.

A network may consist of slaves, a primary controller, and secondary controllers. New nodes may be added and removed to or from the network by using the primary controller. This may cause secondary controllers and routing slaves to malfunction if, for instance, a preferred repeater node is removed. Without automatic network updating a new replication has to be made from the primary controller to all secondary controllers, routing slaves should also be manually updated with the changes. In networks with several controller and routing slave nodes, this could cause difficulties the process is not automated. To automate the process, an automatic network update scheme may be included in the network protocol. To use this scheme a static controller could be available in the network. This static controller may be dedicated to hold a copy of the network topology and the latest changes that have occurred to the network. The static controller used in the automatic update scheme is called the Static Update Controller (SUC).

Each time a node is added, deleted or a routing change occurs, the primary controller may send the node information to the SUC. Secondary controllers may then ask the SUC if any updates are pending. The SUC may then in turn respond with any changes since last time this controller asked for updates. On the controller requesting an update may be called to notify the application that a new node may have been added or removed in the network. The SUC may hold a large number of changes of the network. If a secondary controller requests an updated after more than the maximum changes occurred, then it may not get updates and the request may fail. In this situation a manual replication from the primary controller may be necessary to update information on the secondary controller. Routing slaves may have the ability to request updates for its known destination nodes. If any changes have occurred to the network, the SUC may send updated route information for the destination nodes to the Routing slave that requested the update. The Routing slave application may be notified when the process is done, but may not get information about changes to its routes. Routing slaves may have the ability to request updates for its known destination nodes. If any changes have occurred to the network, the SUC may send updated route information for the designation nodes to the Routing slave that requested the update. The Routing slave application may be notified when the process is done.

A network can optionally have a SUC with enabled node ID server functionality (SIS). The SIS enables other controllers to include/exclude nodes in the network on its behalf. This makes it easier to install complex networks because multiple controllers support inclusion of nodes instead of one dedicated primary controller.

The SIS is the primary controller in the network and it has the latest update of the network topology and capability to include/exclude nodes in the network. Further, it is safer to keep the latest network topology on the SIS (static controller) than a portable primary controller used extensively during network installation. In embodiments, a network may contain only one SIS. A primary controller can instruct a SUC to enable the node ID server functionality (SIS). In case the SUC is primary then the SUC application can enable the node ID server functionality locally.

When including additional controllers to a network containing a SIS they may become inclusion controllers and as such they may obtain the capability to include/exclude nodes in the network on behalf of the SIS. Both portable and static controllers can be inclusion controllers. The inclusion controller's network topology data may be dated from last time a node was included or the last time it requested a network update from the SIS and therefore it may not be classified as a primary controller.

Figure 5A:
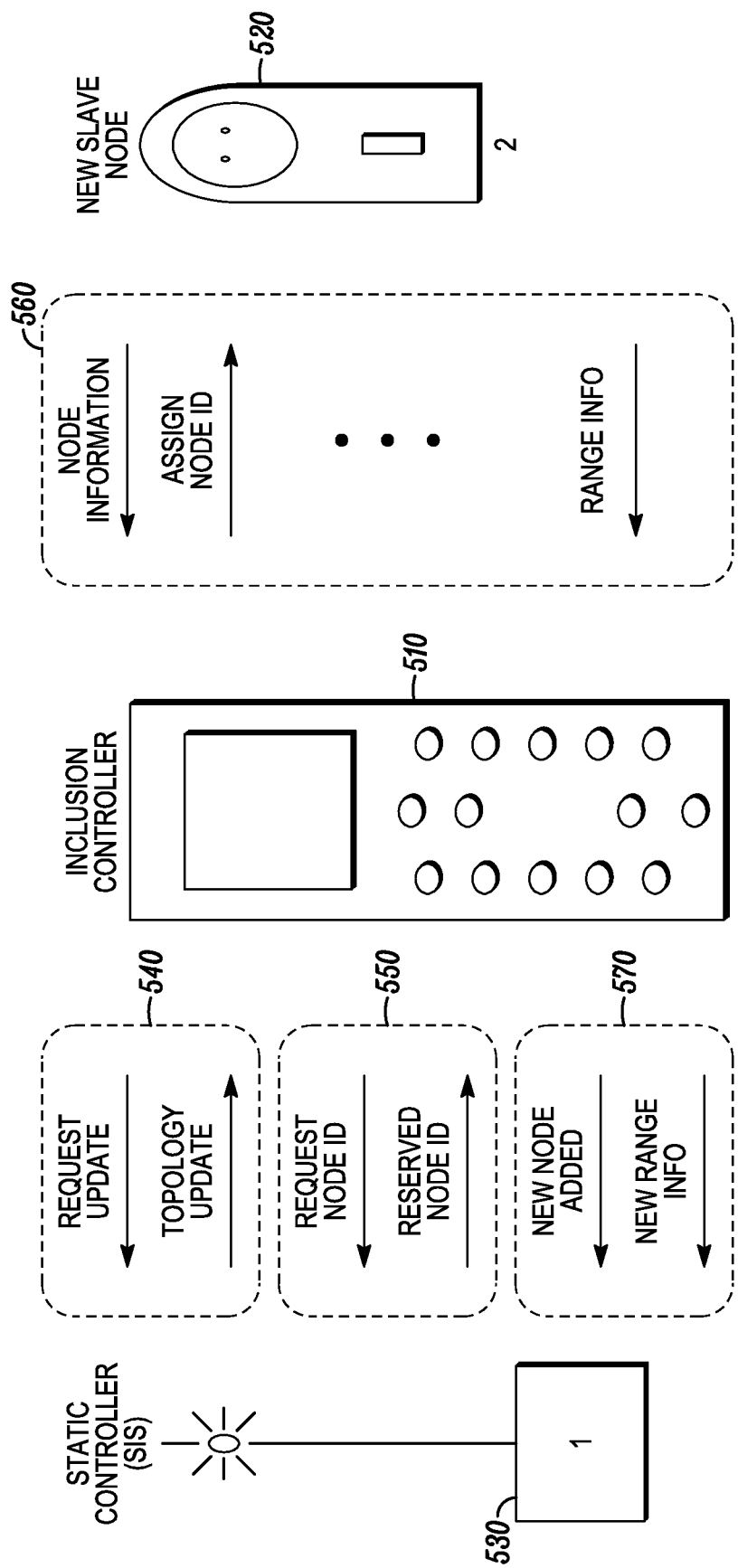
FIG. 5A shows an inclusion controller used to include a new slave on behalf of the network SIS.

FIG. 5A shows an inclusion controller 510 used to include a new slave node 520 on behalf of an SIS 530. Inclusion controller 510 performing the inclusion may first request the latest network topology changes 540 and a free node ID 550 from SIS 530. Inclusion controller 510 may receive node information and range information 560 from newly included slave 520 and may forward such information 570 onto SIS 530. In embodiments, inclusion controller 510 may be within direct range of the node to include.

A failing node may be replaced with a node inheriting the node ID from the failed node. Thereby the user avoids updating nodes having associations to the failed node. Associations within the failed node may be re-established in the new node.

Software components of a system according to the present invention may allow a routing slave to extend to a particular number of destinations (e.g. five) having return routes in very low latency applications. In embodiments a routing slave may need to support more than the particular number of destinations and this may require the controller to support favoring return routes for destinations out of direct range with the routing slave. In embodiments, software components may enable a controller to determine if two nodes are within direct range. A routing slave can request new return route destinations from the SUC/SIS node in case the available return routes fails. Furthermore the routing slave can check if a node ID is within direct range in any of the existing return routes.

A software component may be used to cancel ongoing routing attempts. This software component can be used to abort a transmission to a malfunctioning node, thereby eliminating a large amount of routing attempts in a large network.

The software components of a mesh network controller may be split into the controller application and the controller basis software, which may include the mesh network protocol layers and control of the various data stored into memory. Controller nodes may include an external memory in which the application data area may be placed. The controller node may have a unique home ID number assigned, which may be stored in the basis area of memory. When the new slave nodes are registered to the mesh network, the controller node may assign the home ID and a unique node ID to the slave node. The slave node may store the home ID and the node ID. When a controller is primary, it may send any network changes from the SUC node. The use of macros while developing application software may allow adjustments to the interface without changing the application source files.

The software components of a mesh network static controller node may be split into a static controller application and the static controller basis software, which may include the mesh network protocol layers and control of the various data stored into memory. The difference between the Static Controller Node and the Controller Node is that the static controller may not be powered down, that is it may not be used for battery-operated devices. The static controller may have the ability to look for neighbors when requested by a controller. This ability may make it possible for a primary controller to assign static routes from a routing slave to a static controller. The static controller may be set as a SUC node, so it may send network topology updates to any requesting secondary controller. A secondary static controller not functioning as SUC may also request network topology updates.

The software components of a mesh network installer controller may be split into an installer controller application and static controller basis software, which includes the mesh network protocol layer. The installer controller may be a mesh network controller node, which incorporates extra functionality that may be used to implement controllers especially targeted towards professional installers who support and setup a large number of networks.

The software components of a mesh network controller bridge node may be split into a controller bridge application and basis software, which may include the mesh network protocol layer. The controller bridge node may be a mesh network static controller node, which incorporates extra functionality targeted for bridging between the mesh network and other networks.

The software components of a mesh network slave node may be split into a slave application and basis software, which may include the mesh network protocol layer. Slave nodes may have a block of memory reserved for storing data, and may have limited direct access to the block. The home ID and node ID of a new node may be zero. When registering a slave node to a mesh network the slave node may receive home and node ID from the networks primary controller node. These ID's may be stored in the basis data area in memory. The slave may send unsolicited broadcasts and non-routed singlecasts. Further it may be able to respond with a routed singlecast (response route) in case another node has requested this by sending a routed singlecast to it. A received multicast or broadcast may result in a response route without routing.

Figure 6:
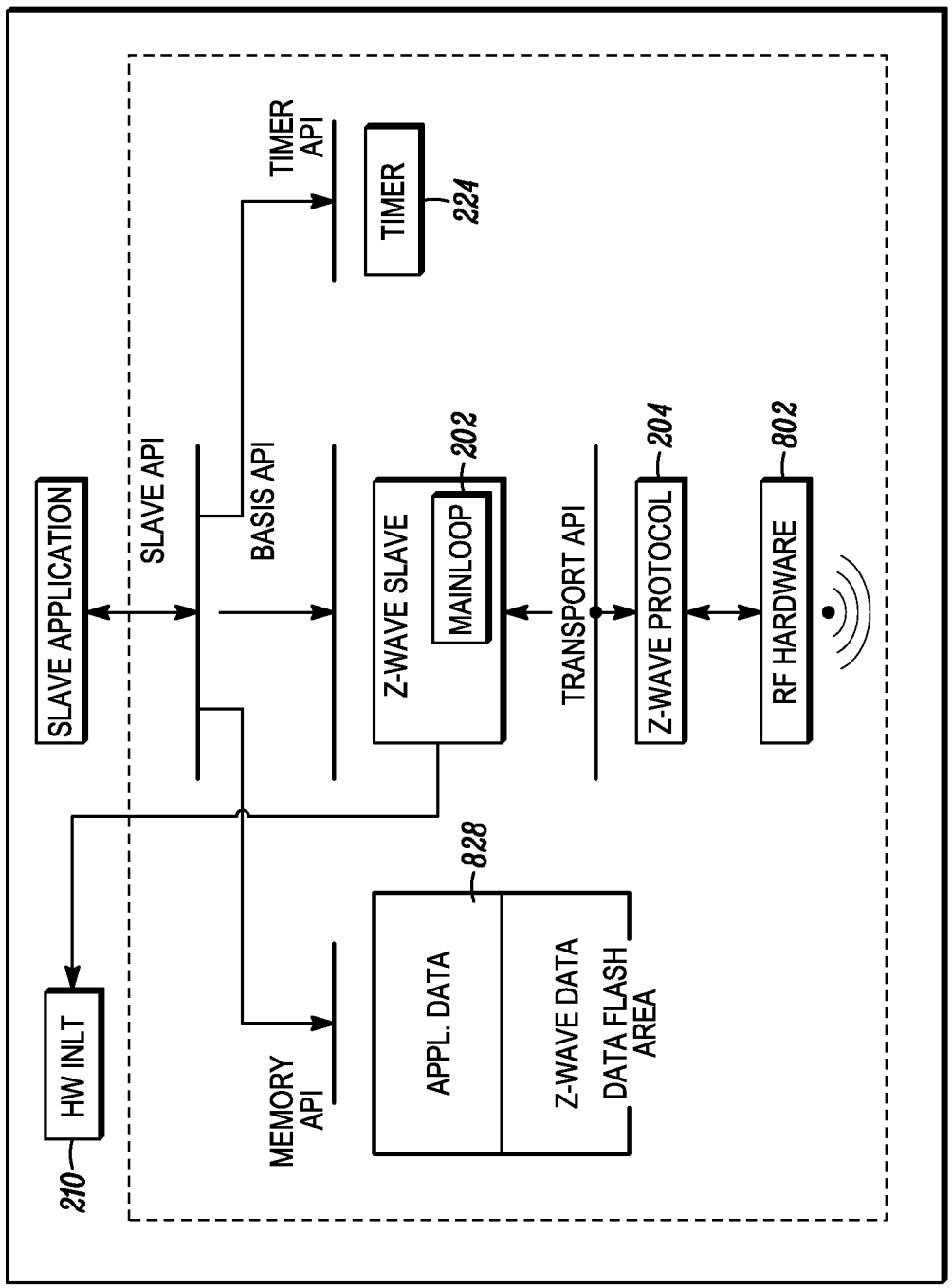
FIG. 6 shows software components of a mesh network split into a slave application and basis software.

FIG. 6 shows how the software components of a mesh network routing slave node may be split into a slave application and basis software, which may include the mesh network protocol layer. Routing slave nodes have a block of memory reserved for storing data, and may have limited direct access to the block. The mesh network basis software may reserve the first part of this area, and the last part of the area may be reserved for the application data. The home ID and node ID of a new node may be zero. When registering a slave node to a mesh network the slave node may receive home and node ID from the network's primary controller node. These ID's may be stored in the mesh network basis data area in memory. The routing slave may send unsolicited broadcasts and single casts (routed or non-routed). Further it may respond with a routed singlecast (response route) in case another node has requested this by sending a routed singlecast to it. A received multicast or broadcast results in a response route without routing.

Figure 7:
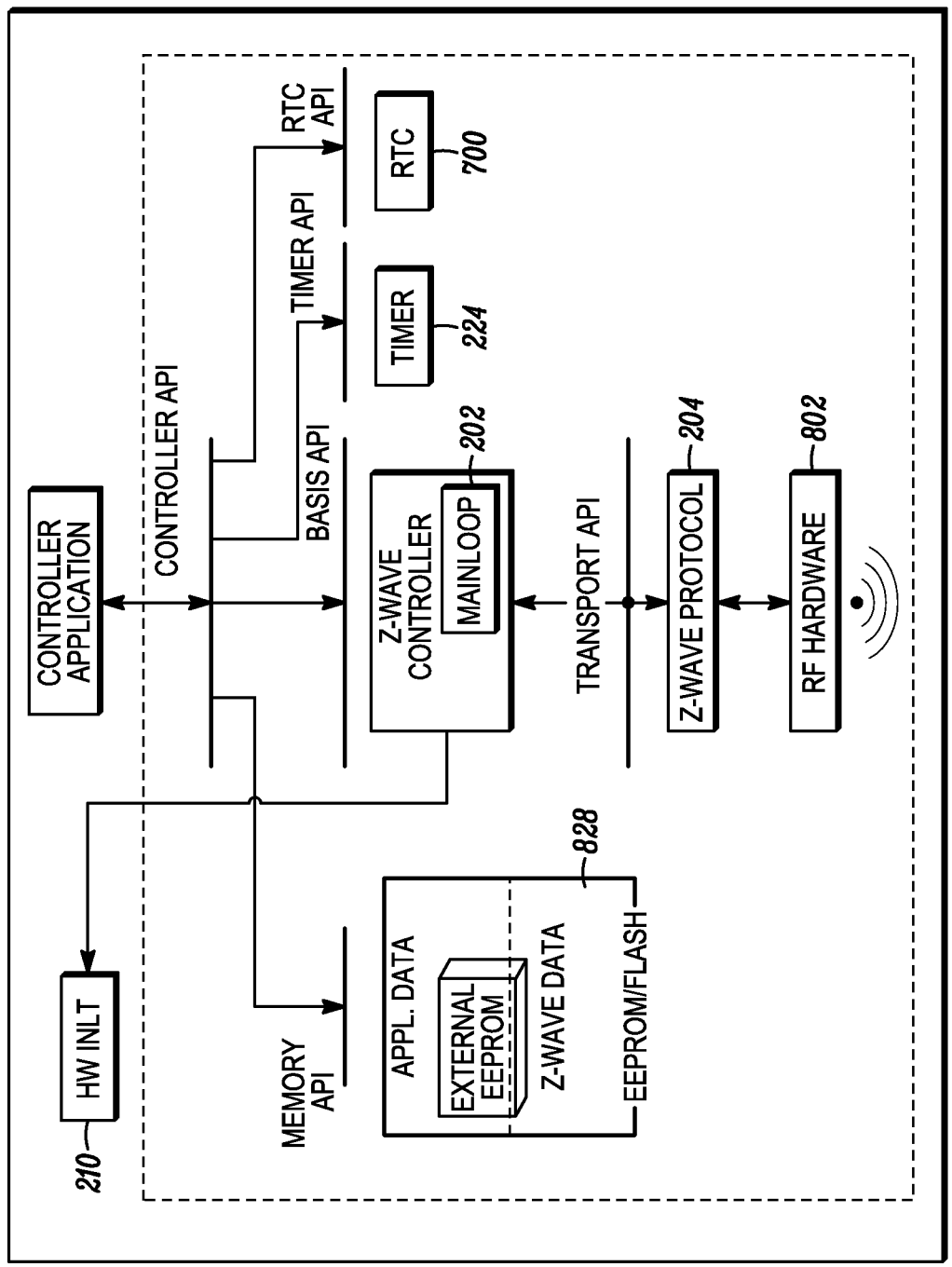
FIG. 7 shows controller node software features.

FIG. 7 shows how the enhanced slave node may have the same basic functionality as a routing slave node, but because it may have more features on the hardware, more software components may be available. Enhanced slave nodes may have an external memory and a Real-Time Clock (RTC) 700 and Wake-Up Timer (WUT) 824. The basis software may reserve the first area of external memory, and the last area of external memory may be reserved for the application data.

An internal ring oscillator is used as a base for a wake up timer. The oscillator has a very low power consumption but is highly dependant on temperature, supply voltage and process variation. In order to compensate for the high variation a calibration circuit is built into the chip. The calibration circuit measures the oscillation frequency against the system clock and derives a calibration constant. As the ring oscillator runs at several kHz the calibration is as fast compared to wake up period. The calibration is performed automatically before entering WUT mode (wake up timer mode).

Figure 8:
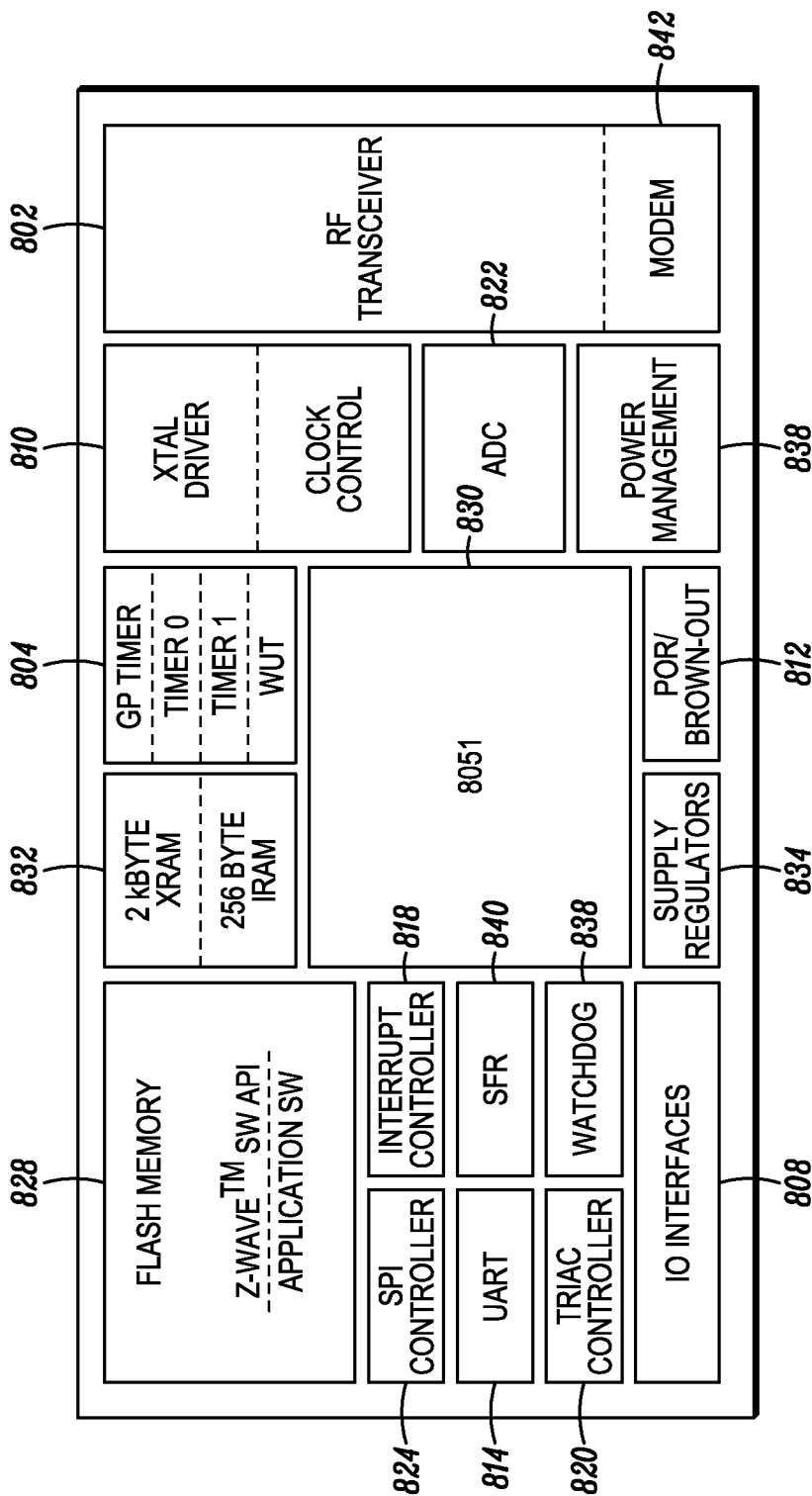
FIG. 8 shows a block diagram of the a mesh network node.

A node in mesh network 100 may be implemented with a single integrated circuit (e.g. an IC, ASIC, FPGA, etc.). FIG. 8 shows a block diagram of the a mesh network node, which may consist of many sub-components such as an integrated RF transceiver 802, an 8051 Microcontroller Unit (MCU) 830 with Random Access Memory (RAM) 832, mesh network software Application Programming Interface (API) 828, and memory storage for user application software 828 such as Flash memory. In addition to these major functional blocks a single chip implementation may contain an Analog-to-Digital Converter (ADC) 822, general purpose Input/Output (I/O) pins 808, Power-On Reset (POR) circuit/brown-out detector 812, Triac controller 820, Serial Peripheral Interface (SPI) 824, interrupt controller, and UART 814 serial interface for connecting to peripheral devices. Such a device may be designed for very low power and low voltage applications and highly optimized for battery-powered applications and easy integration to products with demanding size constraints.

Supply regulators 834 regulate the external supply down to a low internal voltage supply. Supply regulators 834 may significantly improve supply noise tolerance of the chip.

A single chip implementation of the embodiment of FIG. 8 may run on a system clock that is derived from an XTAL. For example, clock control 810 divides an external crystal (not shown) into two internal clocks. In the preferred embodiment of FIG. 1, an external crystal of either 16 MHz or 32 MHZ would allow clock control 810 to generate an 8 MHz clock for RF circuits and a 16 MHz clock for MCU 830 and peripherals. Alternatively, clock control 810 may interface to an external crystal controlled oscillator.

The POR circuit 812 may eliminate the need for external reset circuitry, holding reset during power-on and brown-out situations. POR 812 may be designed with glitch immunity and hysteresis for noise and transient stability. POR 810 circuit may have extremely low power consumption and is active even in a sleep mode.

Figure 9:
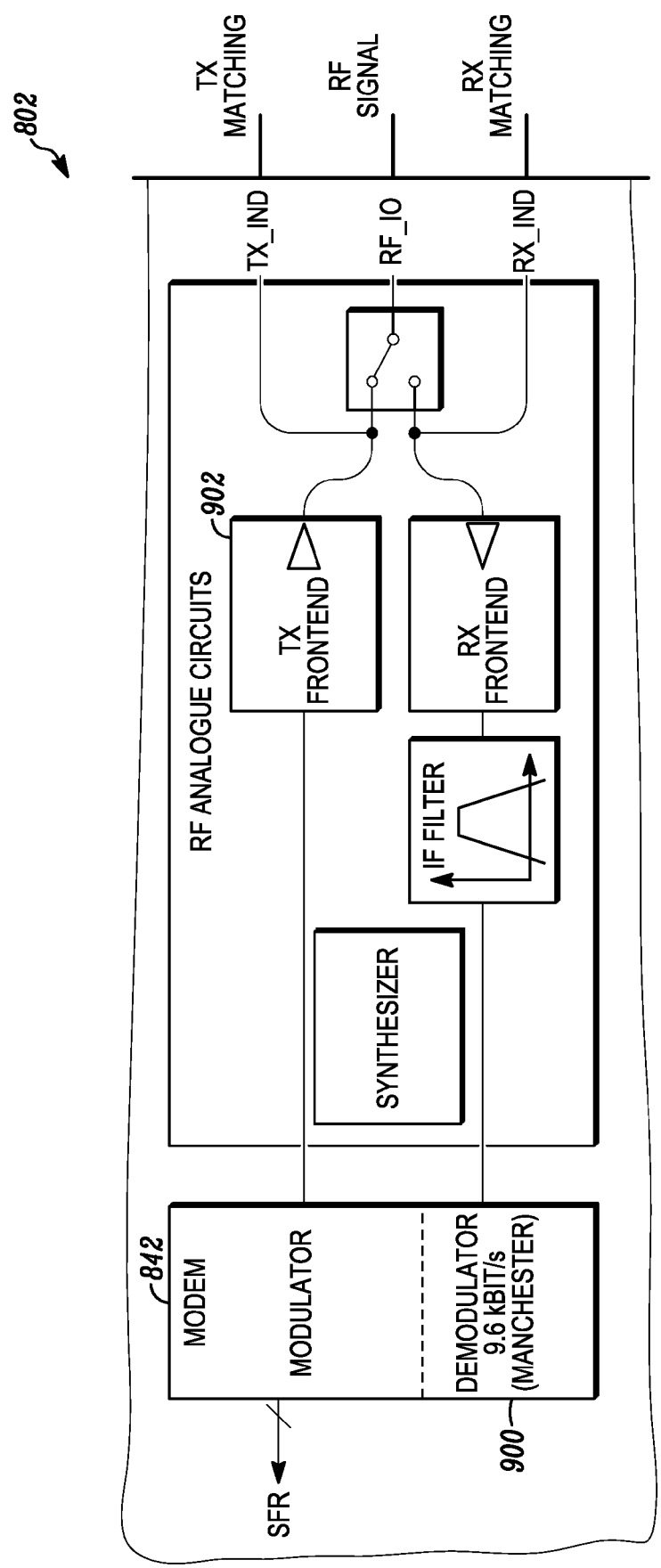
FIG. 9 illustrates a block diagram of a transceiver and RF modem.

Referring further to FIG. 8 and FIG. 9, a transceiver 802 may be able to transmit and receive Manchester coded data 9.6 kbits. FIG. 9 shows the invention communicating NRZ coded data at approximately 40 kb/s. RF transceiver 802 may handle all the RF related functions such as Manchester encoding/decoding 900, pre-ample detection and serialization/deserialization. The output power of the transmitter Power Amplifier 902 may be adjustable in steps of 2 dB. The different parts of the RF transceiver 802 may be powered up and down so only the required circuits may be powered at a time. The RF transceiver 802 may only need external components for input and output matching. A block diagram of the Transceiver 802 including RF modem 842 is given in FIG. 9.

Transceiver 802 includes multiple parallel receive demodulators, each for detecting a different received communication signal frequency, enabling the single chip embodiment to operate in an environment with a plurality of communication signal frequencies as may occur in networks of current and older technology devices, and/or different types of devices. The multiple demodulators are configured to receive output signals from RF transceiver 802 interface, allowing the first demodulator that detects a valid signal to take control, thus transparently receiving a signal at any of a plurality of supported data rates, without prior negotiation with an external device. No communication overhead results from supporting multiple receive data frequencies, allowing fast reception of unsolicited transmissions from unknown sources.

An auto-speed receiver may include feeding the output of one radio front-end to multiple demodulators, each for a different data rate, and then allowing the first demodulator detecting a valid signal to take control, thus transparently receiving a signal at any of the supported data rates without prior negotiation. This results in benefits including no overhead from using multiple data rates, and fast reception of unsolicited transmissions from unknown source without overhead of data rate negotiation.

The solution provides seamless installation of nodes only supporting multi-speed nodes (e.g. 9.6 kbps and 9.6/40 kbps) in the same network. The transceiver 802 is used to detect speed (e.g. 9.6/40 kbps) of the frames received to make a speed independent receiver. In embodiments, an optimal speed (e.g. fastest speed) to the destination node may be known (e.g. through testing and storing of information in association with a routing table) and a transmitting node may transmit at the optimal speed.

The transmitter side may use a method where the highest known speed that can be used to reach the end destination will be used. In embodiments, a controller may send a multicast frame using the optimal speed. For example, if a transmitter knows all destination nodes of a multicast frame supports 40 kbps, the transmitter will transmit the multicast at 40 kps. As a further example, to ensure all nodes within direct range of a transmitter receive a broadcast frame, a transmitter will send a the broadcast frame at 9.6 kbps A transmitting controller may select a specific route of nodes for a single cast or a routed single cast frame based on the route comprising only nodes which support a preferred transmission speed. For example, if a transmission controller can determine a route of nodes in which all the nodes support 40 kbps, the controller may select this route for a routed single cast frame. Alternatively if such a route cannot be determined, the controller will transmit at the optimal speed for any route. Continuing the example of above, in such a route the controller would transmit a single cast or routed single cast frame at 9.6 kbps.

Likewise the controller may try to achieve the highest possible speed when assigning return routes to a routing slave. Since a routing slave may store the speed for each route to a destination, a routing slave can have a mixed set of stored speeds (e.g. 40 kbps and 9.6 kbps) for routes to each destination.

A node information frame or a transfer presentation frame may be sent out at a low speed (for example 9.6 kbps) to allow nodes that support only the low speed, or nodes that support a plurality of speeds, to be included/excluded by the controller.

In embodiments, channel selection may be dynamically performed locally on each node without need of distributing network information, nor requiring user intervention. Dynamic channel selection may not require additional installation steps. The dynamic nature may also enable the network to maximize the usage of free communications slots on the available channels. The nodes in the network may listen on the available channels based at least in part on a predefined algorithm (e.g., limited to round robin). A node may select a next communication channel, and stay on each selected channel for a predefined duration. The node may stay on the selected communication channel and receive messages. Once the node is ready to receive new frames, it may once again select a next communication channel and repeat the process.

In embodiments, a communication channel may have multi-speed capabilities within a single carrier frequency, and/or it may have multi-speed capabilities across multiple carrier frequencies.

In embodiments, a node in a mesh network may be used to perceive a plurality of channels within a mesh network. A node may select a first channel from the plurality of channels within the mesh network and remain on the first channel for a predefined duration. If during the predefined duration, a signal is not detected, the node may select a second channel and remain on the second channel for predefined duration in order to detect a signal. If during the predefined duration of remaining on the first channel a signal is detected, the node may remain on that channel beyond the predefined duration in order to receive a message. The node may then select a second channel once the message on the first channel is received. This process of channel selection may include a plurality of nodes and or a plurality of channels within a mesh network.

An aspect of the present invention relates to a portable node (e.g. portable mesh node) where the portable node may be associated with a user interface or other device. The portable node may be similar to other nodes as described herein and it may communicate to and from the network either directly to a master controller or through other nodes in the mesh network. The portable node may be discoverable as other nodes are discoverable. For example, the portable node may be located by other nodes sending 'find' requests to the portable node. Once the portable node receives a find request, it may respond and a communication link and hand-offs to other nodes in the network may then be completed. In other embodiments, the portable node may be programmed to send 'find' identifiers periodically. For example, the portable node may send a data packet to all nodes in the area (i.e. within its range) and the nearby nodes may identify that they can communicate with the portable node. In other embodiments, the surrounding nodes may be used to physically locate the portable node through triangulation techniques or the like.

Software components of a system according to the present invention may involve interfacing with or otherwise controlling streaming data within a network. For example, a user interface may be associated with the portable node and it may be adapted to scan through a set of entertainment titles (e.g. music titles, video titles, movie titles) to select a title to play on an entertainment device (e.g. audio/video equipment) controlled by another node in the network. The entertainment system may provide functionality similar to known high end mp3 players for example. In embodiments, an entertainment device may be a television, a signal conversion device, a DVR, a networked device, a UPnP networked device, a satellite receiver, a cable converter, a VCR, a digital video disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, an audio file player, and audio component, an audio-visual component, or some other entertainment device.

In embodiments, information relating to entertainment devices and/or entertainment media may be distributed through a mesh network in a data structure. A data structure may include metadata. In embodiments, metadata may be related to an image, a photo, audio, a music track, an audio broadcast, an audio book, a video, a movie, a video broadcast, a stored video, a live video, a digital video recorder file, a music video, audio-visual equipment, an appliance, a content directory, and other metadata types. Metadata may be a description of content being delivered, a rating, a title, a music title, a movie title, a publisher, a right, a plurality of rights, a genre, a language, a relation, a region, a radio call signal, a radio station, a radio band, a channel number, an image name, an artist name, a music track, a playlist, a storage medium, a contributor, a date, a producer, a director, a DVD region code, a channel name, a scheduled start time, a scheduled end time, an icon, and the like.

Figure 30:
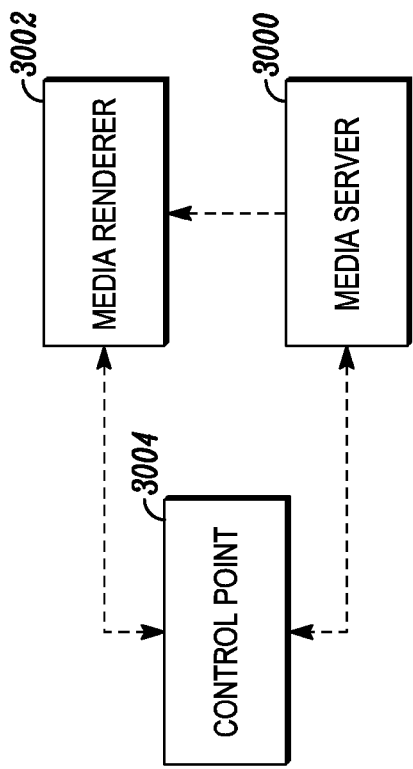
FIG. 30 illustrates the potential relations between a media server, media renderer, and control point.
Figure 31:
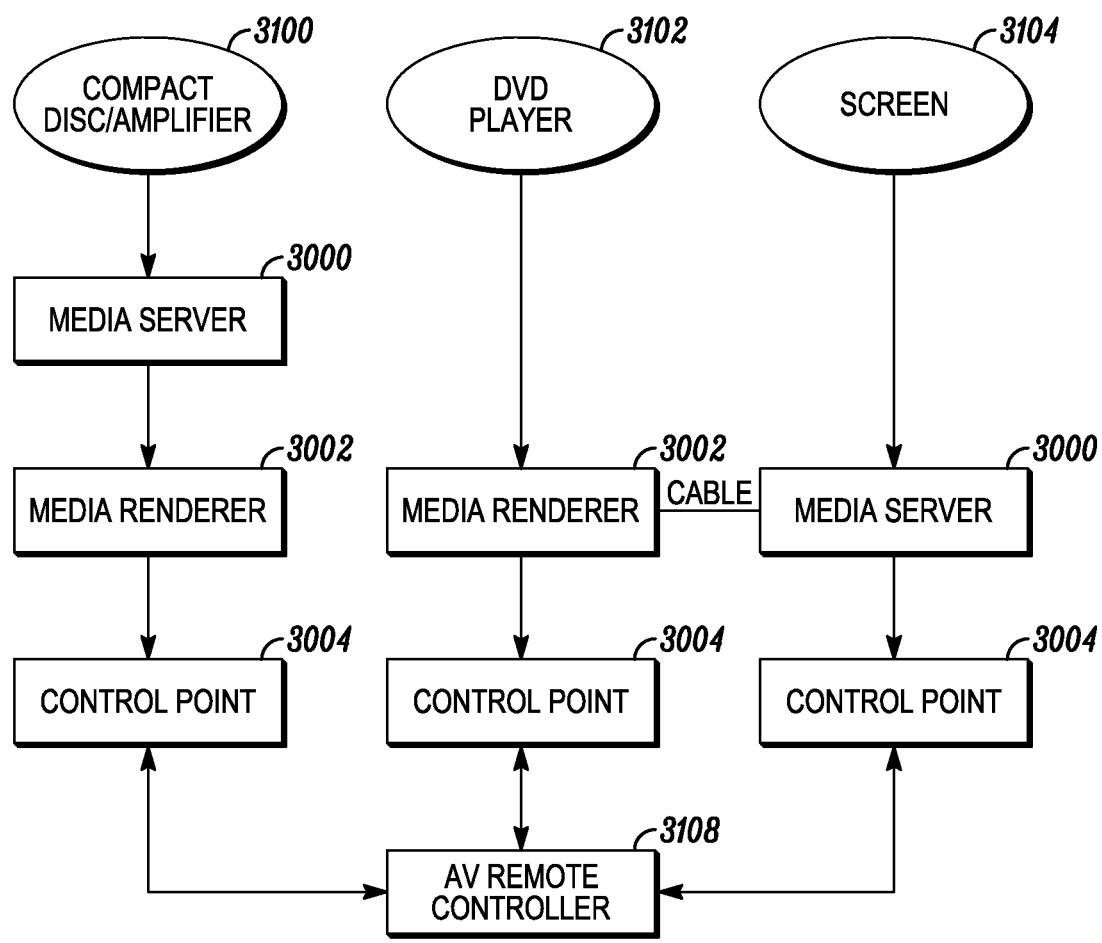
FIG. 31 illustrates a simplified embodiment of a media server, media renderer, and control point combination within a home audio-visual system.

In embodiments, such as that illustrated in FIG. 30, a media server 3000 may provide entertainment content (e.g., video, song, image, etc.) and may provide the content to a media renderer 3002. A media renderer 3002 may be capable of rendering entertainment content provided by a media server 3000. A media renderer 3002 may be identified with an endpoint identifier that is unique to a media renderer 3002. A control point 3004 may coordinate the operation of a media server and media renderer 3002. For example, through a control point, an end-user may be able to select what they want to view and/or hear, and where they want to hear and/or view it. Content that is available on a media server 3000 may be accessed through a control point's 3004 content directory functionality. This directory may comprise a hierarchical organization of content categories in which a superhierarchy is "Music," a sub-category within Music is "Artist," a sub-category within Artist is "Album 1," and so forth.

In embodiments, to cite one example among many potential embodiments, a media server 3000, media renderer 3002, and control point 3004 combination may be used to control a home audio visual system such as one including a compact disc player 3100, DVD player 3102 and a projection screen 3104. In this home audio-visual example, a remote controller 3108 may be used to communicate with a plurality of control points 3004, each of which is associated with a device within the audio-visual system. For example, the remote controller 3108 may communicate with a control point 3004 associated with a compact disc player 3100. The compact disc player 3100 may relay data to a media server 3000 that, in turn, relays the data to the media renderer 3002 and on to the control point 3004. Similarly, a DVD player 3102 and screen 3104 may be controlled by a remote controller using a media server 3000, media renderer 3002, and control point 3004 combination.

In embodiments, the portable node may be associated with a user interface for controlling other aspects of the entertainment system. For example, a user may be able to control output channels, input channels, volume, pitch, balance, treble, bass, brightness, sharpness, HDTV functions and the like. A portable node with a user interface may be adapted as a controller/receiver for other devices, sensors and the like in the network.

A Subscriber Identity/Information Module (SIM) may uniquely identify a connected mobile device and permit a mobile communication device to interface with a mesh network. A SIM card may also provide configurable storage for additional information related to a subscriber. As an example, a SIM card may provide storage for subscriber personal information such as address books, preferences, telephone numbers, network passwords, and such other information that may be beneficial or useful for a mobile user for accessing a wireless network.

Additionally, the SIM may facilitate accessing a mobile network. In an example, the SIM may contain unique information that a GSM mobile device network may detect when the SIM is installed in a GSM compatible phone and operated in a GSM network coverage area. Therefore when a mobile communication device, such as a mobile phone, is operating with a SIM in the range of a wireless network, such as a wireless mesh network, the mobile device may be detected by the network. In this way a SIM may facilitate making a mobile or portable device discoverable by a mesh network. Additionally, subscriber and/or network node identification information on the SIM may be used in an authentication process prior to allowing the mobile phone to join the wireless mesh network.

In embodiments, a mobile communication device equipped with a SIM card may facilitate a user of the mobile device gaining authorized access to a mesh network and further access facilities on the mesh network. For example, an authenticated user of a mobile device on a mesh network may download to the configurable memory of the SIM a list of movies stored on a digital video recorder connected to the network. The mobile device may then use the downloaded list along with display format information stored in the SIM to display the list in a user interface on the mobile device display. In another example, the user may upload digital content such as photos or a video on the mobile device (e.g. a camera phone with video capability) to a home entertainment system for presentation to a user viewing the display of the home entertainment system. Such an example may be used by an international traveler wishing to show images from their travels, or an Emergency Medical Technician providing images of an emergency patient in the field to an emergency room doctor.

Because a SIM may provide both access to a wireless network and may provide authentication for access to a mesh network, a SIM based mobile device, such as a cell phone, may be used to access the facilities of a mesh network from a location that may be far outside the range of nodes on the wireless mesh network by accessing the mesh network through a portal from the mesh network to the cell phone network.

A portable or mobile node may be discoverable through information contained in the SIM, as other nodes are discoverable. For example, the portable node may be located by other nodes sending 'find' requests to the portable node. Once the portable node configured with a SIM card receives a find request, it may respond and a communication link that handoffs to other nodes in the network may then be completed. In other embodiments, the SIM card may include configured storage information that directs the mobile device or portable node to send 'find' identifiers periodically. For example, the mobile device may send a broadcast type data packet such that the nearby nodes that receive the data may identify that they can communicate with the SIM based mobile device.

An aspect of the present invention relates to streaming data (e.g. entertainment data) through the mesh network. Streaming data may be adapted such that control frames can be transmitted over the mesh network while streaming data is transmitted. In embodiments, a software component supporting streaming data may include a minimum delay of 35 ms after each frame carrying streaming data for example.

In embodiments, streaming data is preferably performed at a high transmission rate (e.g. a 40 kbps transmission rate). A controller streaming the data may determine and select the optimal speed, preferably high speed (e.g. 40 kbps, or the highest speed available), for the stream transmission. Depending on the network topology, a slave may not check communication speed of routed streaming data, and therefore the controller may preferably select a low speed (for example 9.6 kbps) for a routed data stream. In embodiments, a master controller and/or the nodes in the mesh network that are handling the streaming information may select the highest speed path available for transmission of the streaming data. For example, the streaming data may reach a node and the node may have the ability to pass the information to anyone of a plurality of nodes because the plurality is in range. The node may determine that one of the plurality is a high speed node and select that node for receiving the next data transmission. Once a high speed path from source to ultimate receiver is determined, the routing information for the high speed path may be saved and used for later transmissions requiring high speed transmissions.

In embodiments, a number of methods and systems may be used for large data file transmission. For example, large data files, such as text files, audio files, video files, and like, may be transferred in a single block of data for an end-processing element to utilize when a transfer is complete. A large file may also be transferred in such a way that the end-processing element buffers the incoming data, and after a short delay, begins to utilize the data before the transfer is complete. A large data file may also be transferred in such a way that the data is sent to the user in real-time, or near real-time.

Transferring a large data file, which may not be used immediately by the end-processing element, may be transferred as a single block of data. An example of this may be a television guide that is distributed to end-processing elements once a day for subsequent use. The lack of immediacy of this task may allow the sending unit to schedule the transfer when bandwidth is available, transfer the data with or without data compression, and data may only need to be stored, reducing processing requirements. This method of transferring a large data file may be the least burdensome for the processing elements, but may not be the best choice for large data files that may require immediate action, such as real-time audio and video files.

In embodiments, a large data file may be transferred for immediate use based at least in part on buffering the data at the receiving end of the transfer. This method is often referred to as progressive downloading or pseudo-streaming, and may not be fundamentally different from other methods for transferring data for subsequent use. As a result, the same data transfer protocols that the sending processing element uses for small data transfers may be utilized for progressive downloading. The data file may also be retained after transfer to the end-processing element. One addition to the end-processing element, in order to aid in the immediate use of the data by the user, is the addition of a data-buffering layer between the input from the source and the output to the user. As long as the available bandwidth during data transfer between processing elements is not less than the required data rate to the user, the user may not be aware that the data transfer is still ongoing while the initial data is being used. When available bandwidth during transfer is predicted to be less than that of the user, data compression may be employed to reduce the throughput requirement. Data compression rates may vary from low, for lossless data compression schemes, through high, for lossy data compression schemes. In general, the receiving data buffer may also be expanded as an alternative to the need for lossy data compression. This method generally maintains a high quality of file transfer, while allowing the user to begin using a file prior to it's completed download.

Another method for transferring a large data file for immediate use may involve the real-time transfer of data between the source and the user. This method is often referred to as streaming data. The process of transferring data in real-time may require unique data transfer protocols from those used in non-real-time file transfers. Data transferred in real-time may have to conform to predetermined data transfer rates. Audio and video are both examples where the real-time data rates are predetermined. In addition, when these predetermined data rates cannot be met by the source, data may have to be sacrificed in order to maintain the real-time data steam rate. For example, lossy data compression rates may have to be varied as bandwidth in the transfer medium becomes reduced. The increased data compression rates may reduce the quality of the real-time data, such as reduced quality audio or and increased graininess of a video file output. Another example may be the dropping of short portions of an audio stream, the reduction of the size of a video output, or the momentary freezing of a web-cast. These issues with streaming may be offset by the advantages of being able to skip around in a video file without waiting for a download to complete, or having the ability to monitor a scene real-time. In addition, since the data rates are known, being either predetermined or through communication between the send and receive processing elements, the sending processor element may be able to more effectively utilize available bandwidth. The end-processor element may also have no need to store the data it is receiving, and so memory storage may be reduced. This method is generally utilized when real-time data is a higher priority than the quality of the data transferred.

RF transceiver 802 benefits with improved sensitivity by employing a demodulator correlation function. The demodulator detects the frequency of the FSK input signal by counting clock pulses between zero-crosses. In order to separate the two input frequencies an average filter is run on the input signal. The DC is subtracted from the input signal and the result is sampled into a delay chain of registers. The demodulator then correlates this signal history to the pattern of the known NRZ/Manchester symbols. For NRZ the correlation value is computed as the sum of the sampled input signal over one NRZ bit period. For Manchester the correlation value is computed at the sum of the first half Manchester bit period minus the sum of the second half bit period. The bit slicing is performed by checking the sign of the correlation function at the rising edge of the recovered clock. This results in improved sensitivity.

Figure 29:
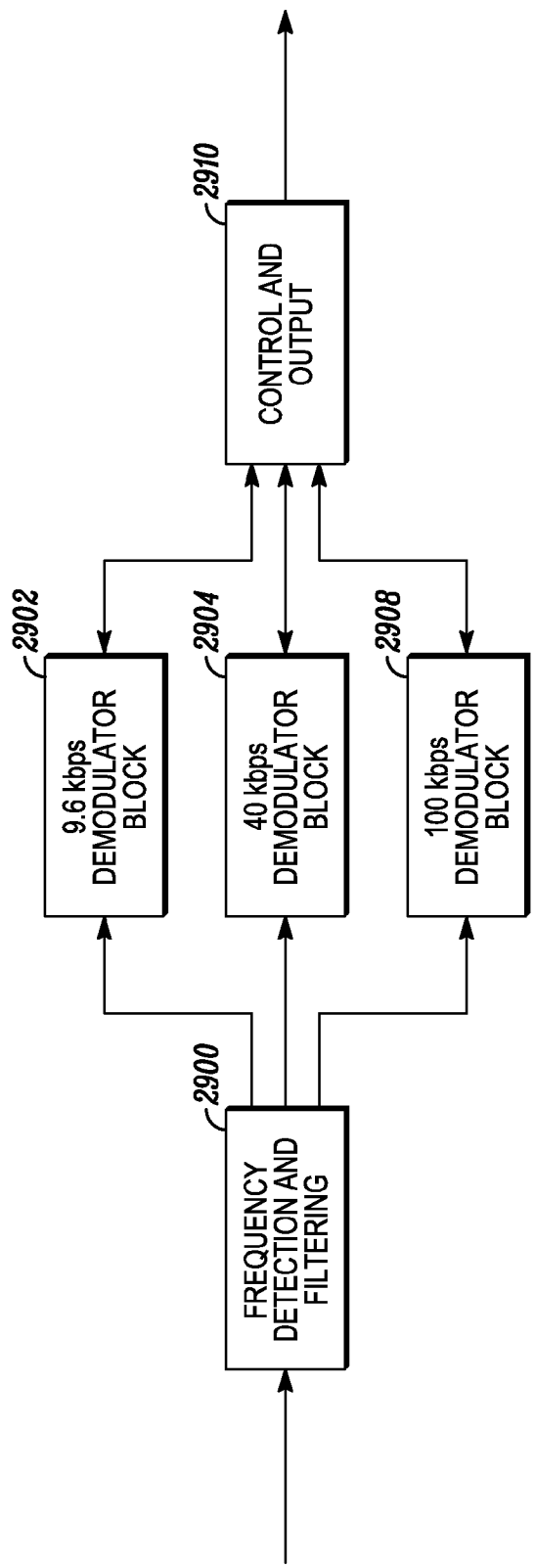
FIG. 29 illustrates a multi-speed demodulator.

In embodiments, a demodulator, such as that illustrated in FIG. 29, may be designed so that it can detect Manchester (MCH) code at 9.6 kbit/s 2902 and NRZ code at 40 kbit/s 2904 and 100 kbps 2908. It may be set in three different modes: (i) to detect and receive only MCH data (9.6 kbit/s) 2902; (ii) to detect and receive only NRZ data (40 kbit/s) 2904; or to detect and receive only NRZ data (100 kbit/s) 2908.

In embodiments, when a demodulator is in an auto mode, both MCH and NRZ data may be detected. Once a frame is detected as either MCH or NRZ, the demodulator may switch to this mode and start receiving data in an auto mode. In the auto mode the demodulator must listen for Manchester (MCH) code at 9.6 kbit/s 2902 and NRZ code at 40 kbit/s 2904 and 100 kbps 2908. In order to do this the demodulator may contain three detectors, one for MCH and two for NRZ. However some part of the demodulator may be common for both detectors, such as the IF detection 2900, filtering 2900, and the control of the demodulator 2910.

RF communication error detection may be improved by the use of CRC 16, or other similar robust error detection techniques, on elements of the communication signal including Z-wave frames.

Referring further to FIG. 9, transceiver 802 may transmit using a modulation frequency that is asymmetrical to a reference carrier/local oscillator frequency, resulting in a transmit frequency that is not supported by the reference frequency synthesizer. By supporting asymmetric radio frequency signal modulation, transceiver 802 has the ability to transmit on a frequency not supported by the frequency synthesizer.

Figure 9A:
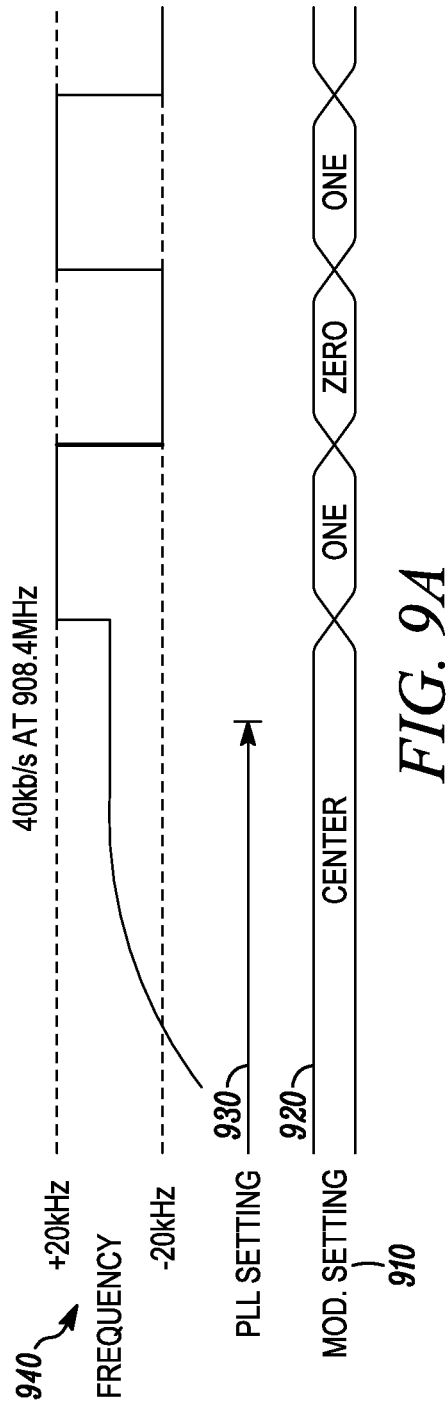
FIG. 9A and FIG. 9B are waveforms of asymmetric modulation.

Referring to FIG. 9A, a waveform diagram representing selection of asymmetric modulation, if offset control 910 is set at its center frequency 920 during settling of PLL 930, modulation 940 will go to both sides of PLL 930 frequency. As an example, this may correspond to binary FSK with a carrier frequency at an integer multiple of 200 kHz.

Figure 9B:
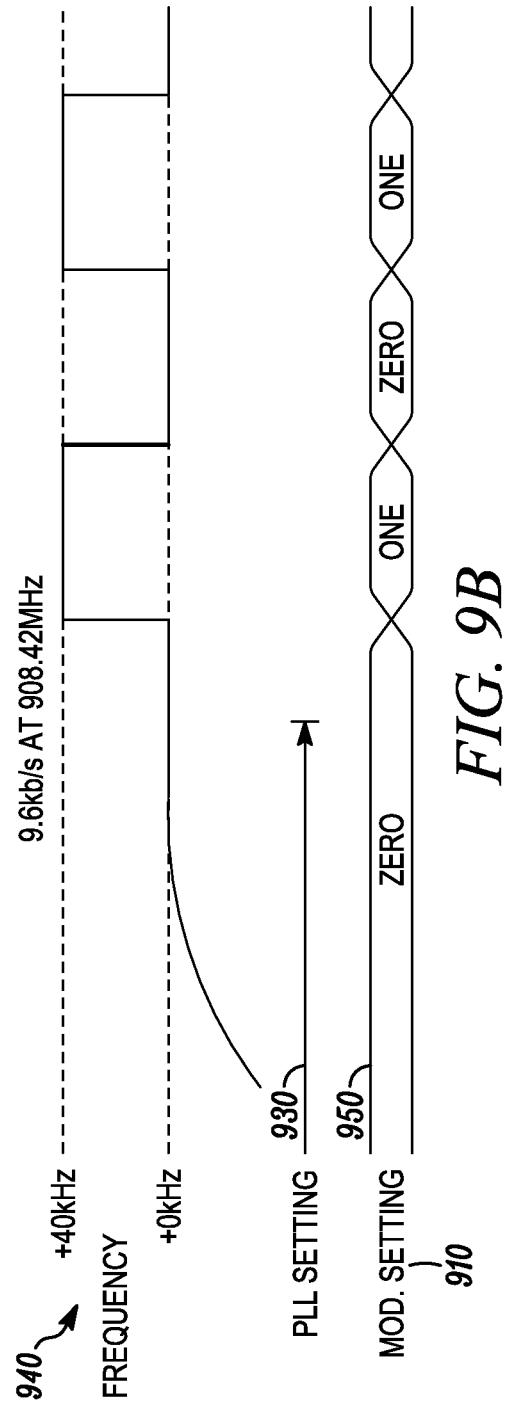

Referring to FIG. 9B, if offset control 910 is set at the zero symbol setting 950 during settling of PLL 930 then modulation 940 will only go to an upper side of PLL 930 frequency. As an example, this may correspond to binary FSK with a carrier frequency at half the modulation separation above an integer multiple of 200 kHz or N×200 kHz+20 kHz to N×200 kHz+25 kHz. Benefits of asymmetric modulation include the ability to transmit on a frequency not supported by the frequency synthesizer.

RF transceiver 802 may include a Phase Lock Loop (PLL) which may be synchronized while the system is powering up. Such synchronization may reduce locking time, afford faster RF turn-on, and lower power consumption PLL divider synchronization at start-up to reduces locking time. The VCO frequency is divided by a circuit denoted as the PLL divider, into a signal that matches a well defined reference signal. The reference signal is generated from the system clock and can be optionally 100 kHz or 200 kHz. During calibration, the center frequency of a Voltage Controlled Oscillator is adjusted so that the divided frequency after calibration is very close to the reference frequency. After calibration a PLL fine-tunes the divided VCO signal so that it locks completely onto the reference signal.

In order to minimize VCO lock settling time, the PLL and the reference signal are disabled and then released simultaneously after calibration. The result of simultaneous release is a synchronization action where both signals start at the beginning of their high period. The synchronization between the signals minimizes the PLL settling time, resulting in faster turn-on of radio, and lower power consumption.

RF transceiver 802 includes an RF transmitter including a transmitter digital to analog converter which delivers the benefit of reduced cost. The transmitter chain contains a D/A converter which has two functions. The first is to convert the digital encoded bit symbols to analog signals, and the second is to set the transmission power of the transmitted RF signal, since the D/A converter is followed by a fixed gain PA amplifier. The D/A converter is a digital symbol to sine-voltage converter. Each output voltage of the D/A is a discrete step on a sine-curve which is selected by the digital value on the input. A thermometer coded signal is applied, and each value of the input signal selects a step on the sine wave. Counting from 0 to 31 and back again is therefore generating a full sine-period. The advantage of having sine-sized D/A steps is, that a low number of control-bits can generate a high resolution sine-wave. Further more, the amplitude of the sine-wave is controllable, which means, that the transmission strength of the RF signal is set in the D/A.

Figure 9C:
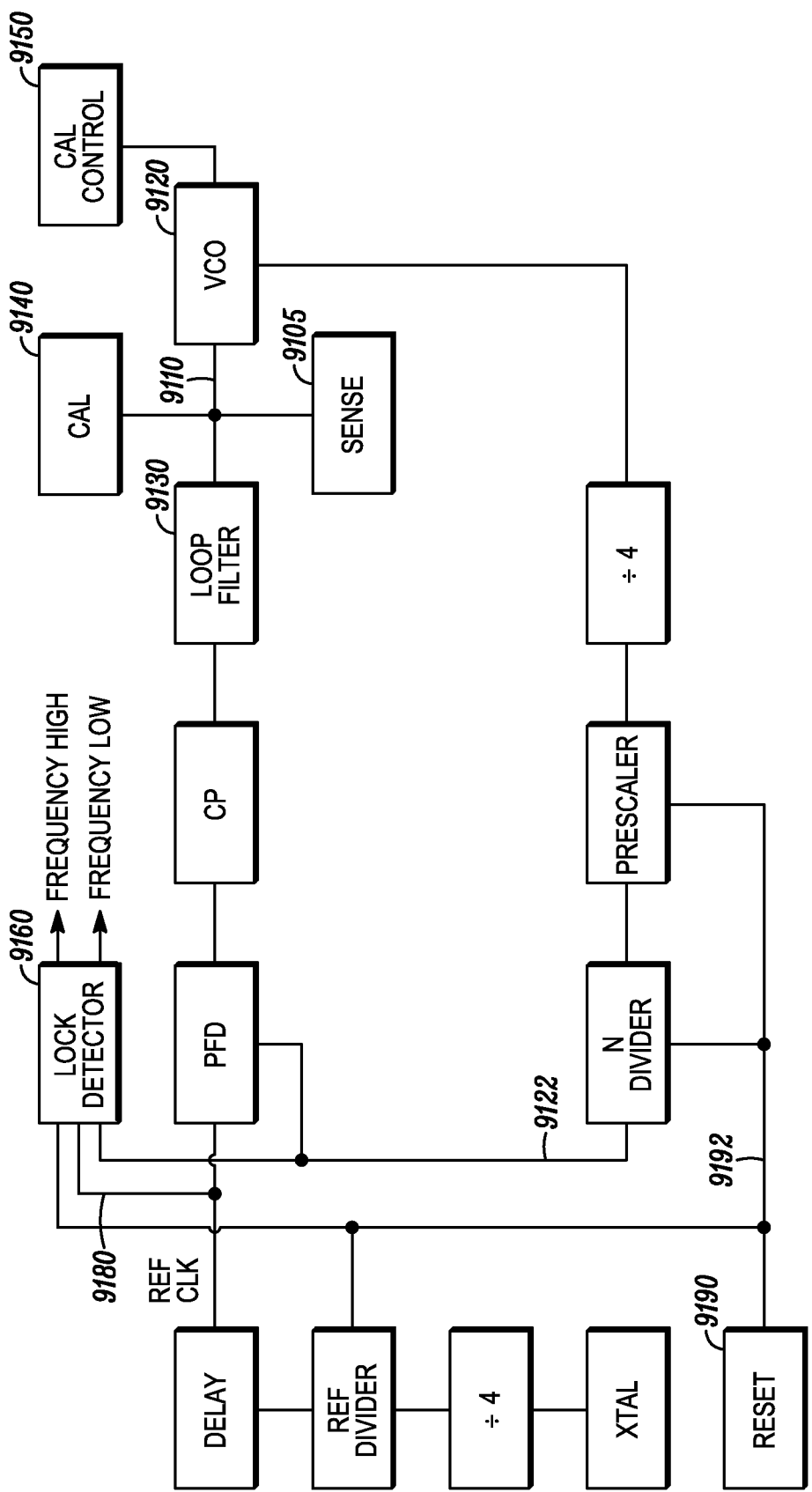
FIG. 9C is a block diagram of the Phase-Lock-Loop functionality of the invention.

Referring to FIG. 9C, VCO frequency calibration ensures that an analogue control voltage 9110 input to VCO 9120 is preferably within a narrow range and compensates for variation of on-chip capacitance which affects VCO 9120. During calibration, PLL loop filter 9130 is opened and Cal block 9140 sets VCO control voltage 9110 to a predetermined value. A calibration control block 9150 may adjust the frequency of VCO 9120 by changing capacitance values internal to VCO 9120.

Figure 9D:
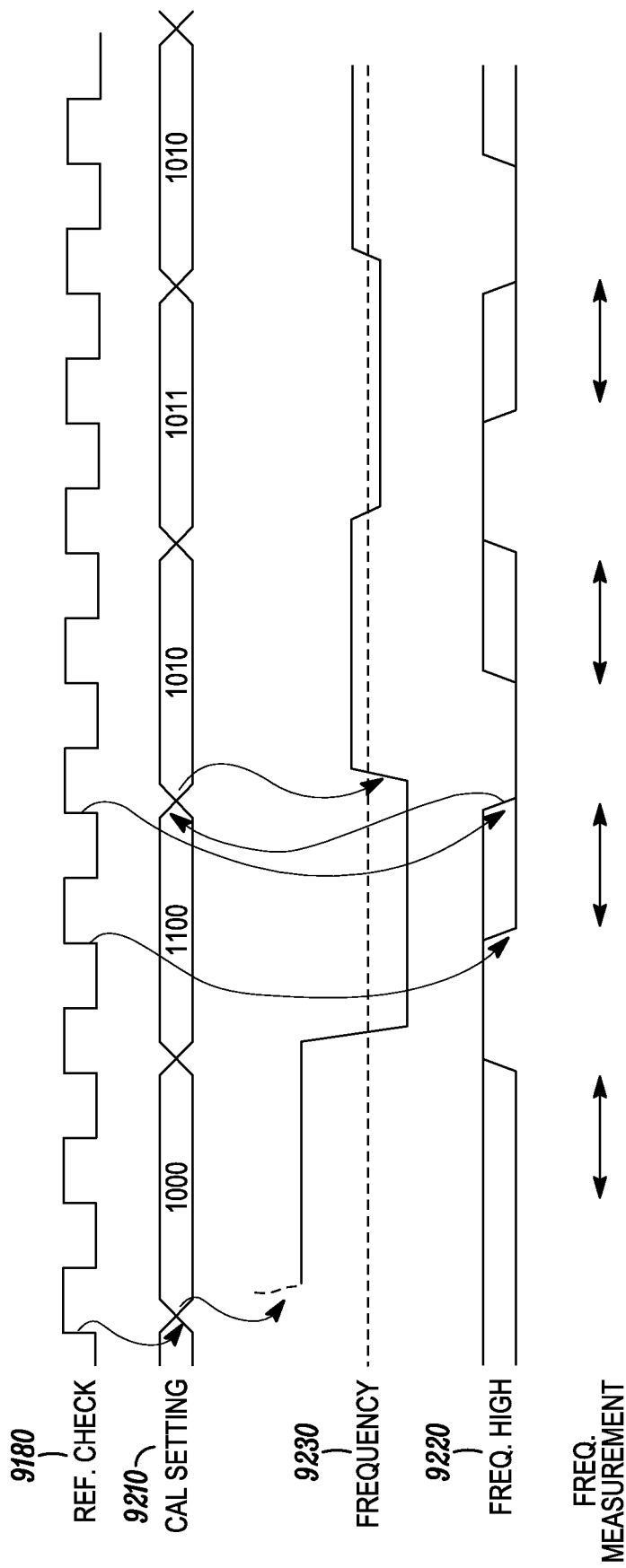
FIG. 9D is a timing diagram of the sequence for frequency calibration.

Referring further to FIG. 9D, for various cal control 9150 settings of VCO 9120 capacitors, output frequency of VCO 9120 is measured by using a lock detector 9160. After resetting of the different dividers to synchronize all blocks, lock detector 9160 may compare a subdivided version 9122 of VCO 9120 output frequency to a reference clock 9180. By using a successive approximation approach the correct calibration setting can be determined in very few reference clock 9180 cycles. FREQ High and FREQ Low bits generated by lock detector 9160 are used in calibration control circuit 9150 to indicate if VCO 9120 frequency is too high or too low.

To ensure the PLL locks precisely onto a predetermined frequency, reference clock 9180 and subdivided VCO output 9122 are preferably synchronously released. In embodiments, reset circuit 9190 may automatically issue synchronous reset signal 9192 upon receiving a signal from calibration control 9150. Alternatively, a software accessible control register can be used to signal reset circuit 9190 to issue synchronous reset signal 9192.

FIG. 9D illustrates a calibration sequence wherein 4 bits of calibration control information 9210 is passed from calibration control circuit 9150 to VCO 9120 (as shown in FIG. 9C). For each calibration information 9210 setting, freq high signal 9220 may respond on a rising edge of reference clock 9180, further enabling a change in calibration information 9210 setting. This sequence repeats until PLL frequency 9230 is substantially close to a predetermined value.

Figure 9E:
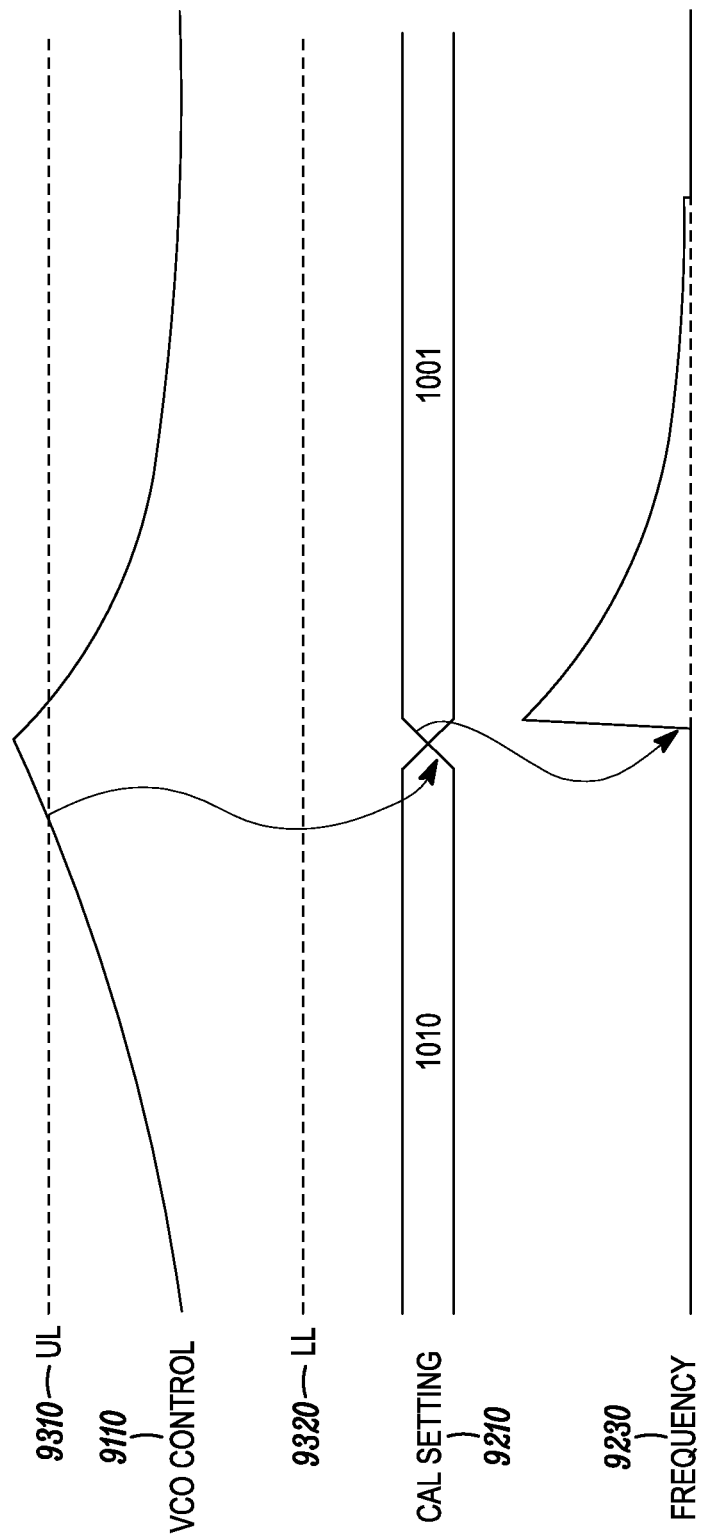
FIG. 9E is a waveform of VCO automatic self-calibration.

Referring to FIG. 9C and FIG. 9E, in receive mode during periods when no preamble or SOF has been detected and no data is currently being received, calibration control 9150 may adjust calibration setting whenever VCO control voltage 9110 has changed significantly. This function is done by sense block 9105 by comparing VCO control voltage 9110 with an upper limit 9310, and a lower limit 9320. As illustrated in the diagram in FIG. 9E, VCO control voltage 9110 may be monitored continuously such that when it falls outside sense block 9105 limits, calibration control 9150 adjusts calibration information setting 9210. In embodiments, a sudden change in calibration control 9150 output will result in PLL 9230 loosing lock, therefore calibration control 9150 may be disabled until lock detector 9160 indicates that PLL 9230 has settled again.

Additionally, voltage controlled oscillator (VCO) calibration may use portions of the PLL, thereby reducing hardware resources and cost. Additionally cost is reduced by IF calibration. In order to counteract the natural variation in resistors and capacitors, the IF filters of the ZW0201 has programmable resistors, which are set during a calibration process. This calibration process is able to reduce the variation of the IF filter center frequency, and this helps relax the requirements to the system clock. The calibration is performed using the components of the IF filter. The procedure is like this: One capacitor is discharged and another is charged. The voltages across the capacitors are compared, and when they cross each other, the charge/discharge time is recorded (as being the time from start of the process until the voltages cross each other). The two capacitors are reset, the programmable resistors of the IF filter is changed, and another charge/discharge sequence is done. Four charge/discharge periods are performed, and resistors are changed during each period, which results in a resistor setting that has a optimal charge/discharge period.

The single chip embodiment of FIG. 8 contains an embedded MCU 830. One example of a preferred MCU is embedded 8051 MCU core (Inventra M8051 Warp) including two standard 8051 timer/counters 804. MCU 830 may be compatible with industry standard 803x/805x MCUs. The single chip solution may allow for optimisation of MCU 830. MCU 830 of the embodiment of FIG. 8 completes one instruction cycle per two clock cycles as opposed to a standard 8051 with 12 clock cycles per instruction cycle. This makes MCU 830 six times faster than the standard 8051.

Figure 10:
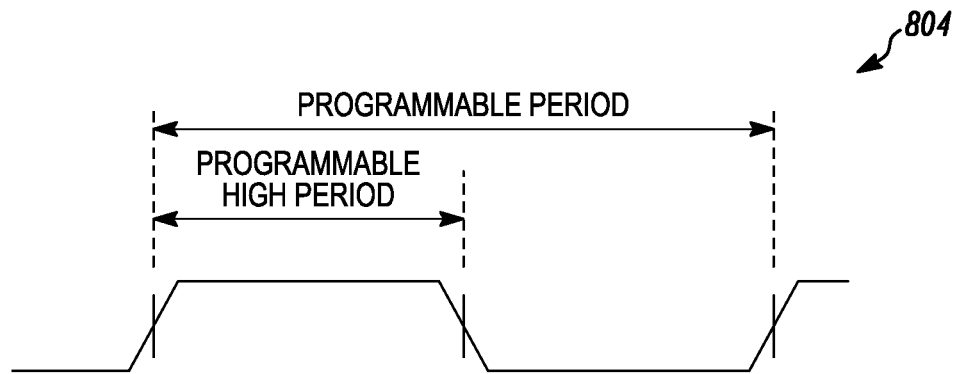
FIG. 10 illustrates a timing diagram of a pulse width modulated output (PWM)

Referring to FIG. 10, a timing diagram of a pulse width modulated output (PWM), general purpose timer 804 is a timer that may be polled or programmed to generate interrupts. Timer 804 may be an auto-reload counter with a fixed clock divider ratio. The timer of the single chip solution of FIG. 8 uses a 16-bit timer that may be an auto-reload counter with a fixed clock divider ratio of either 4 or 512. Timer 804 may also be set in Pulse Width Modulation (PWM) mode. The PWM may be controlled by setting the total period and the total high period. This embodiment utilizes an 8-bit register to set the total period and an 8-bit register to set the high period, therefore timer 804 counts using a fixed clock divider ratio of either 4 or 512.

Wake up timer 838_may be an ultra low power timer that may be enabled in a sleep mode or power down mode to wake up MCU 830 after a programmable time period. The sleep period may be configurable in number of seconds, such as in a range of 1 to 256 seconds. Wake up timer 838 is based on an internal oscillator that may be automatically calibrated against the system clock. IN the preferred embodiment of FIG. 10, wake up timer 838 may automatically calibrate during power-down mode, resulting in an easier to use system that automatically calibrates under the same conditions as when operating.

Special function registers 840 may contain registers that are used to control MCU 830 operating mode, and the operating mode of built-in peripherals.

Various memory technologies may be used for MCU program store, application store, and for internal/external data storage. In the preferred embodiment of FIG. 8, two types of memory are used.

A 32 kbytes of flash memory 828 is MCU 830 program memory containing mesh network 100 API and customer application software. MCU 830 also has the ability to read, write and erase the flash memory 828. Flash memory 828 has a built-in read back protection in order to prevent reverse engineering or design theft. Clearing a dedicated lock bit in flash memory 828 activates the read back protection. As long as the lock bit is cleared it is not possible to read from the flash memory 828 externally. Other lock bits may protect parts of the flash against writing. The lock bits may only be unlocked by erasing the entire flash memory.

256 bytes of Internal Random Access Memory (IRAM) 832 may be used by MCU 830 for 8051 internal data memory, and may also be accessed through direct instructions from MCU 830.

2 kbytes of External Random Access Memory (XRAM) 832 may be used by MCU 830 as 8051 external data memory. The single chip implementation of FIG. 8 may contain an interrupt controller 818, supporting 10 interrupt sources including two external interrupt sources on through General Purpose I/O's. Some of the interrupt sources may be reserved by the mesh network API. The Interrupt Controller controls the interrupt priority assignment. The priority may be fixed by the mesh network protocol. The external interrupt may also be enabled to wake up the chip from Sleep mode. The single chip implementation of FIG. 8 may further contain a Triac Controller 820 for power regulating applications. Triac Controller 820 may be compatible with 50-60 Hz external alternating current power. Using an external Triac and a few extra external passive components a complete phase control circuit may be designed. Triac controller 820 may be implemented in a separate circuit within the single chip in order to keep timing and operation independent of software and to minimise MCU 830 workload.

In embodiments, a Triac controller within an integrated circuit mesh network node may be used to deliver power to a load, wherein timing of the power delivery is based at least in part on a zero crossing point of an AC power signal. The load may be a resistive load or a non-resistive load (e.g., an inductive load). The power delivery may be based at least in part on a fire angle. The power delivery may be initiated in coordination with a fire angle. The power delivery may be terminated in coordination with the zero crossing point. In embodiments, the Triac controller may be associated with a noise mask adapted to reduce false indications of zero crossing.

The mesh network node 100 may contain an analog-to-digital converter (ADC) 822 with a resolution that may be set to 8-bit or 12-bit. An 8-bit conversion takes less than half the time of a 12-bit conversion. ADC 822 may be rail-to-rail and programmed to refer to various internal or external voltage references. The ADC block may include a battery-monitoring mode. ADC 822 may support both single and continuous multi conversion mode. ADC 822 may have a built-in comparator for generating interrupts when a threshold set by software is exceeded. The threshold may be either a low threshold or a high threshold. It is possible to shut down ADC 822 for reducing power consumption. ADC 822 also includes self test capability which may reduce test related costs.

The 8-bit part of the ADC is tested for missing codes, mismatch and missing connections in a simple and fast way. The precision of the test is better than ½ LSB. The 8 bit part of the LSB is made of 9 capacitors, 8 capacitors having an individual size ratio which is binary and 1 capacitor having the unit size. The largest of the 8 capacitors is $2^7$ units large, called C0, the next is $2^6$, called C1, down to C7, which is $2^0$ units large. The 9.th capacitor, having the unit size 1, is called Cs (for stationary). The capacitors presence and size ratio is tested by testing C0 against C1+C2+ ... C7+Cs and adding an extra test-capacitor having the size of ½ unit. Since C0 is =C1+C2+ ... C7+Cs, adding the extra ½ lsb capacitor (called Cc) ensures that the term. C1+C2+ ... C7+Cs+Cc is now for sure larger than C0. If any capacitor units misses in any of the 9 capacitors (C0 ... C7+Cs), the test will fail. Next, C1 is tested against C2+ ... C7+Cs, etc. The test is very fast to perform and does not require any high precision external stimuli or conventional ADC conversion cycles. If this test should be performed in a normal fashion, 256 ADC conversions with an input voltage ranging from 0V to Vdd would have to be performed. With the new approach, this test time is reduced to app. the time it takes to perform one ADC conversion.

A software programmable interface (SPI) 824 may be included in the implementation. Two examples of how SPI 824 may be used are: 1) to provide external access to the flash memory 828 and 2) to allow mesh network node 100 to communicate with an external memory. The SPI may act as a master or slave when interfacing to memory. For example, network node 100 acts as a master when accessing external Electrically Erasable Read Only Memory (EEPROM) and as a slave when accessing the flash memory 828. External flash memory may also be accessible by MCU 830.

The mesh network node embodiment of FIG. 8 may contain a UART 814 and may operate independent of MCU 830. UART 814 may support full duplex and may operate with the following three baud rates: 9.6 kbaud, 38.4 kbaud, or 115.2 kbaud.

Power Control Block 838 controls node 100's different power saving modes. For example two power saving modes are: Normal Mode and Sleep Mode/Power Down Mode. In Normal Mode MCU 830 is running and the RF circuits and ADC 822 may be powered up or down. Sleep Mode/Power Down Mode may be the lowest power mode, with everything shut down except the RAM's brown-out detection and low power timer. In addition ADC 822 may be powered up or down. In Sleep mode it is possible to wake MCU 830 up using an external interrupt source. The source may be active low or active high. MCU 830 may also be woken by the wake up timer 838, a reset, or by power cycling.

It is also possible to power down MCU 830 while keeping RF transceiver 802 operating, by automatically stopping MCU 830 before powering up RF transceiver 802. Additionally, it is possible to restart MCU 830 when transmission has completed and RF transmitter 802 has been powered down. This sequence of powering up and down these elements reduces power consumption and cuts peak current demand.

Two examples of how this may be executed is: automatically stopping the MCU before powering up the radio and transmitting, and restarting it when transmission has completed and the radio powered down; and automatically stopping the MCU before powering up the radio for reception and automatically powering up the MCU when a signal is received Depending on information frames contained within a signal received by RF transceiver 802, MCU 830 can be automatically powered up. A frame handler coupled to RF transceiver 802 automatically detects Z-wave frames and can automatically generate a signal to power-up MCU 830 or generate an interrupt to MCU 830 if it is already powered-up. The benefit of the frame handler functionality is reduced operating load on MCU 830, lowering memory requirements, and reducing power consumption.

This embodiment also has general purpose I/O interfaces 808. For example, the ZW0201 has 10 configurable General Purpose I/O (GPIO) pins with optional weak internal pull-up. The GPIO pins may be organized as two ports. The GPIO pins may have dual or even triple functionality, user programmable from MCU and some special hardware functions (for instance SPI 824, ADC 822, UART 814, TRIAC controller 820, etc.). In this implementation four of the GPIO pins may be either analogue (for ADC) or configured for digital interfacing as an input, or output. Reset I/O may also be available. Two examples of reset I/O are 1) External reset and 2) Enable programming mode. For example, when the reset pin is pulled low a master reset is generated. If the reset is held low for an extended period then the chip accepts programming commands on SPI 824. The chip may not go into actual programming mode until an SPI 824 Programming Enable command is received. As an example five dedicated analogue pins are used for RF interface 802 and crystal connections 810. GPIO pins may be set as inputs during reset. This pin configuration may be maintained after the reset is released until the software changes the setting.

By using one or more of the invention interface circuits, an RC-oscillator may be used as a temperature sensor, lowering cost by reusing existing interface circuits for the additional function of sensing temperature. The Wake-up timer internal ring oscillator is designed in a way so the calibration value has a near linear temperature dependency. The calibration depends on temperature, supply voltage and process variation. Fortunately the supply voltage variation can be take into account by using the built in battery monitoring circuit. The impact of process variation is mostly on the offset value. Consequently if the calibration value is known at a given temperature then the temperature can be estimated at another temperature. This results in the benefit of low cost from reuse of existing circuit as temperature sensor.

Figure 11:
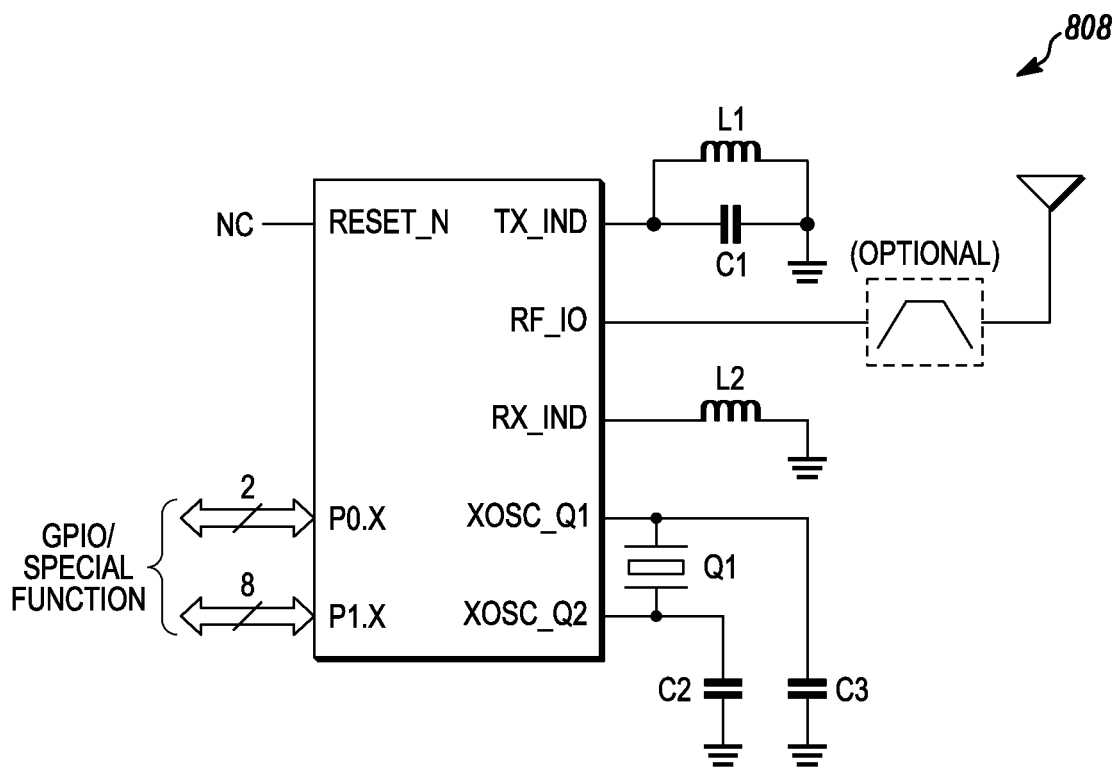
FIG. 11 shows I/O for a typical application circuit.

The single chip 100 implementation may contain a number of external interfaces including general I/O 808, clock signals 810, resets 812, transceiver I/O 802, UART 814, interrupts 818, Triac control 820, ADC 822, SPI 824, and external memory. FIG. 11 shows the I/O for a typical application circuit.

Figure 12:
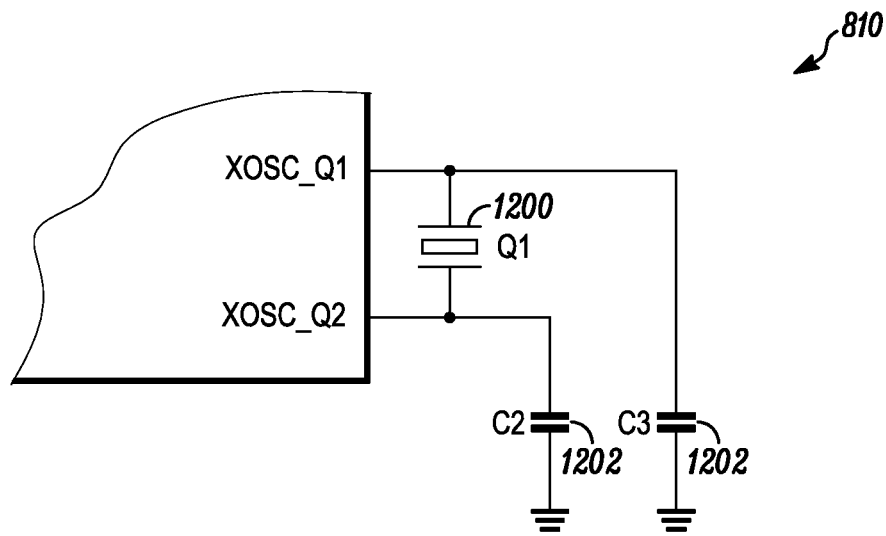
FIG. 12 shows external crystal connections.

Clock signals 810 may require external interfaces. For example FIG. 12 shows external crystal 1200 connections. Node 100 includes an on-chip crystal oscillator making it possible to drive a crystal directly and can operate with either a 32 MHz or a 16 MHz crystal. An external load capacitor 1202 may be required on each terminal of the crystal. The loading capacitor values may depend on the total load capacitance specified for the crystal.

Figure 13:
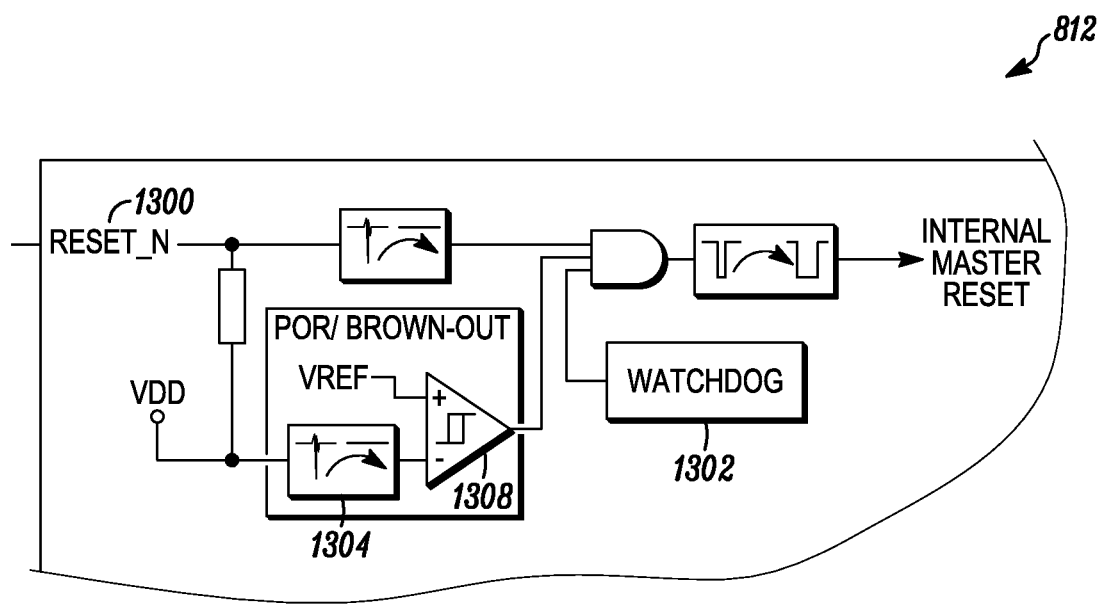
FIG. 13 shows a simplified block diagram of an internal reset circuit.

FIG. 13 shows a simplified block diagram of an internal reset circuit 812. For example all pats of node 100 are reset when one or more of the following conditions are true: 1) Reset 1300 is low, 2) When POR/brown-out detection circuit detects low supply voltage, 3) When WATCHDOG 1302 times out. The reset may be an asynchronous input with internal pull-up, schmitt trigger, and glitch protection. The signal may be synchronized internally so that the reset may be asserted and deasserted asynchronously. The POR circuit may also contain a low pass filter 1304 for glitch protection and hysteresis 1308 for noise and transient stability. In Sleep mode the POR may go into a low power mode that protects the circuit against brown-out while keeping the power consumption at an absolute minimum. During master reset all GPIO 808 pins may be configured as inputs and the RF Transceiver 802 may be set in power down condition.

Figure 14:
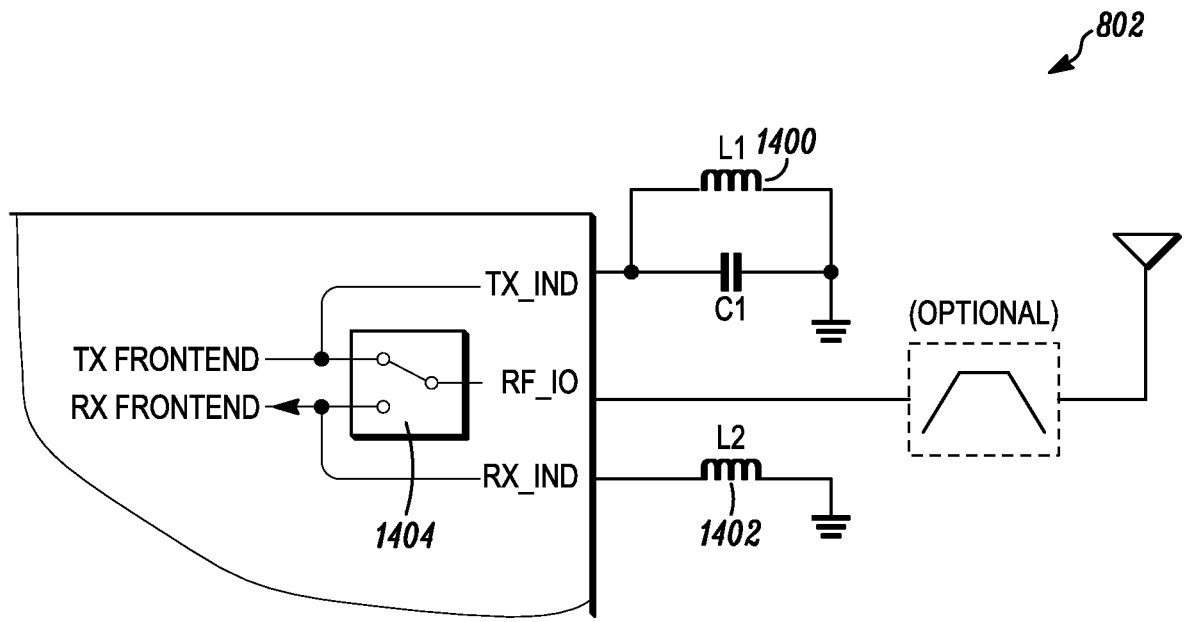
FIG. 14 shows the RF connections in a typical application.

FIG. 14 shows the RF connections in a typical application. RF transceiver 802 may require very few external passive components 1400, 1402 for input and output matching. IN this embodiment an internal T/R switch circuit 1404 makes it possible to match the receive (RX) and transmit (TX) independently. L1/C1 1400 is used for matching the transmitter output to 50Ω. L2 1402 may be used for matching the receiver input to 50Ω. The values of the matching components may depend on the actual PCB layout. Moreover the matching components should be placed as close as possible with efficient grounding in order to achieve best performance. Additional external filter components may be added in order to filter the RF harmonics (if necessary) and improve the blocking performance.

Figure 15:
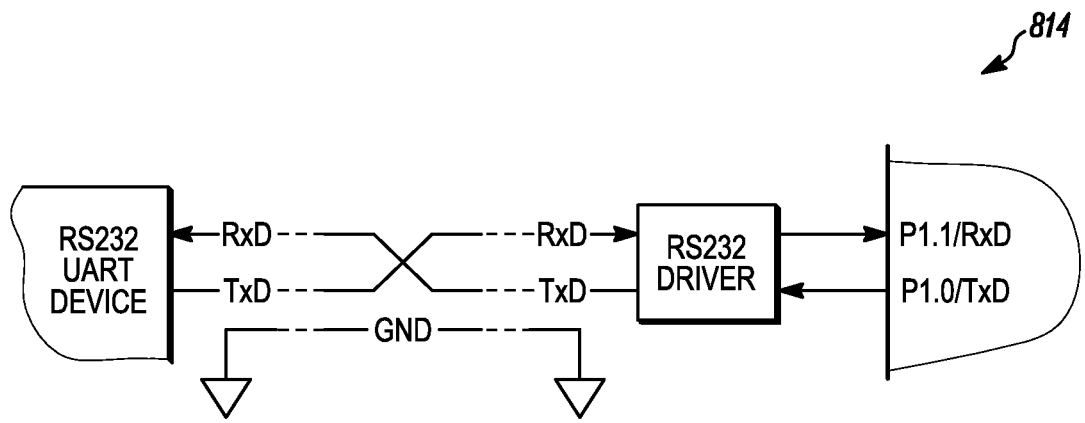
FIG. 15 shows a typical RS232 UART application circuit.
Figure 16:
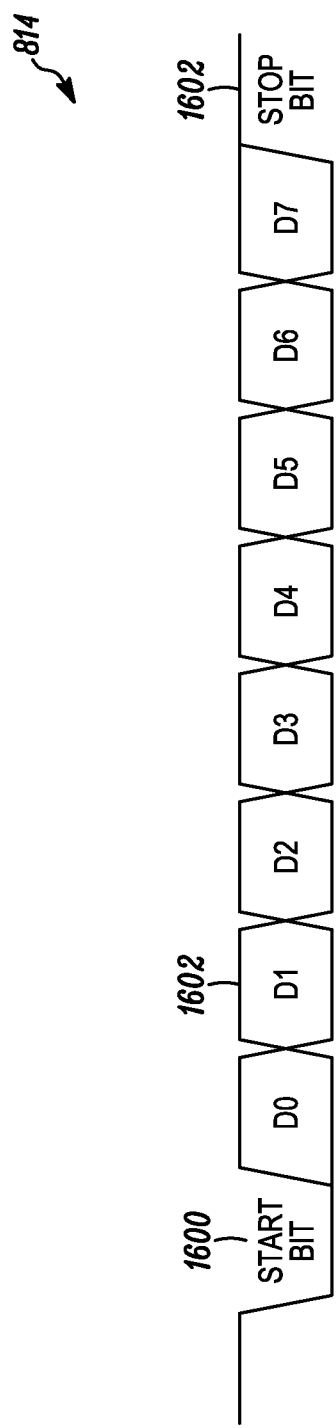
FIG. 16 gives a waveform of a serial byte.

UART 814 interfaces with external components. For example UART 814 interfaces with a data rate of 9.6 kbaud, 38.4 kbaud, or 115.2 kbaud, with 8-bit words, one start bit, one stop bit and no parity. FIG. 15 shows a typical RS232 UART application circuit. FIG. 16 gives a waveform of a serial byte. UART 814 shifts data in and out in the following order: start bit 1600, data bits 1602 (LSB first) and stop bit 1604. For noise rejection, the serial port may establish the content of each received bit by a majority voting on the sampled input. This is especially true for the start bit. If the falling edge on R×D is not verified by the majority voting over the start bit then the serial port stops reception and waits for another falling edge on R×D. After ⅔ of the stop bit time, the serial port waits for another high-to-low transition (start bit) on the R×D pin.

Figure 17:
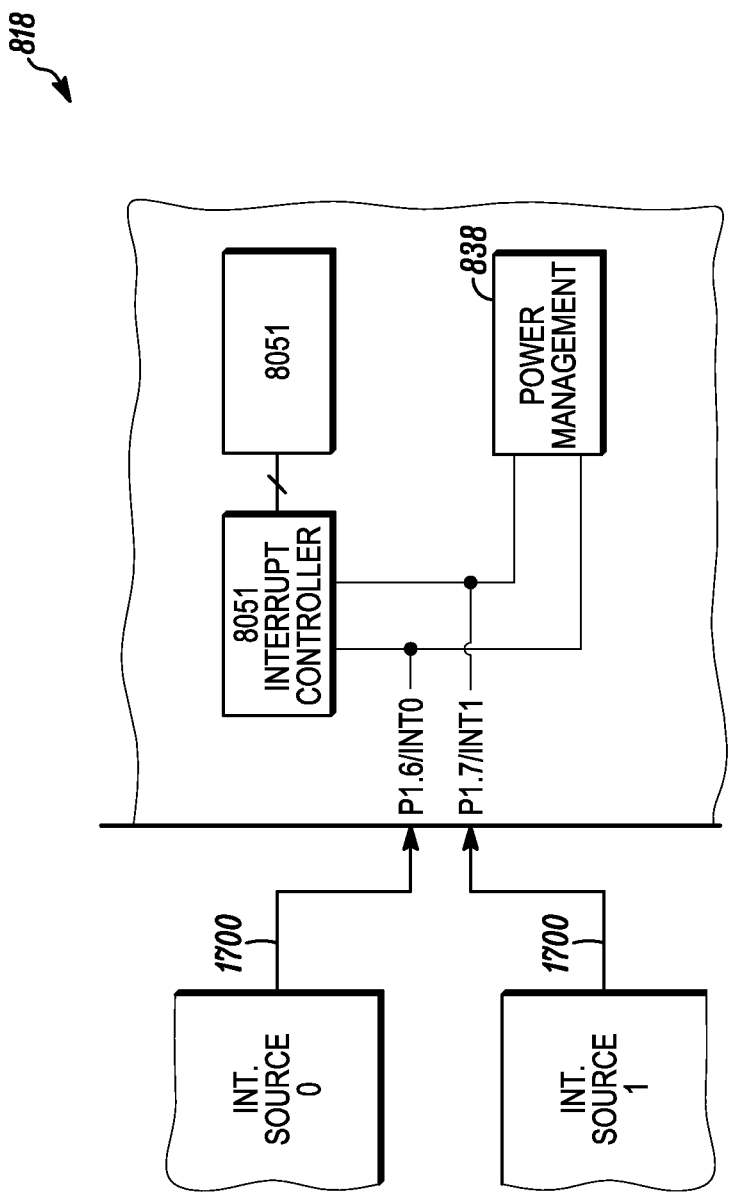
FIG. 17 shows external interrupts.

Single chip embodiment of network node 100 supports external interrupts 818 to MCU 830 as shown in FIG. 17. For example, Interrupts 1700 may be programmed to be either level-triggered (high/low) or edge-triggered (rising/falling). Also, interrupt(s) to Power Management 838 may enable wake up from sleep mode. Interrupts may be used to wake up the chip from sleep mode. The interrupts to the Power Management 838 may be level-triggered (high/low). When the chip wakes up from Sleep mode the clock oscillator may start up before program execution starts.

Figure 18:
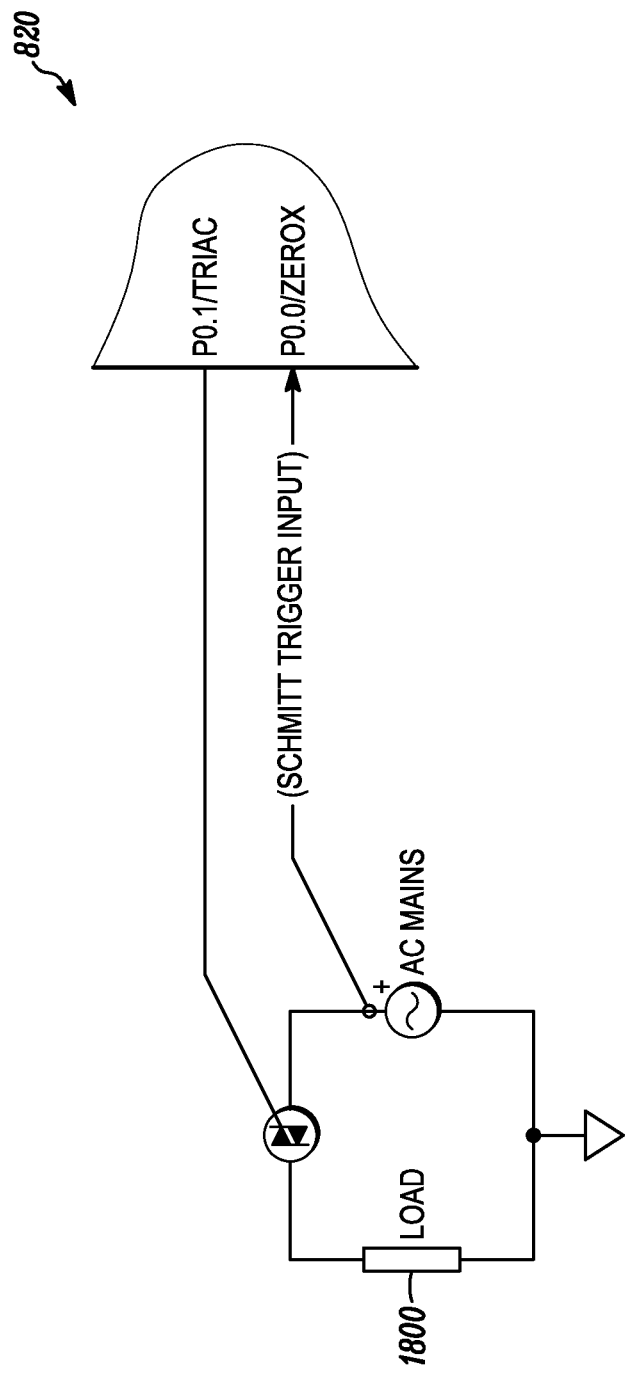
FIG. 18 shows a simplified Triac application circuit.
Figure 19:
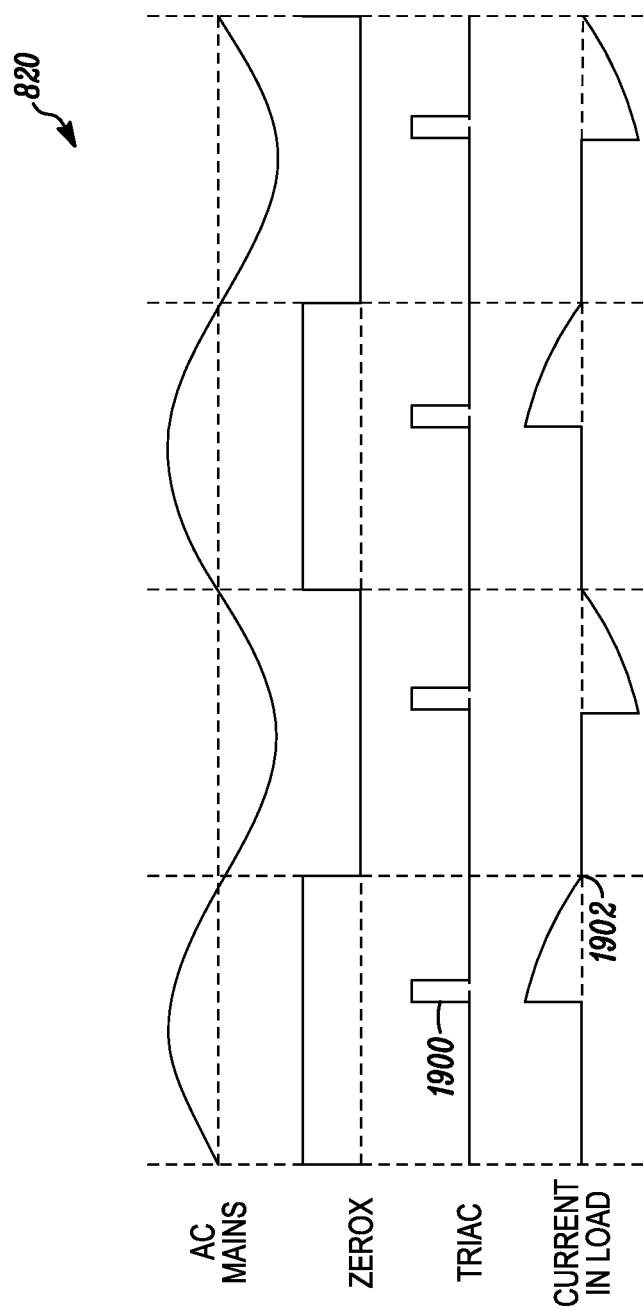
FIG. 19 shows typical Triac waveforms.
Figure 20:
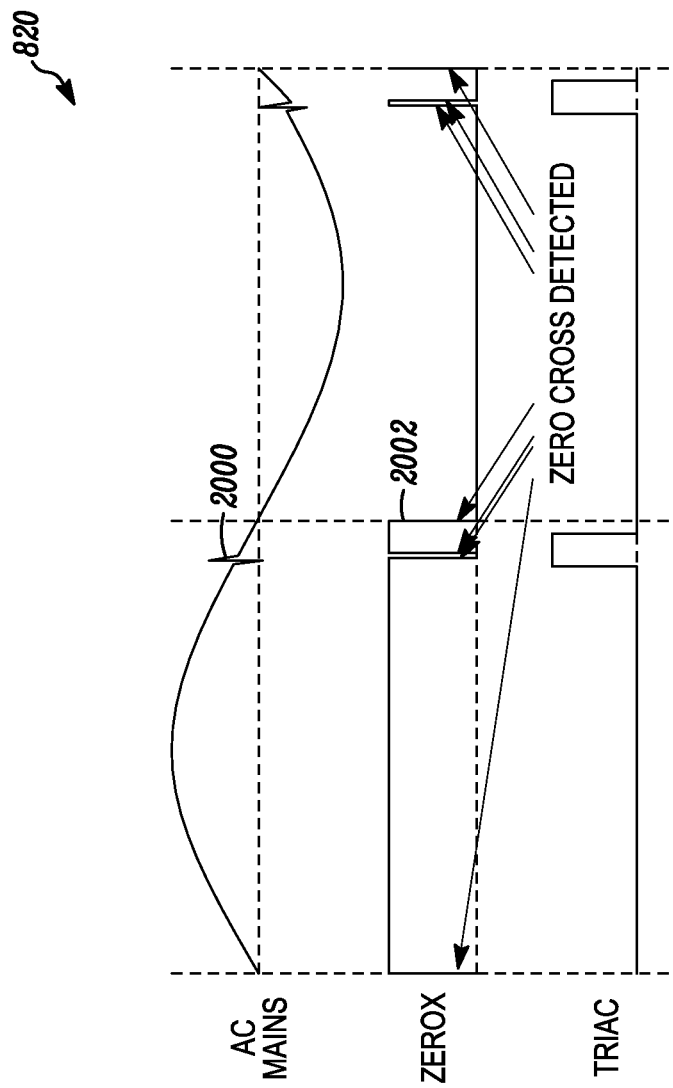
FIG. 20 shows zero cross detection disturbed by noise.
Figure 24:
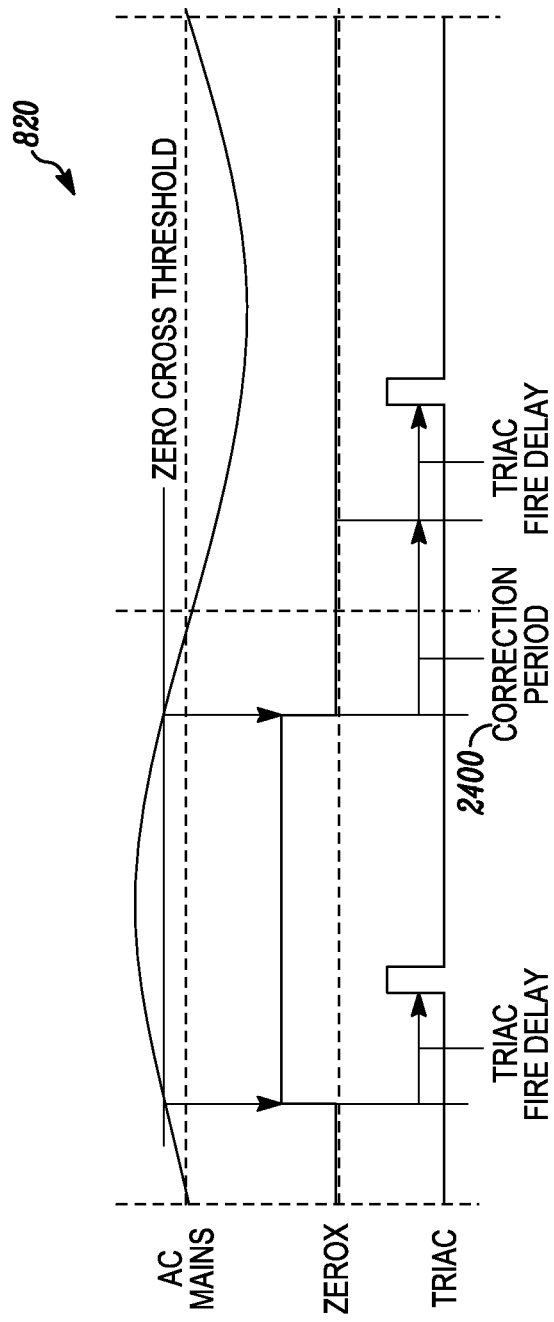
FIG. 24 shows Triac fire delay of FIG. 23 with a correction period.

This implementation may have a Triac Controller 820 which uses phase control for power regulation of resistive loads 1800 and to some degree non-resistive loads. FIG. 18 shows a simplified application circuit. The phase control method may conduct power during a specific time period in each half of the AC power cycle. FIG. 19 shows typical Triac waveforms. A Triac is commonly used to switch on and off the power to the load in the AC power system application. A gate voltage 1900 may be required to turn on the Triac (fire pulse). Once "on", the Triac may stay "on" until the AC sine wave reaches zero 1902 current regardless of the gate voltage. The power regulation is performed by controlling the fire angle (turn on start time). The Triac may deliver the power to the load after the fire angle and turn off at the zero-crossing point. The fire pulse must be of a certain duration in order to 1) provide sufficient charge for the Triac to turn on and 2) ensure that is does not subsequently switch off due to potential noise. The duration of the fire pulse may be programmed in SW. The zero cross detection may be disturbed by noise 2000 on the AC line. In case this noise is strong enough it could worst case cause additional triggering 2002 on the ZEROX as shown in FIG. 20. In order to avoid these extra zero crossing triggers a noise mask 2100 has been implemented in the Triac Controller. The mask masks out zero crossings from the true zero cross until a period before the next true zero cross, as shown in FIG. 21. The zero cross detector may either be programmed to use both the rising edge and the falling edge of the zero cross signal 1900 (like the ZEROX signal in FIG. 19) or it may be programmed to only use the rising edge of the zero cross signal 2200 (like the ZEROX signal in FIG. 22). The Triac Controller may be programmed to generate an interrupt request to the MCU whenever it detects a zero cross. When detecting zero crosses on both rising and falling edges then the detection moments may be offset 2300 due to the threshold level of the ZEROX input, as shown in FIG. 23. Because of this offset the Triac fire pulse may not be fired at the same distance from the beginning of the positive period and from the beginning of the negative period. It means that the AC load, which the Triac controls, may have a DC voltage different from 0V. To make this DC voltage negligible, the Triac Controller may be programmed with a variable correction 2400 period to correct for the offset, as shown in FIG. 24.

In order to control a Triac, two signals are important. The ZEROX signal, which reflects the zero crossing of the mains signal, and the TRIAC signal, which is used to fire the Triac. The ZEROX signal is used to generate a fire pulse (TRIAC signal) for every half period, that is, both the rising edge and the falling edge are used as time base for generating the fire pulse. The zero-cross detection logic isn't toggling exactly on the zero cross because of the threshold level of the input buffer of the ZEROX pin. Therefore the fire pulse in the "negative" half period will be slightly earlier than the fire pulse in the "positive" half period. This difference generates an unwanted DC current in the connected appliance. To correct for this difference; a programming register, TRICOR, can be used to skew the time for the generation of the fire pulse in the negative half period, thus removing the difference and avoid DC in the controlled load. A benefit of this Triac control functionality is avoiding DC in the controlled load (specifically a problem for inductive loads).

Figure 25:
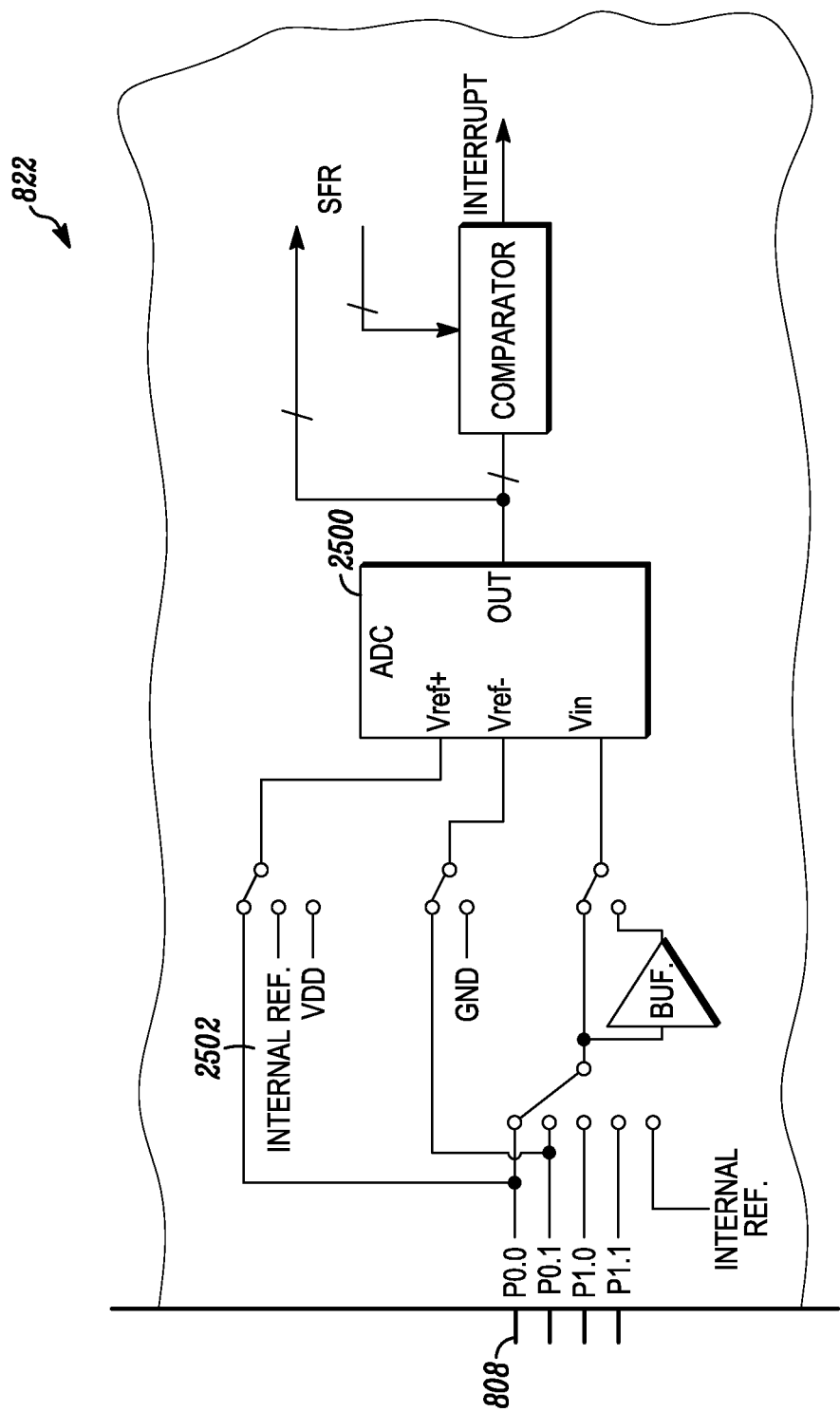
FIG. 25 illustrates an overview of the internal ADC block.

External interfaces are required for the ADC 822. ADC 822 may be a versatile rail-to-rail converter, which may operate in high-resolution 12-bit mode or a fast 8-bit mode. The ADC may be connected to the external circuit using GPIO 808 pins. The ADC may sample an analogue signal on any of the pins. The ADC is able to perform single conversion or continuous multi conversion. The ADC block may be programmed to generate an interrupt to the 8051W when a certain high or low threshold is exceeded. FIG. 25 gives an overview of the internal ADC block. The ADC may also be used for monitoring the supply level. In this set-up the Internal Reference 2502 is measured with reference to the supply level. The ADC input signal may be loaded by an internal sampling capacitor. In 8-bit mode the sampling time may be configured to fit the source impedance and frequency contents of the input signal. Alternatively an internal buffer may be switched in between the external source and the ADC to reduce capacitive loading of the input.

Figure 26:
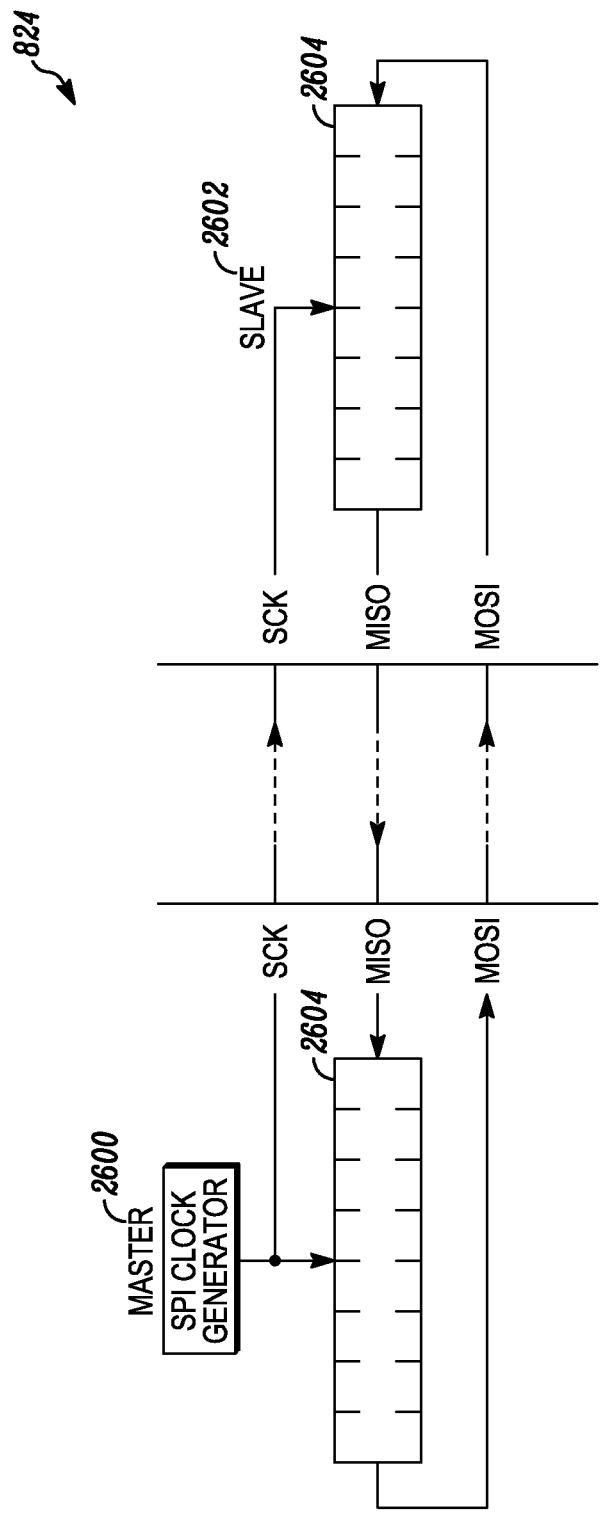
FIG. 26 shows two registers connected as one distributed shift register.
Figure 27:
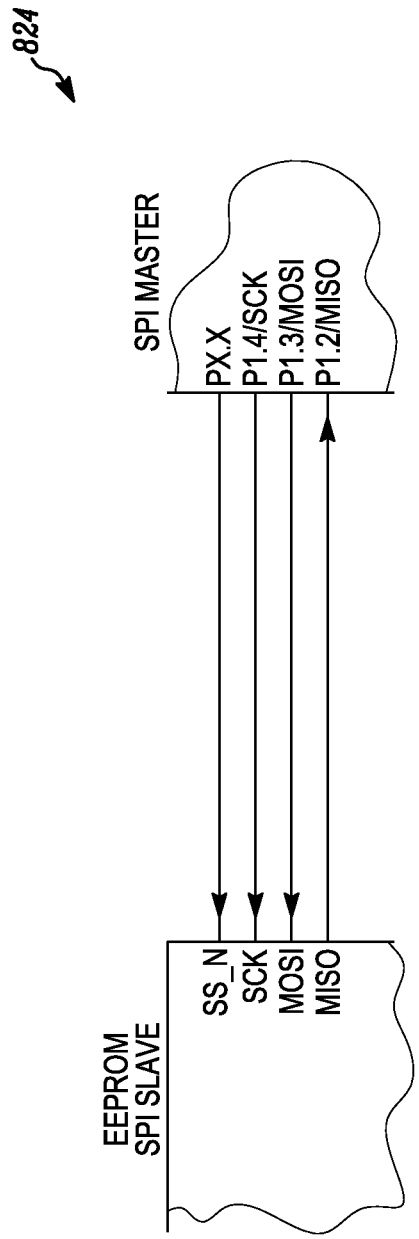
FIG. 27 shows a typical interface application of an EEPROM.

SPI 824 may be used for synchronous data transfer between the single chip 100 device and an external memory, used by some node types, or between a programming unit and the device. The SPI may not be available to the external application. Mater mode 2600 is activated when interfacing to an external EEPROM and slave 2602 during programming mode. The programming mode may be enabled by setting Reset low for an extended period. The SCK may be the clock output in master mode and is the clock input in slave mode. During data transmission the SCK may clock the data from a slave register into a master register. At the same time data may be clocked in the opposite direction from master to the slave connection. Consequently the two registers 2604 may be considered as one distributed circular shift register as illustrated in FIG. 26. After 8 clock cycles the two registers will have swapped contents. FIG. 27 shows a typical interface application to an EEPROM.

Figure 28:
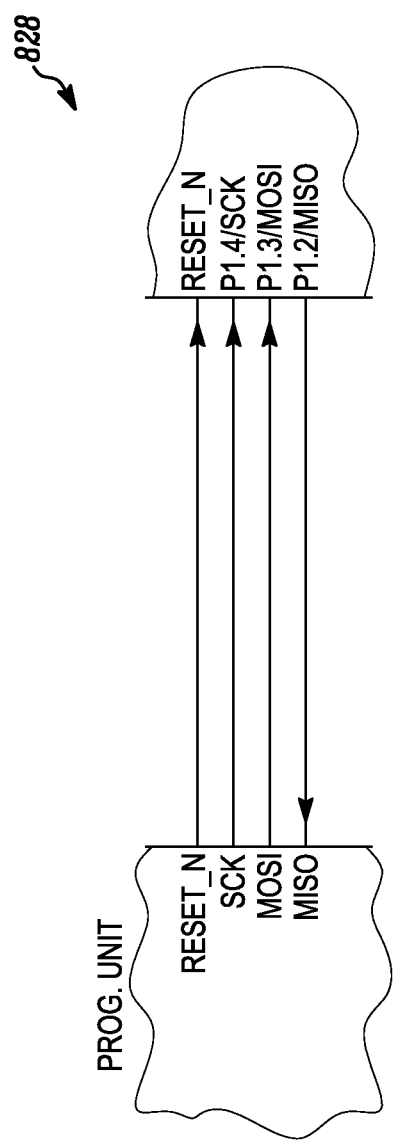
FIG. 28 illustrates a simplified block diagram of a typical interface to programming equipment.

An embodiment may contain a function for programming external memory, such as external Flash memory. In flash programming mode an external master may control the SPI bus causing node 100 to act as slave. In programming mode the flash may be erased, read, and/or written. Moreover it is possible to read a signature byte identifying the chip, enable/disable read/write protection, and/or read/write the Home ID. Flash programming mode may be entered by setting and keeping the Reset pin low. When the Reset has been held low for two XTAL periods then the SPI may accept a Programming Enable command. The chip may not enter programming mode until the two first bytes of the Programming Enable has been accepted. After the chip has entered programming mode the device may stay in programming mode as long as the Reset pin is held. When the Reset pin is set high the chip may generate an internal master reset pulse and normal program execution may start up. The watchdog function may be disabled as long as the chip is in programming mode and all other GPIO's 808 than the SPI 824 interface may be tri-stated. FIG. 28 gives a simplified block diagram of a typical interface to programming equipment.

Figure 32:
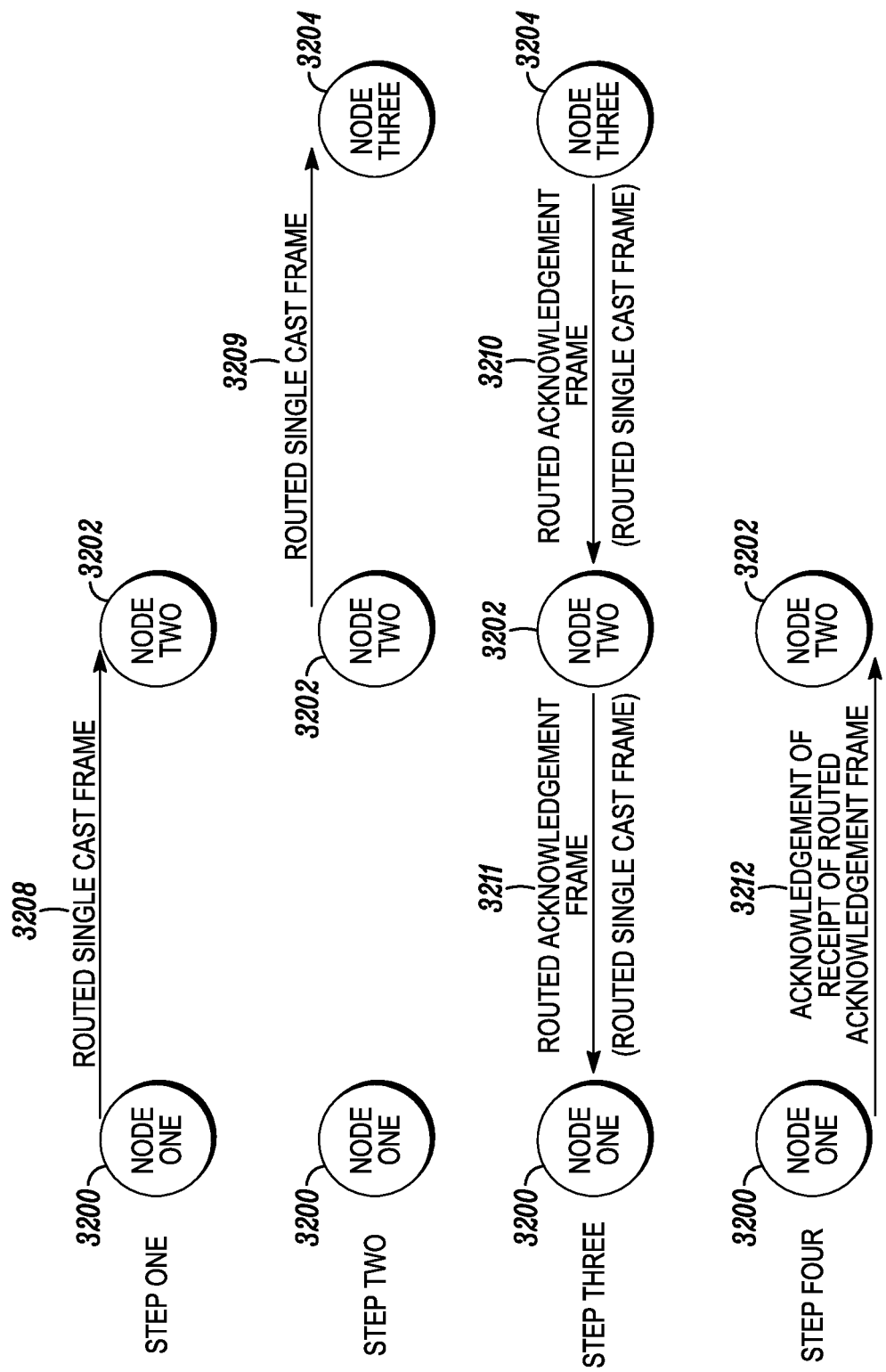
FIG. 32 illustrates a simplified embodiment of silent acknowledgement of a single cast frame routed over a mesh network.

Referring to FIG. 32, the present invention may include a method and system for silently acknowledging a successful transmission of a single case frame from a first node to a second node. For example, a single cast frame 3208 may be sent from a first node 3200 to a third node 3204 by using a second node 3202 as an intermediate relay between the first 3200 and third nodes 3204. As the second node 3202 sends the single cast frame 3209 that it received from the first node 3200 onto the third node 3204, the first node 3200 may be able to detect the single cast frame 3209 sent from the second node 3202 to the third node 3204 and interpret this single cast frame 3209 as an acknowledgement of success in sending the single cast frame 3208 from the first node 3200 to the second node 3202. Third node 3204 may send a routed acknowledgement frame 3210 to node two 3202 indicating that it received the single cast frame 3209 from node two 3202. The third node 3204 may be able to detect the routed acknowledgement frame 3211 sent from the second node 3202 to the first node 3200 and interpret this routed acknowledgement frame 3211 as an acknowledgement of success in sending the routed acknowledgement frame 3210 from the third node 3204 to the second node 3202. The first node 3200 may then send an acknowledgement 3212 to node two 3202 that it received the routed acknowledgement frame 3211 from node two 3202. This process may be repeated throughout a single cast frame transmission sequence, with subsequent nodes (e.g. the fourth or sixtieth node in a transmission sequence, etc.) wherein a sending node detects a transmission from a receiving node to a third node, and interprets this as acknowledgement that the receiving node successfully received a transmission from the sending node In embodiments, this silent acknowledgement routing schema may be implemented through an ASIC or any other consolidated processor platform described herein and or illustrated in the included figures.

In embodiments, a second single cast frame may be sent from the second node to a third node in a mesh network, and detection of the second single cast frame by the first node interpreted as an acknowledgement of success in sending the first single cast frame from the first node to the second node. A single cast frame may be a routed single cast frame. It may be routed based at least in part on a routing table. A single cast frame may be related to a metadata, a command, or some other form of data. A command may relate to including and or excluding a node in a mesh network, to enabling a security functionality, to a communication speed, to a communication channel, to a communication channel availability, to a network security level, to a network topology, to a network routing strategy, or some other command type.

In embodiments, a network mandated speed may be 9.6 kbps, 40 kbps, 100 kbps, or some other communication speed.

In embodiments, a communication channel availability may be associated with a single channel or a plurality of channels.

In embodiments, a network security level may be high, medium, low, or some other network security level.

Still referring to FIG. 32, a single cast frame may be routed over a mesh network topology that is an automation system network for controlling a device. A device may be a plurality of devices. In embodiments, the mesh network topology may be implemented within a home. A home mesh network topology may be related to an audiovisual system, such as an audiovisual system including an entertainment device. An entertainment device may be a television, a signal conversion device, a DVR, a networked device, a UPnP networked device, a satellite receiver, a cable converter, a VCR, a digital video disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, an audio file player, and audio component, an audio-visual component, or some other entertainment device.

In embodiments, the mesh network topology may be related to a security system. A security system may include an alarm, a lock, a sensor, a detector (such as a motion detector, and the like), or some other security system component.

In embodiments, the mesh network may be a wireless mesh network.

In embodiments, a node within the mesh network may be a multi-speed node.

Figure 33A:
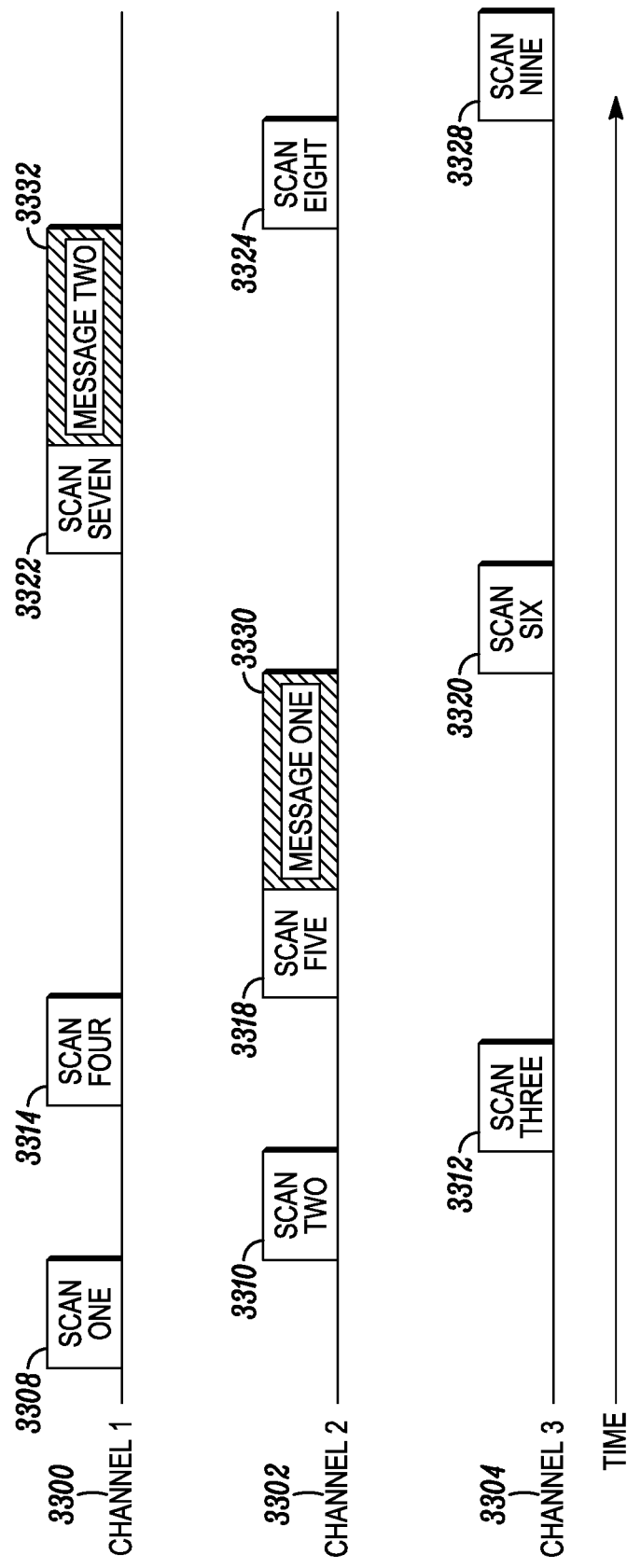
FIG. 33A illustrates a simplified embodiment of dynamic enablement of a secondary channel selection.
Figure 33B:
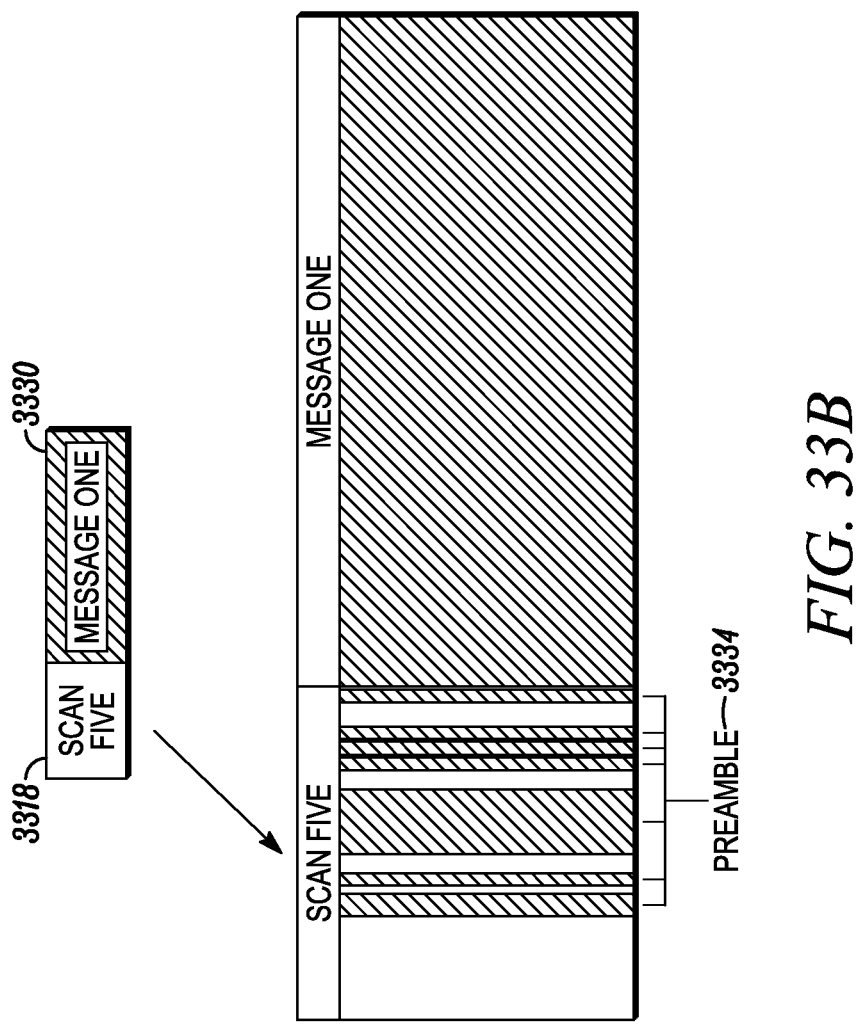
FIG. 33B illustrates a simplified embodiment of the use of a preamble during a dynamic enablement of a secondary channel selection.

FIG. 33A illustrates a simplified embodiment for dynamically enabling channel selection within a mesh network containing three channels. A node may begin a scan one 3308 on channel one 3300 and remain on the channel for a predefined duration. If the node does not detect a signal, the node may switch to channel two 3302 and begin scan two 3310. If during scan two 3310 a signal is not detected, the node may switch to channel three 3304 and begin scan three 3312. If no signal is detected during scan three 3312, the node may cycle back to channel one 3300 and begin scan four 3314. If no signal is detected during scan four 3314, the node may switch to channel two 3302 and begin scan five 3318. In this simplified hypothetical example, a signal may be detected during scan five 3318 on channel two 3302. As depicted in FIG. 33B, the signal that is detected during scan five 3318 may be a preamble 3334 that indicates to the node that a message is to follow and that the node should remain on channel two 3302 beyond the predefined duration originally set for scan five 3318. Following receipt of the preamble or plurality of preambles, the node may receive message one 3330 over channel two 3302. Following receipt of message one 3330, the node may switch to channel three 3304 and remain on the channel for the predefined duration of scan six 3320. If no signal is received during scan six 3320, the node may switch back to channel one 3300 and begin scan seven 3322. Scan seven may include a signal, such as a preamble or plurality of preambles, and remain on channel one 3300 beyond the predefined duration in order to receive message two 3332. Following receipt of message two 3332, the node may continue switching channels in scan eight 3324, scan nine 3328, and so forth, remaining on a channel for a predefined duration in order to detect a signal, and switching channels once the predefined duration has expired without a signal detected.

In embodiments, the message received by a node may be a plurality of messages. The message may be a command. A command may relate to including and or excluding a node in a mesh network, to enabling a security functionality, to a communication speed, to a communication channel, to a communication channel availability, to a network security level, to a network topology, to a network routing strategy, or some other command type.

In embodiments, the dynamic enablement of a secondary channel described herein may be implemented through an ASIC or any other consolidated processor platform described herein and or illustrated in the included figures.

In embodiments, a network mandated speed may be 9.6 kbps, 40 kbps, 100 kbps, or some other communication speed.

In embodiments, a communication channel availability may be associated with a single channel or a plurality of channels.

In embodiments, a network security level may be high, medium, low, or some other network security level.

In embodiments, the signal may be a predefined signal type.

In embodiments, the signal may be an implementation specific preamble signal. The implementation specific preamble signal may be predefined. The implementation specific preamble signal may be dynamically defined. In embodiments, the implementation specific preamble signal may equal a specific number of preamble symbol (a symbol consists of one or more bits). A preamble with less than the specific number of preamble signals may generate a command for a node to change to another channel. A preamble with equal the specific number of preamble symbol may generate a command for a node to remain on the current channel. A preamble with greater the specific number of preamble signals may generate a command for a node to remain on the current channel. The selection of the second channel may be based at least in part on a combination of receiving the signal and a round robin algorithm, a combination of receiving the signal and a predefined algorithm, a combination of receiving the signal and a locally based heuristic, or some other signal-rule combination.

In embodiments, the mesh network is a wireless mesh network.

In embodiments, the present invention may provide a method and system for using a first node to select a first channel in a mesh network; transmitting a frame over the first channel to a second node in the mesh network; and using the first node to select a second channel over which to transmit the frame to the second node if failure of the transmission over the first channel to the second node is detected by the first node.

In embodiments, node communication within a mesh network may be based at least in part on a distributed routing method and system. In a distributed routing system, each node in the network may store at least two types of routing tables, a forward routing table and a reverse routing table. Routing tables may be used to indicate the route through which a given node within the network may transmit data. Routing tables may be based upon data that is obtained through the use of an explore frame, or a plurality of explore frames.

In an example, a user of a mesh network containing a Node 1, Node 2, Node 3, Node 4, and Node 5 may wish to transmit data from Node 1 to Node 5. In this example, Node 1 has not previously communicated directly with Node 5. Thus, Node 1 does not know the route to Node 5 (i.e. it does not have the route stored in its routing tables). As a result, Node 1 may broadcast an explore frame. Upon receipt of the explore frame from Node 1, Node 2 may update its reverse routing table to include information regarding the source of the explore frame (Node 1), the next "hop" (Node 1). Upon receipt of the explore frame from Node 1, Node 3 may update its reverse routing table to include information regarding the source of the explore frame (Node 1), the next "hop" (Node 2) and the destination node (Node 5). Upon receipt of the explore frame from Node 1, Node 4 may update its reverse routing table to include information regarding the source of the explore frame (Node 1), the next "hop" (Node 3) and the destination node (Node 5). Upon receipt of the explore frame from Node 1, Node 5 may update its reverse routing table to include information regarding the source of the explore frame (Node 1), the next "hop" (Node 4) and the destination node (Node 5). Continuing the example, next, Node 5 may transmit a report frame to Node 1 through Node 4; Node 4 may transmit a report frame to Node 1 through Node 3; Node 3 may transmit a report frame to Node 1 through Node 2; and, Node 2 may transmit a report frame to Node 1. Following receipt of the report frames from Nodes 2 through 4, Node 1 may update its routing table to include Node 5 as a destination, and Node 2 as the next hop node.

In embodiments, an algorithm may be used in a distributed routing system in which there is a local prioritization that determines which of the next hops are to be stored in a given routing table based at least in part on a metric. In an example, such an algorithm and its associated metric may be used to determine which of a plurality of received report nodes is to be stored in a node's routing table. For example, the metric employed by the algorithm may require that the node receiving more than one report frame store only the report frame having the lowest metric value, thus storing that data that is associated with the best available route.

In embodiments, the initiation of a node transmission within a distributed routing system may originate with a user request (e.g., a human operating a remote control), with a device initiated request (e.g. a smoke alarm activated during a fire), or some other origin.

In embodiments, a node may experience an error in transmission within a distributed routing method and system. For example, if Node 3 cannot communicate with Node 4 when forwarding a frame to Node 5 on behalf of Node 1, it may issue an explore frame for Node 5. This may have the effect of repairing the remaining communication path to Node 5.

In embodiments of the present invention, node communication within a mesh network may be based at least in part on a source routing method and system. A source routing method may be preferable to a distributed routing method and system, in certain embodiments, insofar as a source routing system does not require distributed memory and the storage of routing data at the node level. In embodiments, a mesh network using a source routing methodology may be associated with a central network topology server from which any node in the network may request network topology updates. A node may request network topology updates on a fixed time interval, upon the receipt of a type of transmission, or based upon some other criterion. The receipt of the network topology update data may enable a node to continuously ensure that its network awareness is accurate.

In embodiments, the network topology data that is stored within a central network topology server may not be accurate. As a result of the outdated network topology data, a node in the mesh network may have to use an alternate method and system for obtaining current network topology and routing data.

Figure 34:
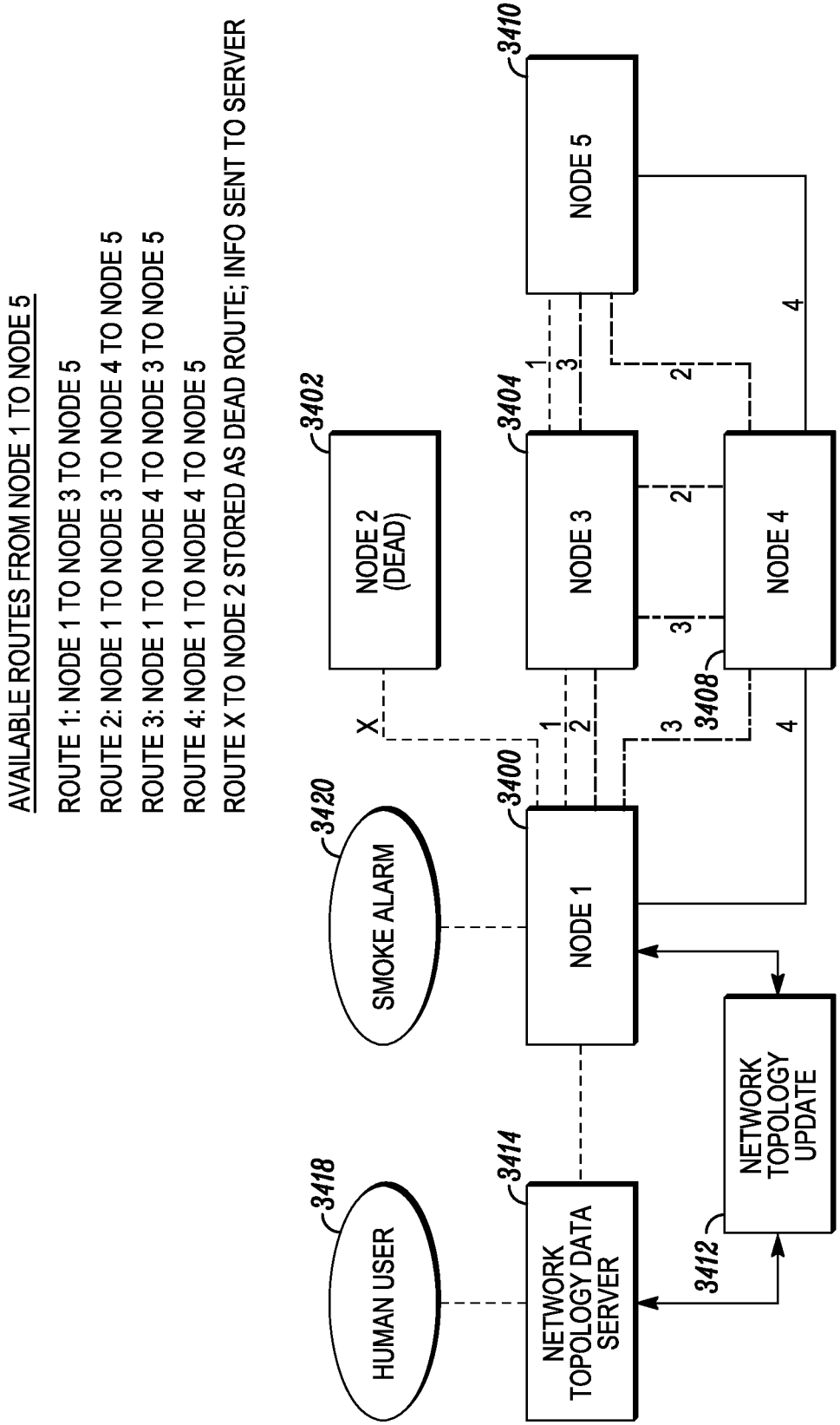
FIG. 34 illustrates a simplified embodiment of a source routing method and system.

In embodiments, route resolution through explore frames may be used to obtain current routing information in mesh network. Referring to FIG. 34, in an example, a Node 1 3400 may attempt to communicate with a destination node, Node 5 3410, in a mesh network using the network topology data obtained from a central network topology data server 3414, a source data master controller, or some other source of network topology data residing apart from the node itself. Node 1 3400 may as part of its algorithm have a preferred Node 1 3400 to Node 5 3410 route consisting of "Node 1 to Node 2 to Node 5." Upon failure of the transmission to the dead Node 2 3402 (e.g., the failure of Node 1 to receive an acknowledgement frame from Node 2 3402 indicating transmission success) Node 1 3400 may request a network topology update from the central network topology server 3414. Next, Node 1 3400 may again attempt to transmit to the destination node, Node 5 3410, this time using the updated network topology data. In this example, the second attempt of Node 1 3400 also fails due to inaccurate network topology data regarding the status of Node 2 3402 that is received from the central network topology server 3414. As a result, Node 1 3400 may broadcast explore frames using a flooding algorithm in which an explore frame is distributed to all of the nodes in the mesh network with which Node 1 3400 may communicate (for the example embodied in FIG. 34 it is presumed that Node 1 3400 is unable to directly communicate with Node 5 3410 due to too great a physical separation between the nodes). Thus, Node 1 3400 sends an explore frame that's picked up by Node 3 3404 and Node 4 3408. Node 3 3404 in turn forwards a copy of the explore frame from Node 1 3400 which is picked up by Node 4 3408 and Node 5 3410. Similarly, Node 4 3408 forwards a copy of the explore frame which is picked up by Node 3 3404 and Node 5 3408. Upon receipt of the explore frames, Node 5 3410 transmits a frame back through Node 3 3404 and Node 4 3408, which in turn transmit to the nodes with which each has contact: Node 4/Node 3, and Node3/Node 1, respectively. During each transmission between nodes, a node ID is appended to the message header indicating its origin. As a result, the report frames received by Node 1 3400 each indicates the route traveled from Node 5 3410 to Node 1 3400. In an embodiment, this data may be used to confirm the presence of an available route that Node 1 3400 may use in transmitting data from Node 1 3400 to Node 5 3410. In the example illustrated in FIG. 34, the available routes are:

Route 1: Node 1 to Node 3 to Node 5;
Route 2: Node 1 to Node 3 to Node 4 to Node 5;
Route 3: Node 1 to Node 4 to Node 3 to Node 5;
Route 4: Node 1 to Node 4 to Node 5.

In embodiments, an algorithm may be associated with Node 1 3400 and used to distinguish among the routes that are available for transmitting between Node 1 3400 and Node 5 3410. For example, the algorithm may include information on traffic density over each route and select the least busy route for transmission. Alternatively, the order in which the report frames are received may be used as a proxy by the algorithm for determining which of the routes is associated with the faster transmission. Alternatively, the algorithm may use some other network information as a basis for selecting which of the available routes to use in transmitting from Node 1 3400 to Node 5 3410.

In embodiments, any node in the mesh network may initiate the explore frames as shown for Node 1 3400 in FIG. 34.

In embodiments, the frame distributed by Node 1 3400 may be a special frame type (e.g. explore report frame).

In an embodiment, the available route information received by Node 1 3400, indicating, in part, that Node 2 3402 is dead, may be transmitted to the central network topology server 3414 in order for it to update 3412 its inaccurate network topology. In an embodiment, the central network topology server 3414 may then broadcast the network topology update to all nodes in the mesh network in order to inform each of Node 2's 3402 demise.

In embodiments, the initiation of a node transmission within a source routing system may originate with a user request (e.g., a human operating a remote control) 3418, with a device initiated request (e.g. a smoke alarm activated during a fire) 3420, or some other origin.

Figure 35:
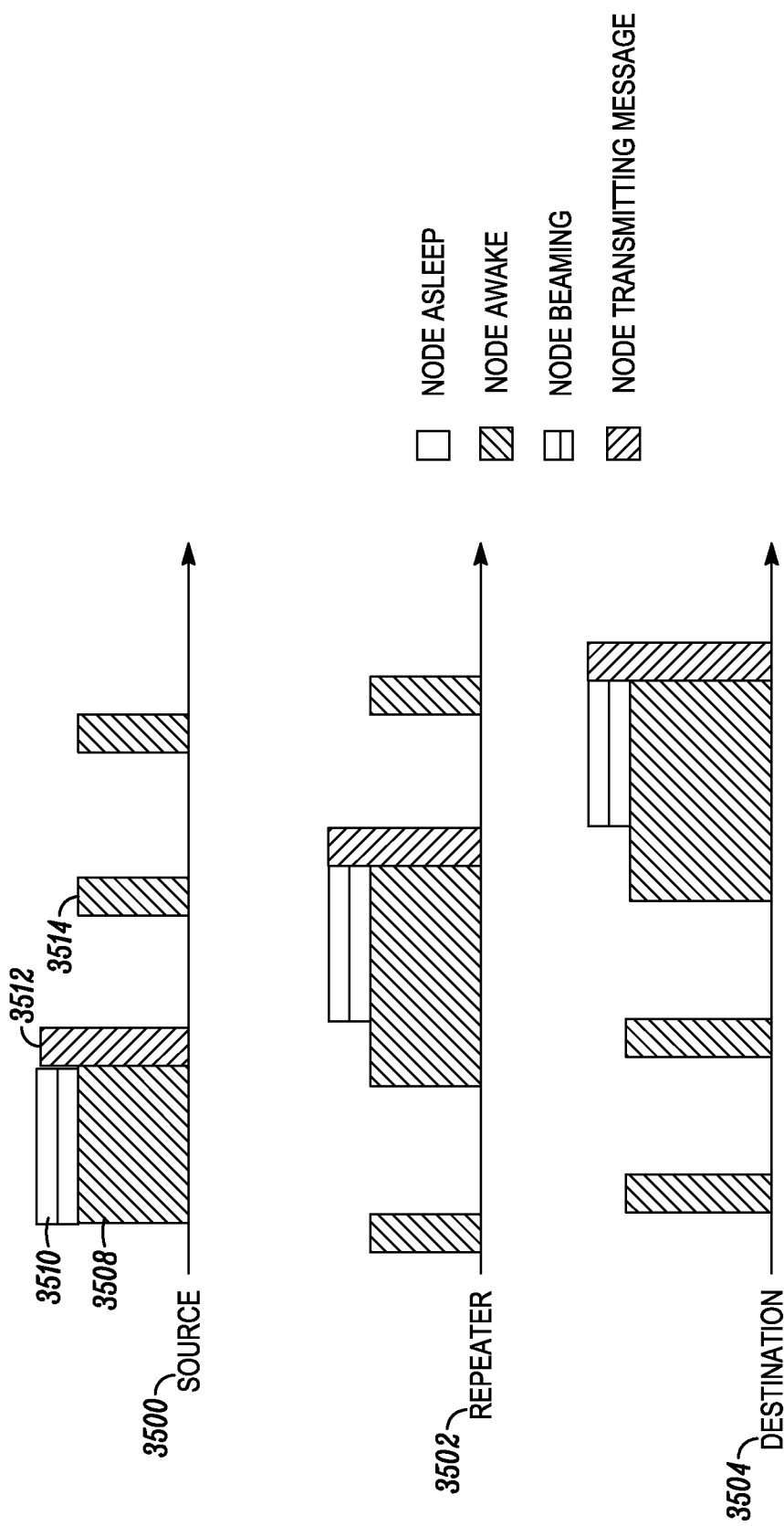
FIG. 35 illustrates a message transmission with node beaming in a simplified network

As illustrated in FIG. 35, in embodiments, a mesh network node, including but not limited to a battery-powered node, may cycle through "asleep" periods during which time the node is unable to receive a message, and "awake" periods 3514 when the node is powered and enabled to receive a transmitted message 3512. The time interval between the awake periods 3514 of node may be varied across nodes within a network. For example, one node may operate at an interval of 0.25 seconds, and another within the same mesh network may have an awake period 3514 interval of 1.0 seconds. The time interval between the awake periods 3514 may be node-specific, may be the same across a mesh network, or the same for only a subset of nodes within a mesh network.

FIG. 35 shows a simplified mesh network, such as a wireless mesh network, consisting of three nodes: a source node 3500, a repeater node 3502, and a destination node 3504. In the example, the source node 3500 seeks to transmit a message 3512 to the destination node 3504 by using the repeater node 3502 as an independent relay. Each of the nodes is cycling through awake period intervals 3514. The asleep periods of the nodes may enable the nodes to conserve their electrical usage, as compared to a node that is fully powered at all times. This may enable a battery powered node to conserve its electrical storage and provide a longer battery life to the nodes in the network. This may minimize maintenance, user operator interaction, cost, or some other variable.

In the FIG. 35 example, the source node 3500 seeks to transmit a message 3512 first to the repeater node 3502. Because the repeater node 3502 must be in an awake period 3514 (i.e., powered) in order to receive the message 3512, the source node 3500 precedes the message 3512 with a "wake up beam" 3510 that exceeds the length of the asleep period of the repeater node 3502. This may ensure that no matter when the source node 3500 initiates transmission of the beam there will be at least one awake period 3514 during which time the repeater node 3502 may receive it. Once the repeater node 3502 is in an awake period 3514 that temporally overlaps transmission of the beam 3510, it is instructed to remain active (as opposed to its standard procedure of cycling back into the asleep mode) and the repeater node continues to remain powered and enable to receive a transmitted message 3512. In this awake state 3514, the repeater node 3502 may now receive the transmitted message 3512 that is associated with the beam 3510 sent from the source node 3500. The repeater node 3502 may next relay the message 3512 on to the destination node 3504 using the same methods and systems as that used in the source-to-repeater-node-transmission.

Figure 36:
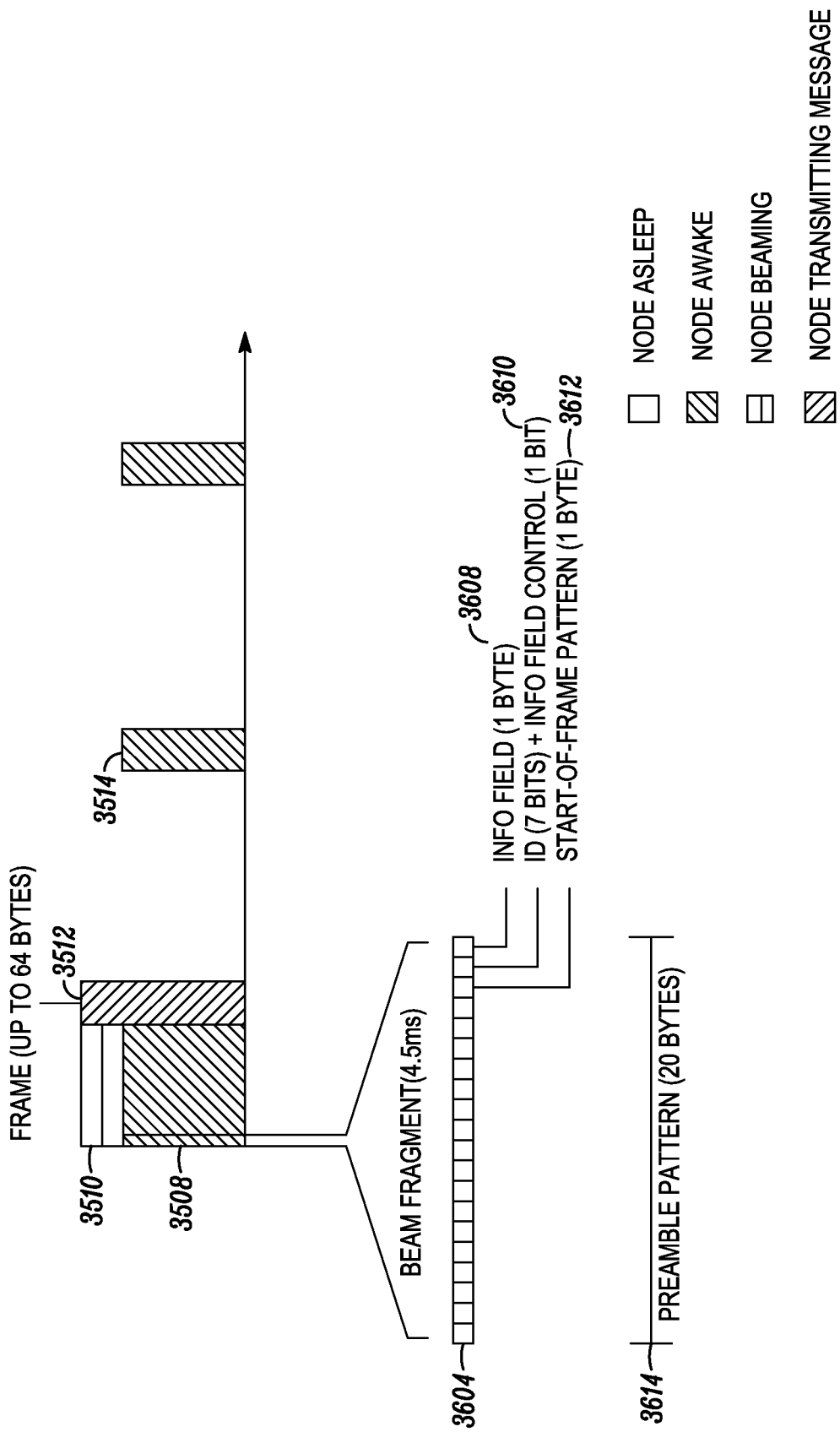
FIG. 36 illustrates a preamble pattern within a node beam.

Referring to FIG. 36, in order to indicate to the repeater node 3502 that the beam 3510 and its associated message 3512 are intended for it, the beam 3510 may include a preamble pattern 3614 within a fragment of the beam 3604. A preamble pattern 3614 may consist of 20 bytes and include within it an info field 3608, a node ID and info field control 3610, a start-of-frame pattern 3612, or some other information. This information may be used to indicate which nodes are to remain active upon receipt of a beam 3510, and enable it to receive a message 3512 upon receipt of the beam 3510. In embodiments, the information contained with the preamble may be specific to a single node, all nodes within a mesh network, or some subset of nodes within a mesh network.

In embodiments, a mesh network according to the methods and systems describe herein may include configuring a constant powered mesh network node to control the configuration of an intermittently powered mesh network node, wherein the intermittently powered mesh network node periodically powers down to conserve energy; and causing the intermittently powered mesh network node to request configuration information from the constant powered mesh network node when the intermittently powered mesh network node powers up.

In embodiments, a node may be powered by a battery, a fuel cell, a solar cell, an alternative energy source, AC power source, DC power source, or some other energy supply.

In embodiments, a wake up destination may maintain a plurality of configurations associated with a plurality of intermittently powered mesh network nodes.

In embodiments, a configuration facility may be used to configure the constant powered mesh network node. A configuration facility may be a portable node, a handheld node, a PDA node, a permanently mounted facility, or some other node or facility type.

In embodiments, the present invention provides a method and system for scanning a plurality of nodes in a mesh network to identify a current active wake up destination for a battery powered mesh network node; requesting the current active wake up destination to send a change wakeup destination signal; and requesting a new route from a node in the mesh network if the battery powered mesh network node does not have a wakeup destination in its memory. In embodiments, the method may further comprise a battery powered mesh network node confirming a change from a first wakeup destination to a second wakeup destination.

In embodiments, the mesh network may be a wireless mesh network.

In embodiments, the present invention provides a method and system for associating a first node in a mesh network with a communication type; activating the first node at a predefined interval to detect the presence of a message of the communication type in a transmission from a second node in the mesh network; continuing to activate the first node at the predefined interval if the transmission from the second node does not conform to the associated communication type of the first node; activating the first node beyond the predefined interval if the associated communication type is detected in the transmission from the second node; and receiving a message at the first node from the second node following detection of the associated communication type.

In embodiments, a node, including but not limited to a battery powered node, may be associated with a device. A device may be a consumer electronic device, or some other device. A consumer electronic device may be networked. A consumer electronic device may be UPnP networked. A consumer electronic device may be a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a refrigerator, a freezer, a microwave, an oven, a stove, a computer, a printer, a fax, a scanner, a copier, a gateway, a modem, an ISDN, a garage door, a door lock, a drape, a storm shutter, a window opener, a door opener, a sprinkler, or some other device, component, gadget, electronic system for indoor or outdoor use.

In embodiments, a battery powered node may be associated with a capacitor. A capacitor may be further associated with a device. In embodiments, a battery powered node may be associated with a rechargeable battery. A rechargeable battery may be associated with a device.

In embodiments, a mesh network may include a plurality of battery powered nodes.

In embodiments, a node may be associated with a node ID. A node ID may be unique to a node. A node ID may be randomly assigned. A node ID may be associated with a plurality or nodes.

In embodiments, a node in a mesh network may be associated with data indicating which nodes in the mesh network are battery-powered. This data may be stored locally at the node, stored in a central network topology server, or stored in some other location.

In embodiments, a communication type may be identified based at least in part on data in a message preamble pattern. A message preamble pattern may be associated with a sensor network. A sensor network may be a grouping of network nodes. A grouping of network nodes may be created by a user, an algorithm, or some other method or system. In embodiments, a sensor network may be associated with a network identifier. A message preamble pattern may include a network identifier.

In embodiments, a sensor network may be associated with an edge node that is further associated with a network.

In embodiments, a message may be transmitted through a mesh network using a flooding algorithm. A flooding algorithm may include an instruction for a first node to transmit the message to all mesh network nodes with which it can communicate. A flooding algorithm may include an instruction for a node receiving a first node's transmitted message to further transmit the message to all mesh network nodes with which it can communicate.

In embodiments, a message may be associated with route information.

In embodiments, a message preamble pattern may be associated with route information.

In embodiments, route information may include the identifiers of the nodes within a route. Route information may include an indication if a node in a route is battery-powered or not. Route information that includes a battery-powered node may be further associated with an algorithm to associate message preamble pattern to activate a node for a sufficient period to receive a message.

In embodiments, activation of a first node beyond the predefined interval may enable it to receive a plurality of messages prior to deactivating.

In embodiments, a message transmitted from a first node to a second node may be further transmitted to a third node in the mesh network. A third node may be a plurality of nodes. A third node may be activated at a predefined interval to detect the presence of a communication type as with the first node transmission to a second node.

In embodiments, a mesh network may be a wireless mesh network.

In embodiments, a message may be associated with a message identifier. A message may include a list of all nodes to which the message has previously been forwarded.

In embodiments, a first node may store a list of neighbouring nodes. In embodiments, a node may compare a list of neighbouring nodes to the list of all nodes to which the message has previously been forwarded, and relay the message only to those neighbouring nodes that have not previously received the message.

In embodiments, a mesh network signal may be a radio signal.

In embodiments, a mesh network signal may be an infrared signal.

Figure 37:
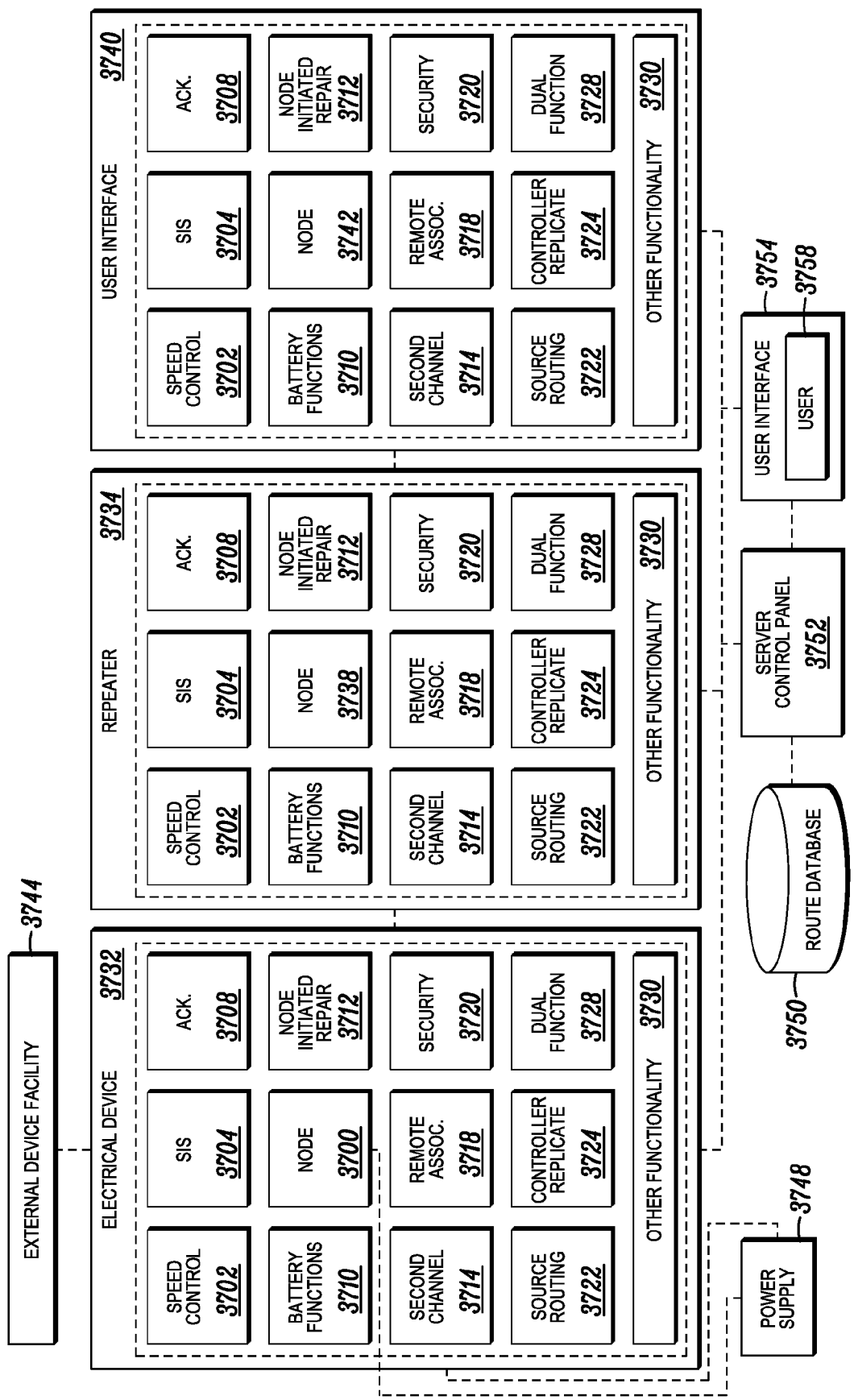
FIG. 37 illustrates a simplified wireless network incorporating an electrical device.

Referring to FIG. 37, in embodiments, a mesh network node (3700, 3708, 3742) may be associated with an electrical device 3732, a repeater 3734, a user interface 3740, or some other facility. In embodiments, a node 3700 may be associated with a power supply 3748. In embodiments, a mesh network node (3700, 3708, 3742) may be associated with a functionality including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein. A functionality associated with a mesh network node (3700, 3708, 3742) may be used in combination with each of the other functionalities, including a plurality of the functionalities.

In an example, an electrical device 3732 may be associated with a node 3700 that is operating in a wireless mesh network that includes a mix of AC-powered devices and battery-powered devices. Battery-functions 3710 may be associated with the node 3700 in order to extend the operational lifetime of the device. This same node 3700 may be further associated with an acknowledgement functionality 3708. For example, the node may receive a wakeup beam alone or in combination with a point-to-point flooding of nodes in the network. The wakeup beam may transmit a preamble alerting the battery-powered node 3700 to receive the message. Once the message is received, the node 3700 may acknowledge this receipt using an acknowledge functionality 3708 that is associated with the node 3700. This acknowledgement may be a silent acknowledgement functionality, as described herein, or some other form of acknowledgement functionality. In embodiments, just as in this example the node 3700 is associated with the combination of battery functions 3710 and acknowledgement 3708, a node 3700 may be further associated with any other functionality or combination of functionalities described herein including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730.

In embodiments, an electrical device 3732 may be associated with an external device facility 3744. In an example, an electrical device 3732, such as a door status device that is enabled to determine if a door is "open" or "closed," may be further associated with an external device facility 3744, such as an alarm speaker that is enabled to sound if the door is opened.

In embodiments, an electrical device 3732, repeater 3734, and/or user interface 3740, and their corresponding mesh network nodes (3700, 3708, 3742) and functionalities, may be associated with a server control panel 3752, route database 3750, user interface 3754, and/or a user 3758. In an example, a user 3758 may employ a user interface 3754 such as a panel with a numeric keypad, a mobile device, or some other user interface 3754 to communicate with a mesh network. The user 3758 may be able to issue a command (e.g., "turn on the porch light") to the mesh network through the user interface 3754. The command may be communicated to a server control panel 3752. The server control panel 3752 may be associated with a route database 3750 which stores the route information for transmitting a command to the node 3700 that is associated with the electrical device 3732 (e.g., "porch light node"). The server control panel 3752 may transmit the command to the node 3700 directly, or it may use an intermediate repeater 3734, or plurality of repeaters.

In embodiments, an electrical device may be a home control device, an audio-visual device, a security device, a temperature control device, an environmental device, a lighting device, a healthcare device, a user interface device, or some other electrical device type.

In embodiments, a home control device may be an electrical lamp, a stand alone light, a fixed light, a refrigerator, a stove, a microwave, a freezer, a coffee machine, an oven, a window covering, a lock, an HVAC device, a garage door, an alarm system, a camera, a camcorder, a sprinkler, a wine cooler, a dishwasher, a washing machine, a dryer, a water softener, a humidifier, a dehumidifier, an awning, a window opener, a rice cooker, an iron, a door opener, a gas detector, a fax, a shredder, a keyboard, a mouse, a trackball, a pen, a pool circulator, a pump, a valve, a hot water heater, a boiler, an appliance motor, a communication link, a machinery device, a garden light, a landscape light, an invisible pet fence, a gate, a spa, or some other home control device type. In embodiments, each home control device type may be associated with a plurality of repeater nodes 3734, user interface nodes 3740, external device facilities 3744, and the like. The home control device may be associated with an external power supply 3748, as described herein. The home control device may be associated with an external user 3758, user interface 3754, and a server control panel 3752 and route database 3750. In embodiments, the home control device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a user 3758 who is a commuter in traffic during a rainstorm may recall that she left a window open in her home when leaving for work in the morning and now wish to close that window to prevent water damage on her wood floor. This user 3758 may use a user interface 3754, such as a cell phone, PDA or some other user interface, to send a command to her home mesh network to close the window. The command may be transmitted to a server control panel 3752. The server control panel 3752 may access route information regarding how to route the command to the node 3700 that is associated with the electrical device 3732 controlling the window (e.g. a motor). The server control panel 3752 may associate the command with the route information and transmit the command to a repeater 3734, a plurality of repeaters, or directly to the node 3700 associated with the electrical device 3732 controlling the window. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein. For example, the command may be associated with a security functionality 3720 that authenticates the user, user interface, and like from which the command originates. Upon receipt of the command, the node 3700 may activate the motor controlling the window in order to close it. In another example of functionality that may be associated with the transmission of the command to the electrical device, as the command is transmitted from node to node, acknowledgement 3708 may be used to verify a successful transmission of the command.

In embodiments, an audio-visual device may be a VCR, a TV, a personal computer, a stereo, a radio, a phonograph, an MP3, a streaming media player, an amplifier, a camera, a camcorder, a scanner, a copier, a surround sound device, a light, a cable, a network, a satellite dish, a wireless router, a CD player, an Ipod, a communication link, an HDMI bridge/converter, or some other audio-visual device type. In embodiments, each audio-visual device type may be associated with a plurality of repeater nodes 3734, user interface nodes 3740, external device facilities 3744, and the like. The audio-visual device may be associated with an external power supply 3748, as described herein. The audio-visual device may be associated with an external user 3758, user interface 3754, and a server control panel 3752 and route database 3750. In embodiments, the audio-visual device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a user 3758 may have a personal computer that is connected to the Internet from which it may access streaming media content. This personal computer may be further associated with a network, cable, and the like which includes, in part, a monitor such as a TV. This user 3758 may use a user interface 3754, such as a TV monitor with a remote control, personal computer monitor or some other user interface, to send a command to her home mesh network to download streaming media, such as a movie, to her personal computer and to transmit the movie through the home network for viewing on the TV monitor. Each electrical device (e.g., personal computer, network, TV, etc.) may be associated with a node 3700 within the mesh network. The command to retrieve the streaming media may be transmitted to a server control panel 3752. The server control panel 3752 may access route information regarding how to route the command to the node 3700 that is associated with the electrical device 3732 controlling the personal computer. The server control panel 3752 may associate the command with the route information and transmit the command to a repeater 3734, a plurality of repeaters, or directly to the node 3700 associated with the electrical devices 3732 necessary for presenting the streaming media on the TV monitor. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a security device may be a home alarm, a smoke alarm, a fire alarm, a siren, a bell, a gas detection alarm, a motion detector, a light, a motion-detector-lighting combination, an intercom system, a paging system, or some other type of security device. In embodiments, each security device type may be associated with a plurality of repeater nodes 3734, user interface nodes 3740, external device facilities 3744, and the like. The security device may be associated with an external power supply 3748, as described herein. The security device may be associated with an external user 3758, user interface 3754, and a server control panel 3752 and route database 3750. In embodiments, the security device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a smoke alarm may be associated with a node 3700 in a mesh network. Upon detection of smoke, the smoke alarm may transmit a command over the mesh network using the node with which it is associated. This command may be transmitted to an external device facility 3744, such as a siren mounted on the outside of the house, a municipal firefighting station, or some other external device facility. This mesh network may be further associated with a user 3758 and a user interface 3754. The command may be transmitted to a server control panel 3752. The server control panel 3752 may access route information regarding how to route the command to the external device facility 3744, user interface 3754, or some other facility associated with the mesh network. The server control panel 3752 may associate the command with the route information and transmit the command to a repeater 3734, a plurality of repeaters, or directly to, for example, a user interface (3754, 3740) to alert the user 3758 that smoke has been detected at the house. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a temperature control device may be an air conditioner, a fan, a heater, a furnace, a thermostat, a water-based heater, a forced-air heater, a floor heater, or some other type of temperature control device. In embodiments, each temperature control device type may be associated with a plurality of repeater nodes 3734, user interface nodes 3740, external device facilities 3744, and the like. The temperature control device may be associated with an external power supply 3748, as described herein. The temperature control device may be associated with an external user 3758, user interface 3754, and a server control panel 3752 and route database 3750. In embodiments, the temperature control device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, an air conditioner may be associated with a node 3700 in a mesh network. A homeowner, upon learning that he must remain at work until late at night, may wish to intervene with his home thermostat's daily schedule of turning on the house air conditioner at 5 p.m. so that the house is cool when he arrives home. Instead, because his expected home arrival is now 11 p.m., he may wish to alter the schedule to turn on the air conditioner at 10 p.m. Using a user interface 3754, such as a personal computer in his workplace, this user 3758 may transmit a command to his home mesh network instructing it to alter the air conditioner's schedule. The command may be transmitted to a server control panel 3752. The server control panel 3752 may access route information regarding how to route the command to the electrical device 3732 (i.e., air conditioner). The server control panel 3752 may associate the command with the route information and transmit the command to a repeater 3734, a plurality of repeaters, or directly to the node 3700 that associated with the air conditioner. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, an environmental device may be a light sensor, a water sensor, a water leak sensor, a motion sensor, a humidity sensor, a soil moisture sensor, a temperature sensor, an animal detection sensor, a sensor-alarm combination, a sprinkler, a gas detector, a poison detector, a Geiger counter, a meter, an energy harvester, a pump, a valve, or some other type of environmental device. In embodiments, each environmental device type may be associated with a plurality of repeater nodes 3734, user interface nodes 3740, external device facilities 3744, and the like. The environmental device may be associated with an external power supply 3748, as described herein. The environmental device may be associated with an external user 3758, user interface 3754, and a server control panel 3752 and route database 3750. In embodiments, the environmental device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, an environmental device, such as a soil moisture sensor may be associated with a mesh network. The mesh network may also include other electrical devices, including other environmental devices, such as a sprinkler, a water leak sensor or some other electrical device. A soil moisture sensor may be further associated with rules relating to soil moisture threshold values, such that upon the soil dropping to a stated moisture level, the node 3700 associated with the soil moisture sensor transmits a command through the mesh network. A component of the command may be information signaling the sprinkler system to begin spraying the soil with water. The command may be transmitted to a server control panel 3752. Alternatively, the command may include data causing it to transmit directly to a node that is associated with the sprinkler system. The server control panel 3752 may access route information regarding how to route the command to the electrical device 3732 (i.e., sprinkler). The server control panel 3752 may associate the command with the route information and transmit the command to a repeater 3734, a plurality of repeaters, or directly to the node 3700 that associated with the sprinkler. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a lighting device may be a dimmer, a lighting control switch, an electric lamp, a luminary, a bulb, an energy saving lamp, an LED, an external light, an internal light, a pool light, a programmable light, or some other type of lighting device. In embodiments, each lighting device type may be associated with a plurality of repeater nodes 3734, user interface nodes 3740, external device facilities 3744, and the like. The lighting device may be associated with an external power supply 3748, as described herein. The lighting device may be associated with an external user 3758, user interface 3754, and a server control panel 3752 and route database 3750. In embodiments, the lighting device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a lighting device may be a lighting control switch that is associated with a node 3700 in a mesh network. A user 3758 driving in a car that is about to arrive at a users home may wish to illuminate the interior of his home prior to arriving as a means of alerting any intruders that someone may be arriving soon, and for the practical reason of removing the necessity of the user 3758 walking through the dark to turn on a light. To activate the lighting control switch, the user 3758 may employ a user interface (3754, 3740) to transmit a command to the home mesh network. This user interface may be the car's GPS navigation monitor, a cell phone, PDS, or some other user interface (3754, 3740). The command may be transmitted to a server control panel 3752. Alternatively, the command may include data causing it to transmit directly to a node that is associated with the lighting control device. The server control panel 3752 may access route information regarding how to route the command to the electrical device 3732 (i.e., light(s)). The server control panel 3752 may associate the command with the route information and transmit the command to a repeater 3734, a plurality of repeaters, or directly to the node 3700 that associated with the light(s). Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a healthcare device may be an anesthesia device, a cardiovascular device, a clinical chemistry/toxicology device, a dental device, an ear/nose/throat device, a gastroenterology device, a urology device, a general surgery device, a plastic surgery device, hematology device, pathology device, an immunology device, microbiology device, a mammography device, a neurological device, an OB/GYN device, an ophthalmic device, a radiology device, or some other type of healthcare device. In embodiments, each healthcare device type may be associated with a plurality of repeater nodes 3734, user interface nodes 3740, external device facilities 3744, and the like. The healthcare device may be associated with an external power supply 3748, as described herein. The healthcare device may be associated with an external user 3758, user interface 3754, and a server control panel 3752 and route database 3750. In embodiments, the healthcare device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a healthcare device may be a cardiovascular device, such as an electronic blood pressure monitor, that is associated with a mesh network operating within a physician's office. The blood pressure monitor may be further associated with rules or threshold values (e.g. "diastolic pressure>85=high blood pressure") which when surpassed cause a node 3700 that is associated with the blood pressure monitor to transmit a command over the mesh network. A patient visiting the physician's office may have her blood pressure taken with the device and if a threshold, such as "high blood pressure" is triggered, a plurality of commands may be transmitted to a plurality of locations including, but not limited to, a server storing an electronic medical record, a nursing station, a physician's PDA, or some other facility. The command may be transmitted to a server control panel 3752. Alternatively, the command may include data causing it to transmit directly to a node that is associated with another electrical device (e.g., a personal computer). The server control panel 3752 may access route information regarding how to route the command. The server control panel 3752 may associate the command with the route information and transmit the command to a repeater 3734, a plurality of repeaters, or directly to another location. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a user interface device may be a PDA, a personal computer, a cell phone, a blackberry, a GPS monitor, a TV, a touchscreen, or some other type of user interface device. In embodiments, each user interface device type may be associated with a plurality of repeater nodes 3734, user interface nodes 3740, external device facilities 3744, and the like. The user interface device may be associated with an external power supply 3748, as described herein. The user interface device may be associated with an external user 3758, user interface 3754, and a server control panel 3752 and route database 3750. In embodiments, the user interface device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, an action may be performed based at least in part on the data that is transmitted in association with an electrical device. An action may be a general controlling action in which a device is manipulated in a manner, for example locking or unlocking a door, or some other controlling action. An action may be a monitoring action, an action that determines the status of a node or device (e.g. "window is open"), or some other general action.

In embodiments, an action may be a lighting control action. A lighting control action may include, but is not limited to, turning a light on, turning a light off, and/or dimming a light. A lighting control action may be related to configuring a light, to a preset dim value, to a dim ramp rate, to timing delays, to a grouping of lighting devices, setting a specific light to a light intensity level, setting a group of lights to a specific light intensity level, programming a light, or a plurality of lights, to a specific light intensity level, or some other lighting control action.

In embodiments, an action may be a temperature control action. A temperature control action may be setting a heating level, setting a cooling level, setting a humidity level, setting a temperature level according to a time schedule, and/or setting a fan level. A temperature control action may be related to turning a temperature control device on, turning a temperature control device off, or performing some other temperature control action.

In embodiments, an action may be an access control action. An access control action may include, but is not limited to, locking, unlocking, opening a device, closing a device, moving a device, turning an alarm on, turning an alarm off, sending a low battery alert, detecting motion, detecting an occupancy, or some other access control action.

In embodiments, an action may be an audio-visual action. An audio-visual action may include, but is not limited to, playing a device, pausing a device, stopping a device, recording with a device, fast forwarding a device, rewinding a device, transferring media, browsing media, searching media, managing media, controlling a media screen, controlling volume, changing a channel on a device, performing a parental control, browsing and/or searching an electronic program guide, or some other audio-visual action.

In embodiments, an action may be related to consumer goods, for example, alerting a consumer to a maintenance issue.

In embodiments, an action may be related to energy production control.

Figure 38:
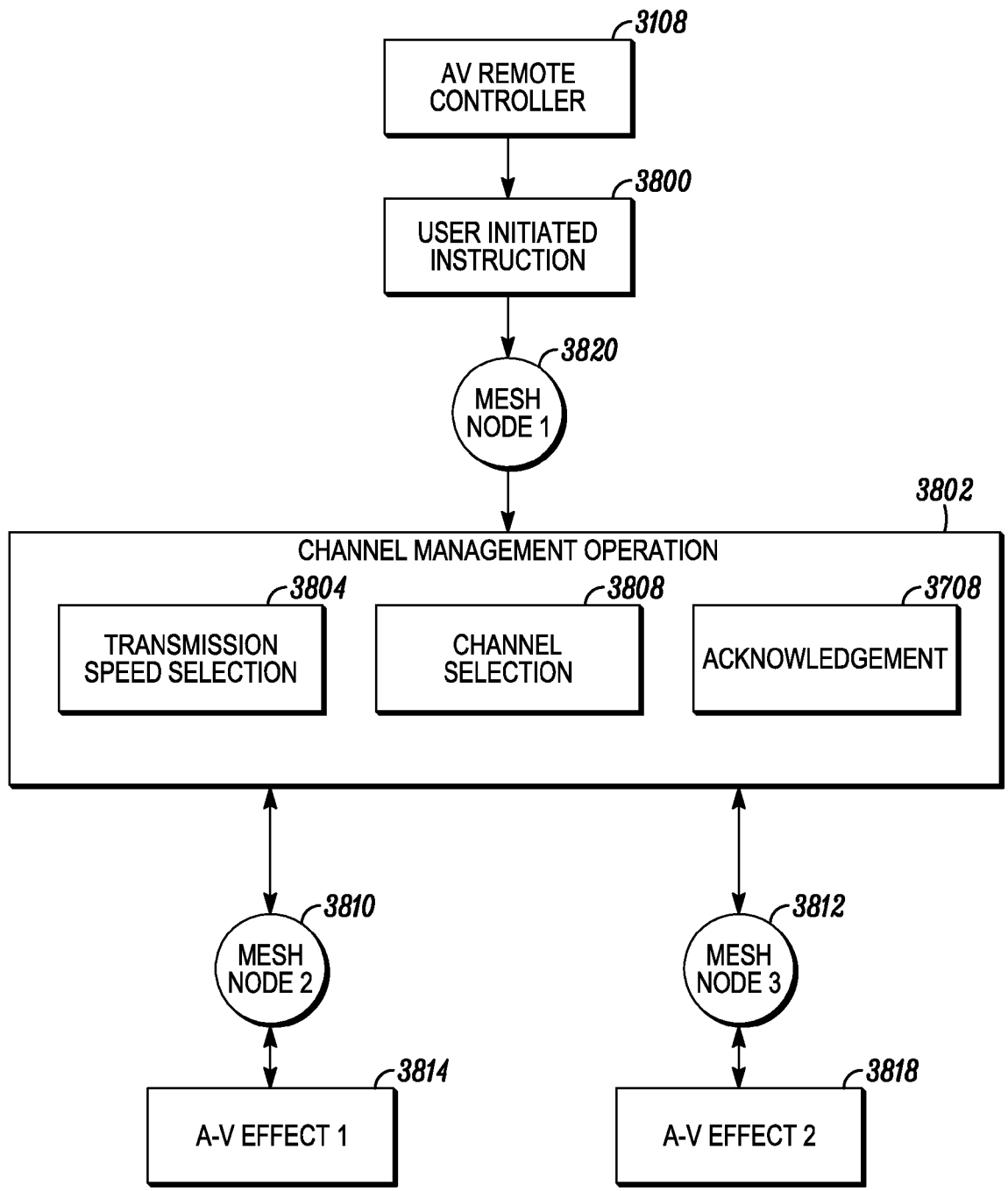
FIG. 38 illustrates using a mesh network channel management operation to control a plurality of audio-visual effects within an audio-visual system.

Referring to FIG. 38, in embodiments, a home audio-visual system may be provided that is at least in part controlled through a mesh network, wherein the home audio-visual system produces at least two effects (3814, 3818). Each of the at least two effects (3814, 3818) may be controlled through separate mesh network nodes (3810, 3812) responsive to user initiated instructions 3800, such as that received at a mesh network node 3820 from a remote controller 3108. Each of the separate mesh network nodes (3810, 3812) may be adapted to receive the user initiate instructions 3800 through a channel management operation 3802.

In embodiments, a channel management operation 3802 may involve selecting a communication transmission speed 3804, selecting a communication channel 3808, performing source routing, performing an acknowledgement procedure 3708, such as silent acknowledgement, or some other operation.

In embodiments, an effect (3814, 3818) may include an audio effect, a visual effect, a room darkening effect, an illumination effect, or some other effect.

In embodiments, a user initiated instruction 3800 may be adapted to control each of the at least two effects (3814, 3818) simultaneously. In embodiments, a single user initiated instruction 3800 may be adapted to control each of the at least two effects (3814, 3818).

In embodiments, a home audio-visual system may include a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, the control and effect production of a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

Figure 39:
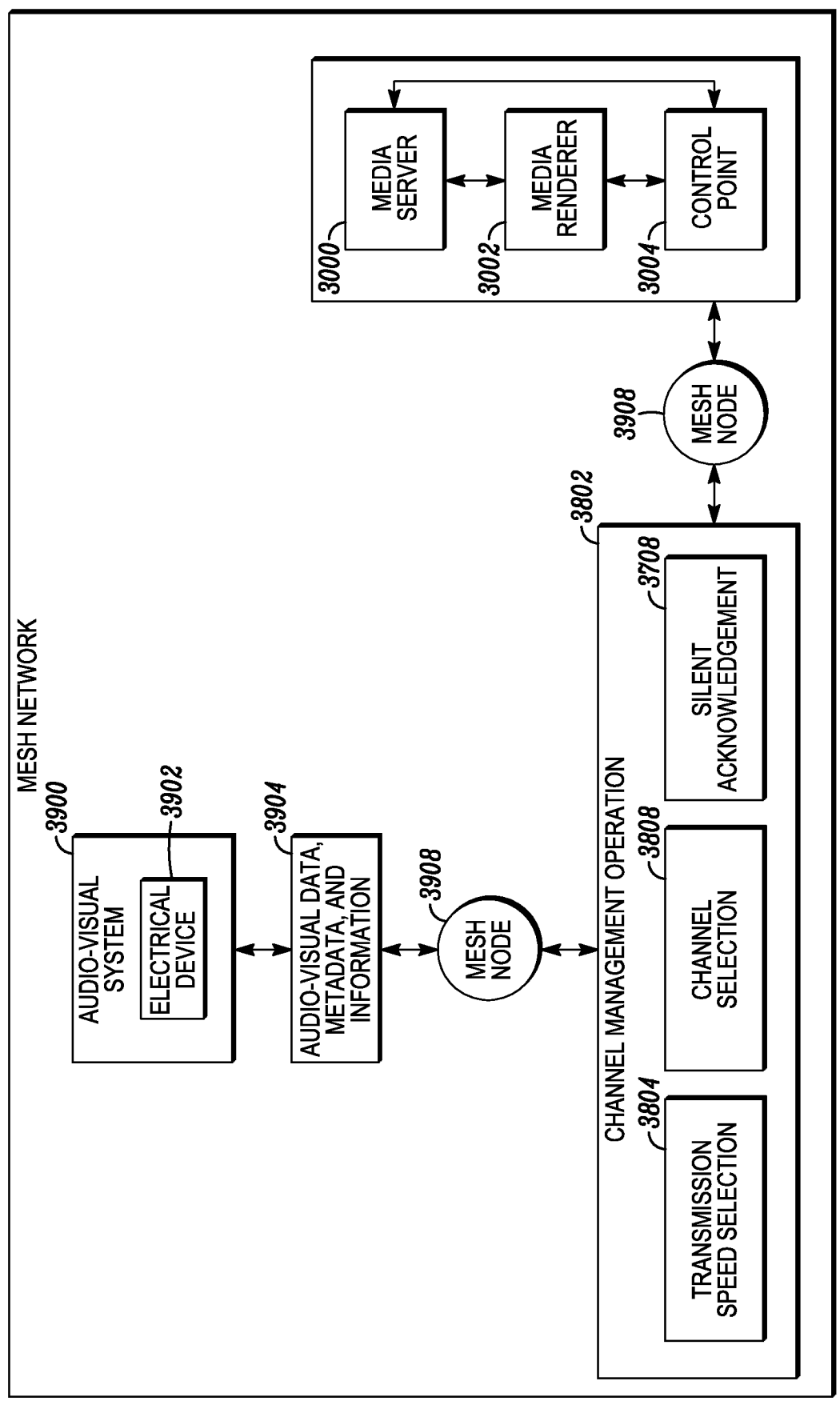
FIG. 39 illustrates using a mesh network channel management operation to communicate information relating to an electrical device within an audio-visual system.

Referring to FIG. 39, in embodiments, a home audio-visual system 3900 may communicate information through a mesh network, wherein the home audio-visual system 3900 includes one or more electrical devices 3902 that produce the information 3904. The home audio-visual system 3900 may be associated with a channel management operation 3802 that is associated with one or more nodes 3908 of the mesh network to effect the communication of the information 3904. In embodiments, the information 3904 may be communicated to a media server 3000, media renderer 3002, control point 3004, or some other audio-visual system component.

In embodiments, the information may be communicated to a user. The information may relate to an audio-visual system setting. In embodiments, the information may be control information intended to be used by at least one of the one or more electrical devices within the audio-visual system. In embodiments, the information may relate to metadata. In embodiments, metadata may be related to an image, a photo, audio, a music track, an audio broadcast, an audio book, a video, a movie, a video broadcast, a stored video, a live video, a digital video recorder file, a music video, audio-visual equipment, an appliance, a content directory, and other metadata types. Metadata may be a description of content being delivered, a rating, a title, a music title, a movie title, a publisher, a right, a plurality of rights, a genre, a language, a relation, a region, a radio call signal, a radio station, a radio band, a channel number, an image name, an artist name, a music track, a playlist, a storage medium, a contributor, a date, a producer, a director, a DVD region code, a channel name, a scheduled start time, a scheduled end time, an icon, and the like.

In embodiments, a channel management operation 3802 may involve selecting a communication transmission speed 3804, selecting a communication channel 3808, performing source routing, performing an acknowledgement procedure 3708, such as silent acknowledgement, or some other operation.

In embodiments, the information communicated within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the information communicated within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

Figure 40:
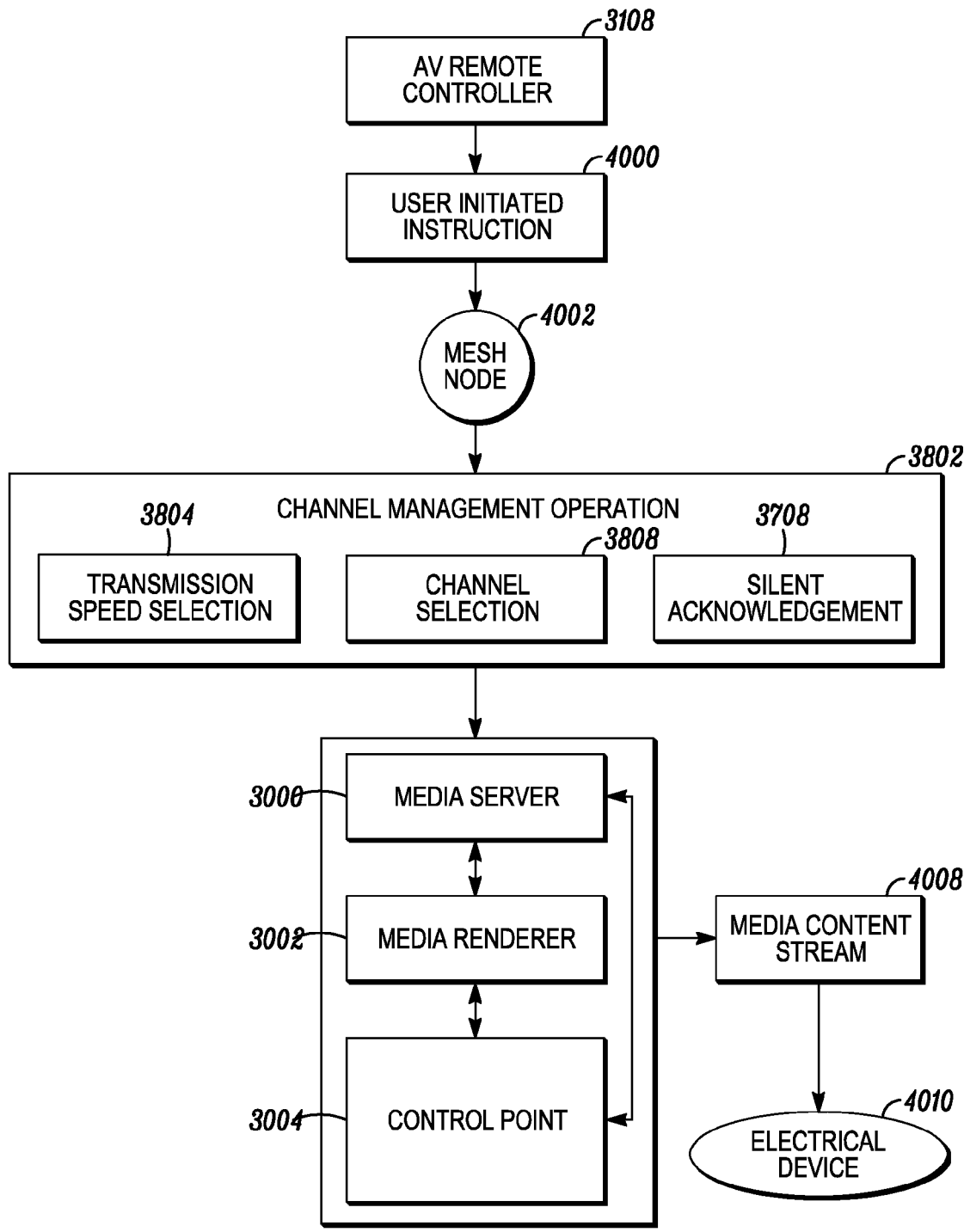
FIG. 40 illustrates using a mesh network channel management operation to communicate a user instruction relating to a media content stream within an audio-visual system.

Referring to FIG. 40, in embodiments, a media server 3000 may be enabled to control the delivery of a plurality of media content streams 4008 to a plurality of electrical devices 4010, wherein the media server 3000 is adapted to be controlled through a mesh network node 4002 using a mesh network channel management operation 4004. In embodiments, a command to the media server 3000 through the mesh network node may be transmitted in response to a user initiated instruction 4000 input to a hand held remote control 3108, causing the mesh network node 4002 to receive the user initiated command 4000 through manipulation of a channel control operation 3802. In embodiments, the media server 3000 may control the delivery of at least one of the plurality of media content streams 4008 to at least one of the plurality of electrical devices 4010 based on the user initiated command 4000. In embodiments, a media server 3000 may be associated with a media renderer 3002, control point 3004, or some other audio-visual system component.

In embodiments, a channel management operation 3802 may involve selecting a communication transmission speed 3804, selecting a communication channel 3808, performing source routing, performing an acknowledgement procedure 3708, such as silent acknowledgement, or some other operation.

In embodiments, the media server 3000 control within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the media server 3000 control within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

Figure 41:
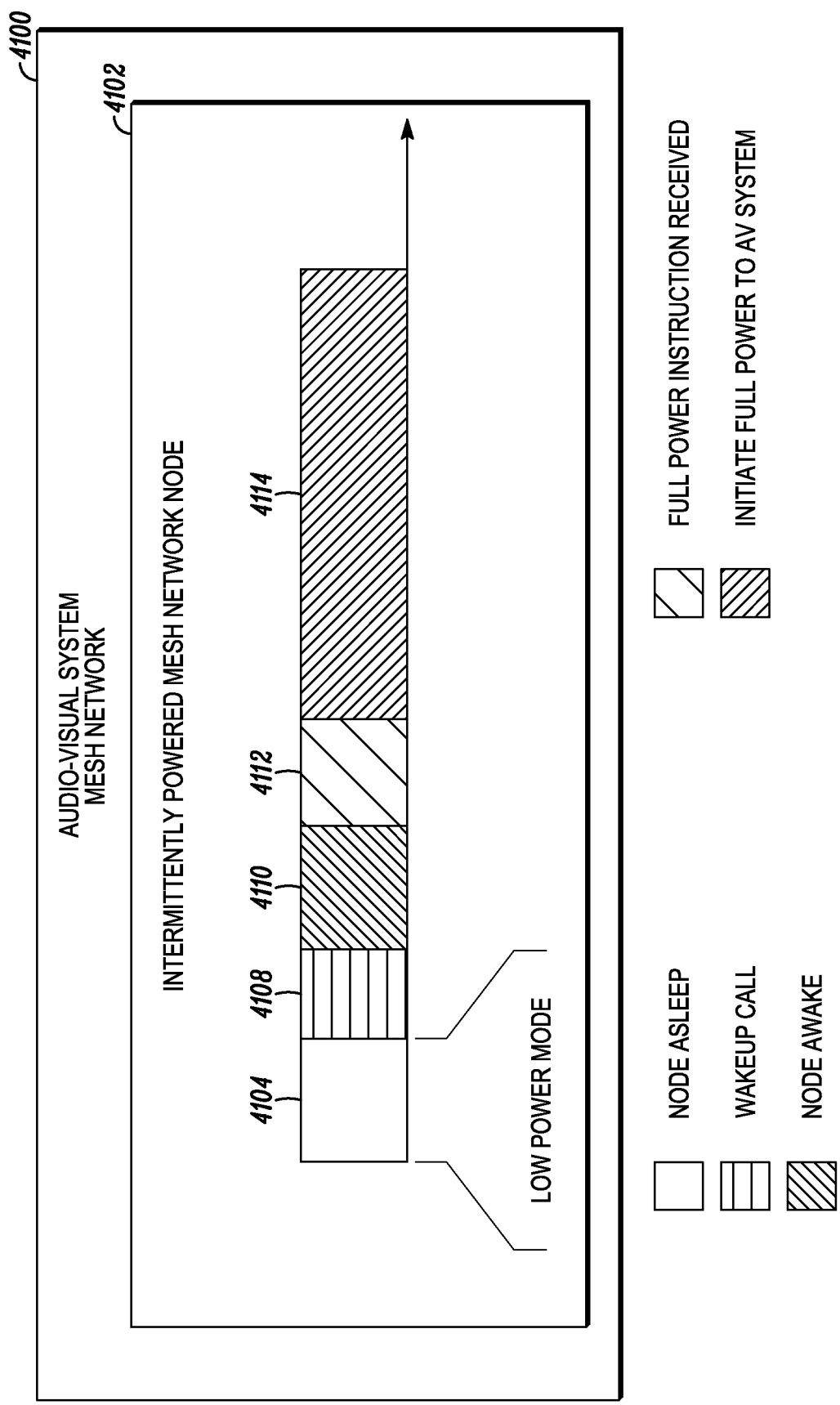
FIG. 41 illustrates using an intermittently powered mesh network node in association with an audio-visual system.

Referring to FIG. 41, in embodiments, a home audio visual system 4100 may include an energy savings mode based at least in part on an intermittently powered mesh network node 4102 that is associated with the home audio visual system 4100. In embodiments, the intermittently powered mesh network node 4102 may periodically wake up from a low power, or no power sleep mode 4104 upon receipt of a wake up call 4108. The wake up call 4108 may change the node 4102 to an awake status 4110 in which it can receive a full power instruction 4112 to initiate a full power mode 4114 in the home audio visual system. In embodiments, the wake up call may be routed to the intermittently powered mesh network node using a form of acknowledgement, such as silent acknowledgement as described herein.

In embodiments, the energy savings mode of the home audio visual system may draw no external power or a low power (e.g., 0-1 mA). In embodiments, a full power instruction may be used to close a power relay.

In embodiments, the intermittently powered mesh network node may request configuration information when the intermittently powered mesh network node powers up.

In embodiments, the intermittently powered mesh network node may transmit a command when the intermittently powered mesh network node powers up.

In embodiments, the intermittently powered mesh network node may acknowledge a command when the intermittently powered mesh network node powers up.

In embodiments, the intermittently powered mesh network node may respond to a node request when the intermittently powered mesh network node powers up.

In embodiments, the intermittently powered mesh network node may be powered at least in part using a battery, a fuel cell, a solar cell, an alternative energy source, an AC power source, or DC power source.

In embodiments, the energy savings mode of a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, a plurality of electrical devices may be associated with a mesh network. A message command may be transmitted over the mesh network to the plurality of electrical devices in response to a user initiated instruction. The command may be received by the plurality of electrical devices. The message command may be translated by the plurality of electrical devices, and the transmitted message presented at each of the electrical devices among the plurality of electrical devices.

In embodiments, the user initiated command may be initiated through spoken words. In embodiments, the spoken words may be spoken into an intercom, microphone, or some other electrical device. In embodiments, the spoken words may be converted into text through a speech recognition facility to form the message command. In embodiments, the spoken words may be interpreted and a message command selected based at least in part on the interpretation.

In embodiments, a message may indicate that a person is wanted on the phone, that a meal is prepared, that an appliance door is open/closed, a door is open/closed, a window is open/closed, that an appliance is on/off, or some other information.

In embodiments, the presentation of the message may be in a format that is appropriate for each of the electrical devices among the plurality of electrical devices. An appropriate format may include text, audio (e.g. an alarm or spoken human language), video, audio visual, photographic image, graphic, or some other format.

In embodiments, the message transmission within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the message transmission within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, a media server enabled to control the delivery of a plurality of media content streams to a plurality of electrical devices, wherein the media server is adapted to be controlled through a mesh network node. A parental control command may be transmitted to the media server through the mesh network based node in response to a user initiated instruction input to a handheld remote control. The command may cause the media server to control the delivery of at least one of the plurality of media content streams to at least one of the plurality of electrical devices based on the parental control command.

In embodiments, a parental control command may be a maximum volume threshold, related to a media content rating, may block access to a program, channel, Internet, webpage, electrical device, may be related to a time of day, or be some other parent control function.

In embodiments, a channel management operation 3802 may involve selecting a communication transmission speed 3804, selecting a communication channel 3808, performing source routing, performing an acknowledgement procedure 3708, such as silent acknowledgement, or some other operation.

In embodiments, the parental control command within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the parental control command within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, an electrical device may be associated with a mesh network. A user media preference may be associated with a user mesh network node. The user mesh network node may be associated with a user media control device. A user media preference command relating to the user media preference may be transmitted from the user media control device based at least on a physical proximity between the user media control device and the electrical device. The command may be received by the electrical device, and a setting of the electrical device may be altered based at least in part on the user media preference command.

In embodiments, the user media control device may be a chip, a cell phone, a PDA, a computer, a remote control, or some other control device.

In embodiments, a setting may be volume, a genre, a performer, a light level, a program, or some other setting.

In embodiments, the media preference command within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the media preference command within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, a mesh network node may be associated with a home security facility. An alarm command may be transmitted through the home security facility mesh network node to a plurality of electrical devices through the mesh network based at least in part on a change in the home security facility. An alarm condition may be presented through each of the plurality of electrical devices based at least in part on the change in the home security facility.

In embodiments, the change in the home security facility may be a opening action (e.g. a door), a closing action, a failure or open, a failure to close, or some other change.

In embodiments, a home security facility may be a door, window, floor, wall, fence, or some other home security facility.

In embodiments, an alarm condition may be the sound of a barking dog, the sound of people calling the police, the sound of a siren, the sound of a cocking shotgun, a high-decibel, high frequency sound, or some other alarm type.

In embodiments, the alarm command within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the alarm command within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, a home audio-visual system may be provided that communicates information through a mesh network, wherein the home audio-visual system includes one or more electrical devices that produce the information. An electrical device may transmit a control command to the mesh network using a cell phone, and a channel management operation associated with one or more nodes of the mesh network may be controlled to effect the communication of the command. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. An electrical device may transmit a control command to the mesh network using a cordless phone, and a channel management operation associated with one or more nodes of the mesh network may be controlled to effect the communication of the command. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. An electrical device may transmit a control command to the mesh network using a text messaging device, and a channel management operation associated with one or more nodes of the mesh network may be controlled to effect the communication of the command. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. An electrical device may transmit a control command to the mesh network using a voice command, and a channel management operation associated with one or more nodes of the mesh network may be controlled to effect the communication of the command. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. Language subtitle information may be transmitted through the mesh network to an electrical device playing content associated with the subtitles; and a channel management operation associated with one or more nodes of the mesh network may be controlled to effect the communication of the subtitle information. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. A content retrieve command may be transmitted through a television associated with the mesh network. Content may be retrieved from a content storage facility that is independent of the television. The content may be transmitted through the mesh network for presentation on the television, and a channel management operation associated with one or more nodes of the mesh network may be controlled to effect the communication of the content. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. A television station may be selected on a television that is associated with the mesh network. A television station logo associated with the selected television station may be retrieved from a content storage facility that is independent of the television. The logo may be transmitted through the mesh network for presentation on the television, and a channel management operation associated with one or more nodes of the mesh network may be controlled to effect the communication of the logo. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. Banner data may be streamed from a content storage facility that is independent of an electrical device in the mesh network. The streamed banner data may be presented to the electrical device in the mesh network, and a channel management operation associated with one or more nodes of the mesh network may be controlled to effect the communication of the streamed banner data. In embodiments, a channel management operation may involve selecting a communication transmission speed, selecting a communication channel, performing source routing, performing an acknowledgement procedure, such as silent acknowledgement, or some other operation.

In an embodiment, a monitoring system is provided to monitor an inhabitant of a living space. The monitoring may be performed by analyzing actions associated with actuators associated with the living space. The living space may, for example, have actuators such as those associated with light switches, audio visual equipment (e.g. on/off switches, control switches), kitchen appliances (e.g. on/off switches, control switches) or other such devices and each of them or many of them may be monitored to predict or infer behaviors of the inhabitants. The actuators may be associated with a network such that actuator interactivity may be monitored. Patterns of interaction may be monitored and compared with standard patterns to predict or infer a behavior of the inhabitant. For example, generally speaking, the inhabitant may typically go to bed at 8:00 p.m. Patterns of actuator interaction and actuator performance may be stored in a database. One of the patterns may be indicative of a sleeping inhabitant or an inhabitant preparing for sleep. A sleeping pattern may indicate, for example, that the light actuators in a particular room (e.g. the living room) are off during sleeping hours and that the kitchen appliances are all off. If the realtime actuator performance at 1:00 a.m. shows lights on or appliances on, an inference may be drawn that indicates the inhabitant is in trouble because of lack of compliance with the standard pattern. Of course, this is a very basic example, and the inference system may monitor several actuators and draw inferences on more complicated combinations of actual actuator performance versus standard patterns. The living space may be a home, a nursing home, a hospital, a daycare, a school, a business office, or some other space. For example, a user may monitor the activities of an elderly person residing at a distant location. Thus, an unattended elderly person can be remotely monitored for an unusual pattern in an otherwise normal routine.

In this embodiment, the method of monitoring may involve associating an actuator with a device within the living space; activating the actuator upon a status change of the device; transmitting data from the actuator to a data facility based at least in part on the activation of the actuator; comparing the transmitted data to a device standard using the data facility; and generating a message based at least in part on the data comparison.

The actuator may be associated with an electrical, electronic, or a mechanical device within the living space. The actuator may be associated with a mesh network node. The node may employ any or all of the node technologies as described herein. For example, the node may use speed control, silent acknowledgment, channel selections, or other technologies described in connection with FIGS. 1-37. Moreover, the device may be a light switch, a door lock, a window lock, a thermostat, a motion detector, or any other device described in connection with FIGS. 1-37. Also, the device may be a weight sensor, wherein the weight sensor is associated with a bed, a chair, a floor, or any other area where the inhabitant of the living space is likely to apply weight on.

The actuator may be activated upon status change of the associated device. Referring to the example mentioned above, the actuator may be activated when the elderly person switches on a light in the living space. Once activated, the actuator may transmit data related to the status change of the device to a data facility. In an embodiment the actuator transmits the data through a mesh network. The transmission through the mesh network may employ any or all of the transmission technologies as described herein. For example, the transmission may involve mesh channel manipulation, silent acknowledgement, transmitting through a battery operated node, repairing a node in the network to effect the transmission, or other technologies described in connection with FIGS. 1-37. Moreover, the transmission could be local to the living space, external to the living space, or broadcast locally and external to the living space.

In embodiments, the actuator may be separate from a device, associated with a device, combined with a device, embedded in a device, manufactured with a device as a single component, or associated with a device in some other manner.

The data received by the data facility may be compared to a standard for the device or collection of devices. The device standard may be a national norm, a personal norm representing an individuals' average use of the device or some other 'normal' condition. In our example, normal routine of the elderly person may involve all the lights at the residence to be switched off after 8:00 p.m. In this case, lights being switched off after 8:00 p.m. may be a personal norm for the light switches. Moreover, the comparison may result in generation of a message for the user, where the user may be a person attempting to monitor the inhabitant, the inhabitant, or other person involved in the monitoring process. In the example mentioned above, a message may be generated for the user in case the light is switched on after 8:00 p.m. in the evening. Switching the light on at this time does not match the personal norm and could imply an unusual activity that may require immediate attention. The message generated for the user may be in the form of an alarm, a phone call, a text message, an email, an instant message, a beeper message, or any other message to a user accessible interface.

In another embodiment, a monitoring system is provided to monitor an inhabitant of a living space. The living space may be a home, a nursing home, a hospital, a daycare, a school, a business office, or some other space. For example, a user may monitor the activities of an elderly person residing at a distant location. Thus, an unattended elderly person can be remotely monitored for an unusual pattern in an otherwise normal routine. A method for monitoring the inhabitant of the living space may involve the following steps: associating an actuator with a device within a living space; activating the actuator upon an elapsed time duration during which there is no status change of the device; transmitting data from the actuator to a data facility based at least in part on the activation of the actuator; comparing the transmitted data to a device standard using the data facility; and generating a message based at least in part on the data comparison.

The actuator may be associated with an electrical, electronic, or a mechanical device within the living space. The actuator may be associated with a mesh network node. The node may employ any or all of the node technologies as described herein. For example, the node may use speed control, silent acknowledgment, channel selections, or other technologies described in connection with FIGS. 1-37. Moreover, the device may be a light switch, a door lock, a window lock, a thermostat, a motion detector, or any other device described in connection with FIGS. 1-37. Also, the device may be a weight sensor, wherein the weight sensor is associated with a bed, a chair, a floor, or any other area where the inhabitant of the living space is likely to apply weight on.

The actuator may be activated upon an elapsed time duration during which there is no status change of the associated device. Referring to the example mentioned above, the actuator may be activated when the elderly person does not switch on a light when it is otherwise normally switched on after five in the evening. Once activated, the actuator may transmit data related to the status change of the device to a data facility. In an embodiment the actuator transmits the data through a mesh network. The transmission through the mesh network may employ any or all of the transmission technologies as described herein. For example, the transmission may involve mesh channel manipulation, silent acknowledgement, transmitting through a battery operated node, repairing a node in the network to effect the transmission, or other technologies described in connection with FIGS. 1-37. Moreover, the transmission could be local to the living space, external to the living space, or broadcast locally and external to the living space.

The data received by the data facility may be compared to a standard for the device or collection of devices. The device standard may be a national norm, a personal norm representing an individuals' average use of the device or some other 'normal' condition. In our example, normal routine of the elderly person may involve all the lights at the residence to be switched on after 5:00 p.m. everyday. In this case, lights being switched on after 5:00 p.m. may be a personal norm for the light switches. Moreover, the comparison to the standard for the device may result in generation of a message for the user, where the user may be a person attempting to monitor the inhabitant, the inhabitant, or other person involved in the monitoring process. In the example mentioned above, a message may be generated for the user in case the light is not switched on after 5:00 p.m. Light switches being off after 5:00 p.m. does not match the personal norm and could imply an unusual activity that may require immediate attention. The message generated for the user may be in the form of an alarm, a phone call, a text message, an email, an instant message, a beeper message, or any other message to a user accessible interface.

In yet another embodiment, a monitoring system is provided to monitor an inhabitant of a living space. The living space may be a home, a nursing home, a hospital, a daycare, a school, a business office, or some other space. An actuator may be associated with an electrical, electronic, or a mechanical device within the living space, such as a light switch, a door lock, a window lock, a thermostat, a motion detector, or any other device described in connection with FIGS. 1-37 for example. The actuator may also be associated with a mesh network node. The node may employ any or all of the node technologies as described herein. For example, the node may use speed control, silent acknowledgment, channel selections, or other technologies described in connection with FIGS. 1-37. A method for monitoring the inhabitant of the living space may involve associating an actuator with a device within a living space; associating the actuator with a mesh network; activating the actuator upon a status change of the device; transmitting data from the actuator to a data facility, based at least in part on the activation of the actuator, wherein the transmission route is selected from a plurality of transmission routes based at least in part on a criterion; comparing the transmitted data to a device standard using the data facility; and generating a message based at least in part on the data comparison.

The actuator may be activated upon status change of the associated device. Once activated, the actuator may transmit data related to the status change of the device to a data facility. The actuator may transmit data through its associated mesh network, wherein the transmission route is selected from a plurality of transmission routes based at least in part on a criterion. For example, the selection of transmission route may be based on transmission speed, or any other criteria described in connection with FIGS. 1-37. Moreover, the transmission through the mesh network may employ any or all of the transmission technologies as described herein. For example, the transmission may involve mesh channel manipulation, silent acknowledgement, transmitting through a battery operated node, repairing a node in the network to effect the transmission, or other technologies described in connection with FIGS. 1-37.

The data received by the data facility may be compared to a standard for the device or collection of devices. Moreover, the comparison to the standard for the device may result in generation of a message for the user, where the user may be a person attempting to monitor the inhabitant, the inhabitant, or other person involved in the monitoring process. The message generated for the user may be in the form of an alarm, a phone call, a text message, an email, an instant message, a beeper message, or any other message to a user accessible interface.

In yet another embodiment, a monitoring system is provided to monitor an inhabitant of a living space. The living space may be a home, a nursing home, a hospital, a daycare, a school, a business office, or some other space. An actuator may be associated with an electrical, electronic, or a mechanical device within the living space, such as a light switch, a door lock, a window lock, a thermostat, a motion detector, or any other device described in connection with FIGS. 1-37. The actuator is also associated with a mesh network node. The node may employ any or all of the node technologies as described herein. For example, the node may use speed control, silent acknowledgment, channel selections, or other technologies described in connection with FIGS. 1-37. A method for monitoring the inhabitant of the living space may involve associating an actuator with a device within a living space; associating the actuator with a mesh network; activating the actuator upon an elapsed time duration during which there is no status change of the device; transmitting data from the actuator to a data facility, based at least in part on the activation of the actuator, wherein the transmission route is selected from a plurality of transmission routes based at least in part on a criterion; comparing the transmitted data to a device standard using the data facility; and generating a message based at least in part on the data comparison.

The actuator may be activated upon an elapsed time duration during which there is no status change of the associated device. Once activated, the actuator may transmit data related to the status change of the device to a data facility. The actuator may transmit data through its associated mesh network, wherein the transmission route is selected from a plurality of transmission routes based at least in part on a criterion. For example, the selection of transmission route may be based on transmission speed, or any other criteria described in connection with FIGS. 1-37. Moreover, the transmission through the mesh network may employ any or all of the transmission technologies as described herein. For example, the transmission may involve mesh channel manipulation, silent acknowledgement, transmitting through a battery operated node, repairing a node in the network to effect the transmission, or other technologies described in connection with FIGS. 1-37.

The data received by the data facility may be compared to a standard for the device or collection of devices. Moreover, the comparison to the standard for the device may result in generation of a message for the user, where the user may be a person attempting to monitor the inhabitant, the inhabitant, or other person involved in the monitoring process. The message generated for the user may be in the form of an alarm, a phone call, a text message, an email, an instant message, a beeper message, or any other message to a user accessible interface.

While many of the embodiments describe the tracking of a single or limited number of actuators and comparing their activity with a standard, it should be understood that these examples are provided to help in the understanding of the invention and are not intended to be limiting in anyway. For example, standards may be developed that are based on a number of actuator conditions or status. The accumulation of several or many such actuator conditions may be stored as a standard and the actual performance of the several or many actuators may be compared to the standard in a number of ways using a number of statistical techniques. One such statistical technique may involve making an inference based on a significant number of differences identified between the actual performance and the standard.

While the invention has been disclosed in connection with the preferred embodiments shown and described in detail, each of the technologies described herein may be incorporated, associated with, combined, and the like with each of the use scenarios described herein, and each of the applications described herein, including market applications.

This application incorporates the following commonly-owned U.S. patent Applications, each of which is incorporated herein by reference in its entirety: U.S. application Ser.

No. 11/425,917 filed on Jun. 22, 2006, which claims benefit of U.S. Prov. App. No. 60/763,835 filed on Jan. 31, 2006; U.S. Prov. App. No. 60/764,394 filed on Feb. 1, 2006; U.S. Prov. App. No. 60/765,810 filed on Feb. 7, 2006; U.S. Prov. App. No. 60/772,089 filed on Feb. 10, 2006, U.S. Prov. App. No. 60/968,258 filed on Aug. 27, 2007, and U.S. Prov. App. No. 60/984,522 filed on Nov. 1, 2007. This application is also a continuation-in-part of U.S. application Ser. No. 11/456,029 filed on Jul. 6, 2006; U.S. application Ser. No. 11/552,418 filed on Oct. 24, 2006; U.S. application Ser. No. 11/681,401 filed on Mar. 2, 2007; U.S. application Ser. No. 11/681,417 filed Mar. 2, 2007, U.S. application Ser. No. 11/684,430 filed on Mar. 9, 2007; U.S. application Ser. No. 11/684,442 filed on Mar. 9, 2007, U.S. application Ser. No. 11/737,717 filed on Apr. 19, 2007, U.S. application Ser. No. 11/875,914 filed on Oct. 21, 2007, U.S. application Ser. No. 11/875,915 filed on Oct. 21, 2007, U.S. application Ser. No. 11/875,916 filed on Oct. 21, 2007, U.S. application Ser. No. 11/875,917 filed on Oct. 21, 2007, U.S. application Ser. No. 11/875,919 filed on Oct. 21, 2007, U.S. application Ser. No. 11/875,920 filed on Oct. 21, 2007, U.S. application Ser. No. 11/875,921 filed on Oct. 21, 2007, U.S. application Ser. No. 11/875,923 filed on Oct. 21, 2007, U.S. application Ser. No. 11/875,924 filed on Oct. 21, 2007, U.S. application Ser. No. 11/875,926 filed on Oct. 21, 2007, and U.S. application Ser. No. 11/875,927 filed on Oct. 21, 2007.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method comprising:
   providing a home audio-visual system that is at least in part controlled through a mesh network, wherein the home audio-visual system produces at least two effects;
   controlling each of the at least two effects through respective separate mesh network nodes responsive to user initiated instructions; and
   adapting each of the separate mesh network nodes to receive the user initiated instructions through a channel management operation, and
   acknowledging a wake up call with a silent acknowledgement, in which the wake up call from a source node is sent to a node of the home audio-visual system by an intermediate node, and the source node detects transmission of the wake up call by the intermediate node to the home audio visual system without a specific acknowledgement message to the source node,
   wherein the home audio-visual system is intermittently powered and wherein the intermittently powered home audio-visual system is adapted to change from a sleep mode to an awake status upon receipt of the wake up call, to receive an instruction to initiate a full power mode, and to acknowledge the wake up call.

2. The method of claim 1 wherein the channel management operation involves selecting a communication transmission speed.

3. The method of claim 1, wherein the channel management operation involves selecting a communication channel.

4. The method of claim 1, wherein the energy savings mode of the home audio-visual system draws no external power.

5. The method of claim 1, wherein at least one of the at least two effects is an audio effect.

6. The method of claim 1, wherein at least one of the at least two effects is a visual effect.

7. The method of claim 1, wherein at least one of the at least two effects is a room darkening effect.

8. The method of claim 1, wherein at least one of the at least two effects is a room illumination effect.

9. The method of claim 1, wherein the user initiated instruction is adapted to control each of the at least two effects simultaneously.

10. The method of claim 1, wherein a single user initiated instruction is adapted to control each of the at least two effects.

11. The method of claim 1, wherein the home audio-visual system includes at least one of a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment equalizer, a phonograph player, a video component, a streaming media player, an mp3 player, a light, a lamp, a gateway, a modem, or ISDN.

12. A method comprising:
providing a home audio-visual system that communicates information through a mesh network, wherein the home audio-visual system includes one or more electrical devices that produce the information; and
controlling a channel management operation associated with one or more nodes of the mesh network to effect communication of the information,
wherein the home audio-visual system is intermittently powered and wherein the intermittently powered home audio-visual system is adapted to change from a sleep mode to an awake status upon receipt of a wake up call, to receive an instruction to initiate a full power mode, and to acknowledge the wake up call.

13. The method of claim 12, wherein the information is communicated to a user.

14. The method of claim 12, wherein the information relates to an audio-visual system setting.

15. The method of claim 12, wherein the information relates to metadata.

16. The method of claim 12, wherein the information is control information intended to be used by at least one of the one or more electrical devices within the audio-visual system.

17. A method comprising:
providing a media server enabled to control the delivery of a plurality of media content streams to a plurality of electrical devices, wherein the media server is adapted to be controlled through a mesh network node using a mesh network channel management operation;
transmitting a command to the media server through the mesh network node in response to a user initiated instruction input to a hand held remote control;
causing the mesh network node to receive the user initiated command through manipulation of the channel management operation; and
causing the media server to control the delivery of at least one of the plurality of media content streams to at least one of the plurality of electrical devices based on the user initiated command, and
acknowledging a wake up call with a silent acknowledgement, in which the wake up call from a source node is sent to a node of the home audio-visual system by an intermediate node, and the source node detects transmission of the wake up call by the intermediate node to the home audio visual system without a specific acknowledgement message to the source node,
wherein the home audio-visual system is intermittently powered and wherein the intermittently powered home audio-visual system periodically wakes up from a low power or no bower sleep mode upon receipt of the wake up call.

18. The method of claim 17, wherein the channel management operation involves selecting a communication transmission speed.

19. The method of claim 17, wherein the channel management operation involves selecting a communication transmission speed.

20. The method of claim 19, wherein channel management operation involves performing a silent acknowledgement operation.

* * * * *

UNITED STATES PATENT AND TRADEMARK OFFICE
CERTIFICATE OF CORRECTION

PATENT NO.         : 8,626,178 B2                      Page 1 of 1
APPLICATION NO.    : 12/198241
DATED              : January 7, 2014
INVENTOR(S)        : Niels Thybo Johansen It is certified that error appears in the above-identified patent and that said Letters Patent is hereby corrected as shown below:

In the Claims:

Column 56, Line 27, "power or no bower sleep mode upon receipt of the wake" should read
-- power or no power sleep mode upon receipt of the wake --

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,626,178 B2 | Page 1 of 1 |
| APPLICATION NO. | : 12/198241 | |
| DATED | : January 7, 2014 | |
| INVENTOR(S) | : Johansen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this
Twenty-fifth Day of August, 2015

Michelle K. Lee
*Director of the United States Patent and Trademark Office*